United States Patent
Moon et al.

(10) Patent No.: US 12,225,185 B2
(45) Date of Patent: Feb. 11, 2025

(54) METHOD AND APPARATUS FOR ENCODING/DECODING AN IMAGE SIGNAL

(71) Applicant: INDUSTRY ACADEMY COOPERATION FOUNDATION OF SEJONG UNIVERSITY, Seoul (KR)

(72) Inventors: Joo Hee Moon, Seoul (KR); Dong Jae Won, Goyang-si (KR); Sung Won Lim, Seoul (KR)

(73) Assignee: INDUSTRY ACADEMY COOPERATION FOUNDATION OF SEJONG UNIVERSITY, Seoul (KR)

( * ) Notice: Subject to any disclaimer, the term of this patent is extended or adjusted under 35 U.S.C. 154(b) by 10 days.

(21) Appl. No.: 17/981,841

(22) Filed: Nov. 7, 2022

(65) Prior Publication Data
US 2023/0066631 A1 Mar. 2, 2023

Related U.S. Application Data

(60) Division of application No. 17/158,291, filed on Jan. 26, 2021, now Pat. No. 11,533,470, which is a
(Continued)

(30) Foreign Application Priority Data

| Jan. 16, 2017 | (KR) | 10-2017-0007349 |
| Jan. 16, 2017 | (KR) | 10-2017-0007350 |
| Jan. 16, 2017 | (KR) | 10-2017-0007351 |

(51) Int. Cl.
*H04N 19/103* (2014.01)
*H04N 19/117* (2014.01)
(Continued)

(52) U.S. Cl.
CPC ......... *H04N 19/103* (2014.11); *H04N 19/117* (2014.11); *H04N 19/119* (2014.11);
(Continued)

(58) Field of Classification Search
CPC .. H04N 19/103; H04N 19/117; H04N 19/119; H04N 19/159; H04N 19/176;
(Continued)

(56) References Cited

U.S. PATENT DOCUMENTS 11,871,022 B2 * 1/2024 Zhang ................. H04N 19/176
2004/0233989 A1 11/2004 Kobayashi et al.
(Continued)

FOREIGN PATENT DOCUMENTS

| CN | 1550109 A | 11/2004 |
| CN | 102362500 A | 2/2012 |

(Continued)

OTHER PUBLICATIONS

First Chinese Office Action from Chinese Patent Application No. 201880007072.5 dated Sep. 28, 2022.
(Continued)

*Primary Examiner* — Jared Walker
(74) *Attorney, Agent, or Firm* — Dilworth & Barrese, LLP.; Michael J. Musella, Esq.

(57) ABSTRACT

Disclosed are an image encoding/decoding method and apparatus. The image decoding method includes decoding coding mode information of a current coding block, dividing the current coding block into at least one prediction block, and generating prediction samples of the at least one prediction block on the basis of the decoded coding mode, in which the coding mode information is information Indicating any one mode among intra mode, inter mode, and hybrid mode.

6 Claims, 50 Drawing Sheets

Related U.S. Application Data continuation of application No. 16/478,223, filed on Jul. 16, 2019, now Pat. No. 10,951,884, which is a continuation of application No. PCT/KR2018/000729, filed on Jan. 16, 2018.

(51) Int. Cl.
| | | |
|---|---|---|
| *H04N 19/119* | (2014.01) | |
| *H04N 19/159* | (2014.01) | |
| *H04N 19/176* | (2014.01) | |
| *H04N 19/51* | (2014.01) | |

(52) U.S. Cl.
CPC ......... *H04N 19/159* (2014.11); *H04N 19/176* (2014.11); *H04N 19/51* (2014.11)

(58) Field of Classification Search
CPC ...... H04N 19/51; H04N 19/124; H04N 19/13; H04N 19/423; H04N 19/44; H04N 19/52; H04N 19/573
See application file for complete search history.

(56) References Cited

U.S. PATENT DOCUMENTS

| | | | |
|---|---|---|---|
| 2013/0070855 A1 | 3/2013 | Zheng et al. | |
| 2013/0114720 A1 | 5/2013 | Wang et al. | |
| 2013/0272623 A1* | 10/2013 | Jeon | H04N 19/86 382/238 |
| 2013/0287116 A1* | 10/2013 | Helle | H04N 19/196 375/240.24 |
| 2013/0315308 A1* | 11/2013 | Sugio | H04N 19/44 375/240.14 |
| 2014/0119450 A1* | 5/2014 | Takehara | H04N 19/52 375/240.16 |
| 2014/0146876 A1 | 5/2014 | Takehara et al. | |
| 2014/0169476 A1* | 6/2014 | Laroche | H04N 19/503 375/240.16 |
| 2014/0247883 A1* | 9/2014 | Lee | H04N 19/30 375/240.12 |
| 2014/0355686 A1* | 12/2014 | Takehara | H04N 19/503 375/240.16 |
| 2014/0355687 A1* | 12/2014 | Takehara | H04N 19/513 375/240.16 |
| 2015/0003751 A1* | 1/2015 | Aiba | H04N 19/182 382/233 |
| 2015/0098509 A1* | 4/2015 | Sung | H04N 19/159 375/240.16 |
| 2015/0334419 A1 | 11/2015 | Park et al. | |
| 2016/0286229 A1 | 9/2016 | Li et al. | |
| 2016/0366416 A1* | 12/2016 | Liu | G06T 7/246 |
| 2016/0376778 A1 | 12/2016 | Fuldseth et al. | |
| 2017/0332097 A1* | 11/2017 | Lee | H04N 19/80 |

FOREIGN PATENT DOCUMENTS

| | | |
|---|---|---|
| EP | 1351510 A1 | 10/2003 |
| EP | 3217663 A1 | 9/2017 |
| KR | 10-1017094 B1 | 2/2011 |
| KR | 10-2012-0005932 A | 1/2012 |
| KR | 10-1215152 B1 | 12/2012 |
| WO | 03/105070 A1 | 12/2003 |
| WO | 2010/039733 A2 | 4/2010 |
| WO | 2016/072775 A1 | 5/2016 |

OTHER PUBLICATIONS

Kamp, Steffen et al., "Decoder-Side Motion Vector Derivation for Block-Based Video Coding," IEEE Transactions on Circuits and Systems for Video Technology, vol. 22, No. 12, 2012 (pp. 1732-1745).

Huang, Bihong. "Second-order prediction and residue vector quantization for video compression.", Universite Rennes 1, 2015 (pp. 1-127).

Rosewarne, C., et al. "High Efficiency Video Coding (HEVC) Test Model 16 (HM 16) Improved Encoder Description Update 7.", Joint Collaborative Team on Video Coding (JCT-VC) of ITU-T SG16 WP3 and ISO/IEG JTC1/SC29/WG11, 2016 (pp. 1-70).

International Search Report issued on Apr. 17, 2018 in counterpart International Application No. PCT/KR2018/000729 (3 pages in English, 4 pages in Korean).

Jianle Chen et al: "Algorithm description 1-5 of Joint Exploration Test Model 4 (JEM4)", 116. MPEG Meeting; Oct. 14, 2016-Oct. 21, 2016; Chengdu; (Motion Picture Expert Group or ISO/IEC JTC1/SC29/WG11), No. n16511 Nov. 21, 2016 (Nov. 21, 2016), pp. 1-39, XP030023183, JVET-D1001 v3.

Extended European search report issued on Jan. 24, 2024 for the corresponding European Patent Application No. 23204054.3.

Office Action issued Nov. 24, 2023 in corresponding U.S. Appl. No. 18/137,495.

* cited by examiner

| conditions | | | MPM candidate 1 | MPM candidate 2 | MPM candidate 3 |
|---|---|---|---|---|---|
| L = A | L = angular prediction mode | | L | L-1 | L+1 |
| | others | | Planar | DC | vertical (angular prediction mode) |
| L ≠ A | L ≠ Planar mode && A ≠ Planar mode | | L | A | Planar |
| | others | L ≠ DC mode && A ≠ DC mode | L | A | DC |
| | | others | L | A | vertical (angular prediction mode) |

FIG. 4

METHOD AND APPARATUS FOR ENCODING/DECODING AN IMAGE SIGNAL

CROSS REFERENCE TO RELATED APPLICATIONS

This application is a divisional of application Ser. No. 17/158,291 filed Jan. 26, 2021, which is a continuation of application Ser. No. 16/478,223 filed on Jul. 16, 2019, which is a U.S. National Stage Application of International Application No. PCT/KR2018/000729, filed on Jan. 16, 2018, which claims the benefit under 35 USC 119 (a) and 365 (b) of Korean Patent Application No. 10-2017-0007349, filed on Jan. 16, 2017, Korean Patent Application No. 10-2017-0007350, filed on Jan. 16, 2017, and Korean Patent Application No. 10-2017-0007351, filed Jan. 16, 2017 in the Korean Intellectual Property Office, the entire disclosures of which are incorporated herein by reference for all purposes.

TECHNICAL FIELD

The present invention relates to an image signal encoding/decoding method and apparatus. More particularly, the present invention relates to an image signal encoding/decoding method and apparatus using hybrid mode as coding mode.

BACKGROUND ART

In recent years, demand for multimedia data such as video has been rapidly increasing on the Internet. However, it is difficult for development of technology for improving channel bandwidths to keep up with the rapid changes in the demand for multimedia data. Therefore, Video Coding Expert Group (VCEG) of ITU-T and Moving Picture Expert Group (MPEG) of ISO/IEC which are international standardization organizations have agreed to establish High Efficiency Video Coding (HEVC) version 1.0 as a new moving picture compression standard.

HEVC defines techniques such as intra prediction, inter prediction, transformation, quantization, entropy coding, and in-loop filtering.

HEVC which is the current moving image compression standard has a problem that accuracy of prediction is relatively low. One of the causes is that only one prediction (intra prediction or inter prediction) can be performed for prediction of one coding block (or one coding unit).

Another cause is that the HEVC allows only AMVP mode, merge mode, and skip mode for inter prediction.

A further cause is that the HEVC allows only planar mode, DC mode, and angular mode for intra prediction.

DISCLOSURE

Technical Problem

The present invention has been made to solve the above-mentioned problems, and an object of the present invention is to provide a method of performing prediction using two or more prediction methods for one coding block.

Another object of the present invention is to provide a method of determining an inter picture prediction mode by taking into account positional characteristics of a prediction block in an inter picture prediction block.

A further object of the present invention is to provide a method of determining an intra prediction mode by taking into account characteristics of location of a prediction block within an intra prediction block.

The technical problems to be solved by the present disclosure are not limited to the above-mentioned ones, and other technical problems which are not mentioned above will be dearly understood from the following description by those skilled in the art.

Technical Solution

According to one aspect of the present disclosure, an image decoding method includes: decoding coding mode information of a current coding block; dividing the current coding block into at least one prediction block; and generating a prediction sample of the at least one prediction block using the decoded coding mode information, in which the coding mode information is information indicating any one mode among intra mode, inter mode, and hybrid mode.

In the image decoding method, when the coding mode information of the current coding block indicates hybrid mode, the current coding block may be divided into a first prediction block and a second prediction block.

In the image decoding method, when the coding mode information of the current coding block indicates hybrid mode, a prediction sample of the first prediction block may be generated using prediction information of at least one neighboring block of the first prediction block, and a prediction sample of the second prediction block may be generated using prediction information derived by one mode among intra prediction mode, inter prediction mode, decoder-side motion information derivation (DMID) mode, and decoder-side intra mode derivation (DIMD) mode.

In the image decoding method, when the coding mode information of the current coding block indicates hybrid mode, prediction information of the second prediction block may be derived by decoding the prediction information of the second prediction block.

In the image decoding method, the DMID mode may be a process of deriving final motion information on the basis of initial motion information derived from a neighboring block of a coding block, and the derived final motion information may be used as prediction information of a prediction block within the coding block.

In the image decoding method, the DIMD mode may be a process of setting a template block from a reconstructed region around a coding block and using an intra prediction mode by which an optimal prediction pixel value of the template block is derived as prediction information of a prediction block within the coding block.

In the image decoding method, the at least one prediction block may be a corner-partitioned portion within the current coding block.

In the image decoding method, when the at least one prediction block is a corner-partitioned portion within the current coding block, diagonal filtering may be performed on pixels adjacent to a corner boundary of a prediction block.

According to one aspect of the present invention, an image encoding method includes: dividing a current coding block into at least one prediction block; and generating a prediction sample of the at least one prediction block using coding mode information of the current coding block, in which the coding mode information is information indicating any one mode among intra mode, inter mode, and hybrid mode.

In the image encoding method, when the coding mode information of the current coding block indicates hybrid mode, the current coding block may be divided into a first prediction block and a second prediction block.

In the image encoding method, when the coding mode information of the current coding block indicates hybrid mode, a prediction sample of the first prediction block may be generated using prediction information of at least one neighboring block of the first prediction block, and a prediction sample of the second prediction block may be generated using prediction information derived by one mode among intra prediction mode, inter prediction mode, decoder-side motion information derivation (DMID) mode, and decoder-side intra mode derivation (DIMD) mode.

In the image encoding method, when the coding mode information of the current coding block indicates hybrid mode, a prediction mode of the second prediction block may be determined and the prediction mode information of the second prediction block may be encoded.

In the image encoding method, the at least one prediction block may be a corner block partitioned from the current coding block.

In the image encoding method, when the at least one prediction block is a corner block partitioned from the current coding block, diagonal filtering may be performed on pixels adjacent to a corner boundary of a prediction block.

According to one aspect of the present invention, a recording medium contains a bitstream generated by an image encoding method including dividing a current coding block into at least one prediction block; and generating a prediction sample of the at least one prediction block using coding mode information of the current coding block, in which the coding mode information is information indicating any one mode among intra mode, inter mode, and hybrid mode.

According to one aspect of the present invention, an image decoding method includes decoding inter hybrid mode information of a current coding block and generating a prediction sample of a prediction block within the current coding block on the basis of the inter hybrid mode information, in which when the current coding block is encoded in inter hybrid mode, the generating of the prediction sample of the prediction block includes dividing the current coding block into a first prediction block and a second prediction block, deriving motion information of the first prediction block, generating a prediction sample of the first prediction block using the motion information of the first prediction block, deriving motion information of the second prediction block using any one mode among merge mode, AMVP mode, decoder-side motion information derivation (DMID) mode, generating a prediction sample of the second prediction block using the derived motion information of the second prediction block.

In the image decoding method, a prediction mode to be used to derive motion information of the second prediction block may be determined by decoding inter prediction mode information of the second prediction block.

In the image decoding method, the DMID mode may be a process of deriving final motion information on the basis of initial motion information derived from a neighboring block of a coding block and using the derived final motion information as prediction information of a prediction block within the coding block.

In the image decoding method, the dividing of the current coding block into the first prediction block and the second prediction block may be a process of corner-partitioning the current coding block.

In the image decoding method, when the first prediction block and the second prediction block to are corner-partitioned portions within the current coding block, diagonal filtering may be performed on pixels adjacent to a corner boundary of the first prediction block.

According to one aspect of the present invention, an image encoding method indudes encoding inter hybrid mode information of a current coding block and generating a prediction sample of a prediction block within the current coding block on the basis of the inter hybrid mode information, in which when the current coding block is encoded in inter hybrid mode, the generating of the prediction sample of the prediction block includes dividing the current coding block into a first prediction block and a second prediction block, deriving motion information of the first prediction block, generating a prediction sample of the first prediction block using the motion information of the first prediction block, deriving motion information of the second prediction block using any one mode among merge mode, AMVP mode, decoder-side motion information derivation (DMID) mode, generating a prediction sample of the second prediction block using the derived motion information of the second prediction block.

In the image encoding method, a prediction mode used to derive motion information of the second prediction block may be determined on the basis of inter prediction mode information of the second prediction block.

In the image encoding method, the DMID mode may be a process of deriving final motion information on the basis of initial motion information derived from a neighboring block of a coding block and using the derived final motion information as motion information of a prediction block within the coding block.

In the image encoding method, the dividing of the current coding block into the first prediction block and the second prediction block may be a process of corner-partitioning the current coding block.

In the image encoding method, when the first prediction block and the second prediction block are corner-partitioned portions within the current coding block, diagonal filtering may be performed on pixels adjacent to an edge boundary of the first prediction block.

According to one aspect of the present invention, a recording medium contains a bitstream generated by an image encoding method including: encoding inter hybrid mode information of a current coding block and generating a prediction sample of a prediction block within the current coding block on the basis of the inter hybrid mode information, in which when the current coding block is encoded in inter hybrid mode, the generating of the prediction sample of the prediction block includes dividing the current coding block into a first prediction block and a second prediction block, deriving motion information of the first prediction block using merge mode, generating a prediction sample of the first prediction block using the derived motion information of the first prediction block, deriving motion information of the second prediction block using any one mode among merge mode, AMVP mode, decoder-side motion information derivation (DMID) mode, generating a prediction sample of the second prediction block using the derived motion information of the second prediction block.

According to one aspect of the present invention, an image decoding method includes decoding inter hybrid mode information of a current coding block and generating a prediction sample of a prediction block within the current coding block on the basis of the inter hybrid mode information, in which when the current coding block is encoded in inter hybrid mode, the generating of the prediction sample of the prediction block includes dividing the current coding block into a first prediction block and a second prediction block, deriving motion information of the first prediction block, generating a prediction sample of the first prediction block using the motion information of the first prediction block, deriving motion information of the second prediction block using any one mode among merge mode, AMVP mode, decoder-side motion information derivation (DMID) mode, generating a prediction sample of the second prediction block using the derived motion information of the second prediction block.

In the image encoding method, when the DMID mode may be a process of deriving final motion information on the basis of initial motion information derived from a neighboring block of a coding block and using the derived final motion information as prediction information of a prediction block within the coding block.

In the image decoding method, the generating of the prediction sample of the first prediction block may be a process of generating the prediction sample of the first prediction block by using an intra prediction mode of a neighboring block determined according to a predetermined priority among neighboring blocks of the first prediction block as an intra prediction mode of the first prediction block.

In the image decoding method, the generating of the prediction sample of the first prediction block may be a process of generating the prediction sample of the first prediction block by using an intra prediction mode of a neighboring block determined according to neighboring block index information as an intra prediction mode of the first prediction block.

In the image decoding method, the dividing of the current coding block into the first prediction block and the second prediction block may be a process of corner-partitioning the current coding block.

In the image decoding method, when the first prediction block and the second prediction block are corner-partitioned portions within the current coding block, diagonal filtering may be performed on pixels adjacent to an edge boundary of the first prediction block.

According to one aspect of the present invention, an image encoding method includes encoding Inter hybrid mode information of a current coding block and generating a prediction sample of a prediction block within the current coding block on the basis of the inter hybrid mode information, in which when the current coding block is encoded in inter hybrid mode, the generating of the prediction sample of the prediction block includes dividing the current coding block into a first prediction block and a second prediction block, deriving motion information of the first prediction block, generating a prediction sample of the first prediction block using the motion information of the first prediction block, deriving motion information of the second prediction block using any one mode among merge mode, AMVP mode, decoder-side motion information derivation (DMID) mode, generating a prediction sample of the second prediction block using the derived motion information of the second prediction block.

In the image encoding method, the generating of the prediction sample of the first prediction block may be a process of generating the prediction sample of the first prediction block by using an intra prediction mode of a neighboring block determined according to a predetermined priority among neighboring blocks of the first prediction block as an intra prediction mode of the first prediction block.

In the image encoding method, the generating of the prediction sample of the first prediction block may be a process of generating the prediction sample of the first prediction block by using an intra prediction mode of a neighboring block determined according to neighboring block index information as an intra prediction mode of the first prediction block.

In the image encoding method, the dividing of the current coding block into the first prediction block and the second prediction block may be a process of comer-partitioning the current coding block.

In the image encoding method, when the first prediction block and the second prediction block are corner-partitioned within the current coding block, diagonal filtering may be performed on pixels adjacent to an edge boundary of the first prediction block.

According to one aspect of the present invention, a recording medium contains a bitstream generated by an image encoding method including encoding inter hybrid mode information of a current coding block and generating a prediction sample of a prediction block within the current coding block on the basis of the inter hybrid mode information, in which when the current coding block is encoded in inter hybrid mode, the generating of the prediction sample of the prediction block includes dividing the current coding block into a first prediction block and a second prediction block, deriving motion information of the first prediction block, generating a prediction sample of the first prediction block using the motion information of the first prediction block, deriving motion information of the second prediction block using any one mode among merge mode, AMVP mode, decoder-side motion information derivation (DMID) mode, generating a prediction sample of the second prediction block using the derived motion information of the second prediction block.

Advantageous Effects

The present invention can improve the accuracy of prediction by making predictions using two or more prediction methods for a coding block.

The present invention can improve the efficiency of compression by making predictions using two or more prediction methods for a coding block.

The present invention can improve the accuracy of prediction by determining an inter prediction mode taking into account characteristics of the location of a prediction block within a coding block.

The present invention can improve the efficiency of compression by determining an inter prediction mode taking into account characteristics of the location of a prediction block within a coding block.

The present invention can improve the accuracy of prediction by determining an intra prediction mode taking into account characteristics of the location of a prediction block within a coding block.

The present invention can improve the effiaency of compression by determining an intra prediction mode taking into account characteristics of the location of a prediction block within a coding block.

The effects and advantages that can be achieved by the present disclosure are not limited to the ones mentioned above, and other effects and advantages which are not mentioned above but can be achieved by the present disclosure can be clearly understood by those skilled in the art from the following description.

DESCRIPTION OF DRAWINGS

FIG. 4 is a diagram illustrating a method of setting a MPM candidate for intra prediction, according to one embodiment of the present invention;

BEST MODE

Figure 1:
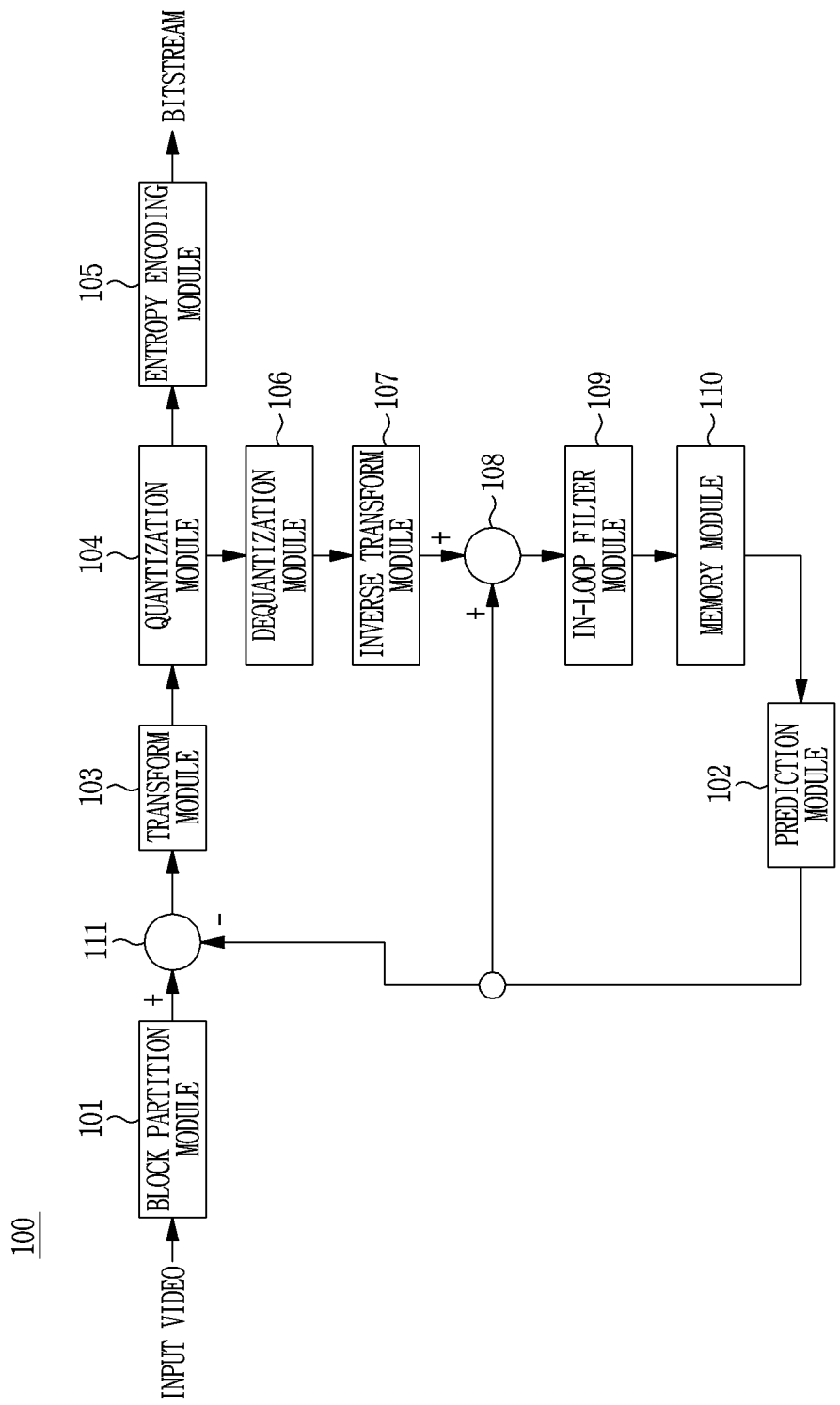
FIG. 1 is a block diagram illustrating an image encoding apparatus according to one embodiment of the present invention.

The present invention may be changed in various ways and may be embodied in many forms. Thus, specific embodiments will be illustrated in the drawings and will be described herein in detail. While specific embodiments of the invention will be described herein below, they are only illustrative purposes and should not be construed as limiting to the present invention. Accordingly, the present invention should be construed to cover not only the specific embodiments but also cover all modifications, equivalents, and substitutions that fall within the sprit and technical scope of the present invention. Throughout the drawings, like elements are denoted by like reference numerals.

Terms used in the specification, "first", "second", etc., may be used to describe various components, but the components are not to be construed as being limited to the terms.

That is, the terms are used to distinguish one component from another component. For example, a first constitutive element may be referred as a second constitutive element, and the second constitutive element may be also referred to as the first constitutive element. Moreover, the term "and/or" indudes any and all combinations of one or more of the associated listed items.

It will be understood that when any element is referred to as being "connected" or "coupled" to another element, one element may be directly connected or coupled to the other element, or an intervening element may be present therebetween. In contrast, it should be understood that when an element is referred to as being "directly coupled" or "directly connected" to another element, there are no intervening elements present.

The terminology used herein is for the purpose of describing particular embodiments only and is not intended to be limiting. As used herein, the singular forms "a", "an", and "the" are intended to include the plural forms as well unless the context dearly indicates otherwise. It will be further understood that the terms "comprises", "includes", or "has" when used in this specification specify the presence of stated features, regions, integers, steps, operations, elements and/or components, but do not preclude the presence or addition of one or more other features, regions, integers, steps, operations, elements, components and/or combinations thereof.

Hereinafter, preferred embodiments of the present invention will be described with reference to the accompanying drawings. Hereinafter, like constitutive elements are denoted by like reference numerals throughout the drawings, and redundant explanations for the same constituent elements will be omitted.

Hereinafter, preferred embodiments of the present invention will be described with reference to the accompanying drawings. Hereinafter, like constituent elements are denoted by like reference numerals throughout the drawings, and redundant explanations for the same constituent elements will be omitted.

FIG. 1 is a block diagram illustrating the configuration of an image encoding apparatus 100 according to one embodiment of the present invention.

The image encoding apparatus 100 functions to encode an image. The image encoding apparatus 100 includes a block partitioning module 101, a prediction module 102, a transform module 103, a quantization module 104, an entropy encoding module 105, a dequantization module 106, an inverse transform module 107, an adder 108, an in-loop filter module 109, a memory module 100, and a subtractor 111.

The block partitioning module may perform block partitioning from the largest coding block down to the smallest coding block. The block may be partitioned by a quad-tree (QT) partition structure or a dual-tree (DT) partition structure. The QT partition structure is a method of splitting a parent block into child blocks that are half the parent block in width and height. The DT partition structure is a method of splitting a parent block into child blocks either width or height of which is half the parent block. The DT partition structure is also called binary tree (BT) partition structure.

The block partitioning module 101 may split an input image into one or more blocks. The input image may vary in size and shape. I.e., the input image may be a picture, a slice, a tile, a segment, or the like. A block means a coding unit (CU), a prediction unit (PU), or a transform unit (TU).

Hereinafter, in embodiments of the present invention, a coding unit is used as a basic unit for performing coding, or as a basic unit for performing decoding. The term "coding unit" may mean a coding block.

The prediction module 102 may include a inter prediction module performing inter prediction and an intra prediction module performing intra prediction. The prediction module 102 may generate a prediction block using neighboring samples around a block (hereinafter, referred to as prediction block) on which prediction is to be immediately performed, within a current original block, or using a previously decoded reference picture. Here, one or more prediction blocks may be generated from one coding block. When one coding block has one prediction block, the coding block and the prediction block are the same. The process in which the prediction module 102 generates a prediction block means the process in which the prediction module 102 generates prediction samples within a prediction block.

Prediction techniques for moving picture signals are largely divided into inter picture prediction and intra picture prediction. The intra picture prediction means a method of generating a prediction block using neighboring samples of a current block and inter picture prediction means a method of generating a prediction block by searching for the most similar block to a current block from a previously encoded/decoded reference picture and then generating a prediction block using the samples within the most similar block. Hereinafter, the inter picture prediction will be simply referred to as inter prediction and the intra picture prediction will be simply referred to as intra prediction.

The prediction module may determine the optimal prediction mode of a prediction block using various techniques such as rate-distortion optimization which is a technique of obtaining a residual block by subtracting a prediction block from a current original block. The RDO cost is calculated using Expression 1 shown below.

$$j(\Phi,\lambda)=D(\Phi)+\lambda R(\Phi) \qquad \text{[Equation 1]}$$

Where D is deterioration attributable to quantization, R is rate of compression stream, J is RD cost, φ is coding mode, and λ is Lagranginan multiplier which is a scale correction coefficient for matching the units of error rate and bit rate. In order for a certain mode to be selected as the optimal coding mode in the encoding process, the mode needs to a smaller J, that is, a smaller RD cost value 211 than the other modes. The equation for calculating a RD cost value takes both a bit rate and an error rate.

Residual values (residual block) between a generated prediction block which is the block generated through prediction and an original block is input to the transform module 103. In addition, prediction mode information, motion vector information, and the like which has been used for the prediction are encoded by the entropy encoding module 105 along with the residual values, and then transmitted to a decoder. When a particular coding mode is used, an original coding block may be directly coded without undergoing a process in which the prediction module 102 generates prediction blocks from the original coding block, and the resulting coded block may be transmitted to the decoder.

The intra prediction module may generate prediction blocks using information of reference pixels around a current coding block, i.e., information of pixels within a current picture. When the coding mode of a neighboring block of a current block to undergo intra prediction is an inter prediction mode, pixels within the neighboring block to which inter prediction has been applied may be replaced with reference pixels within a neighboring block to which intra prediction has been applied. That is, when one or more reference pixels within a specific neighboring block are not available, these unavailable pixels may be replaced with one or more available reference pixels.

For intra prediction, there are directional prediction modes and non-directional prediction modes. In the directional prediction modes, reference pixels to be used are determined depending on a prediction direction. In contrast, in the non-directional prediction modes, direction information is not used. The mode for predicting luminance information may be different from the mode for predicting chrominance information. In order to predict chrominance information, intra prediction mode information which has been used for prediction of luminance information, or predicted luminance signal information may be used.

For intra prediction, a total of N+2 prediction modes including planar mode, DC mode, and N angular prediction modes may be used.

Figure 2:
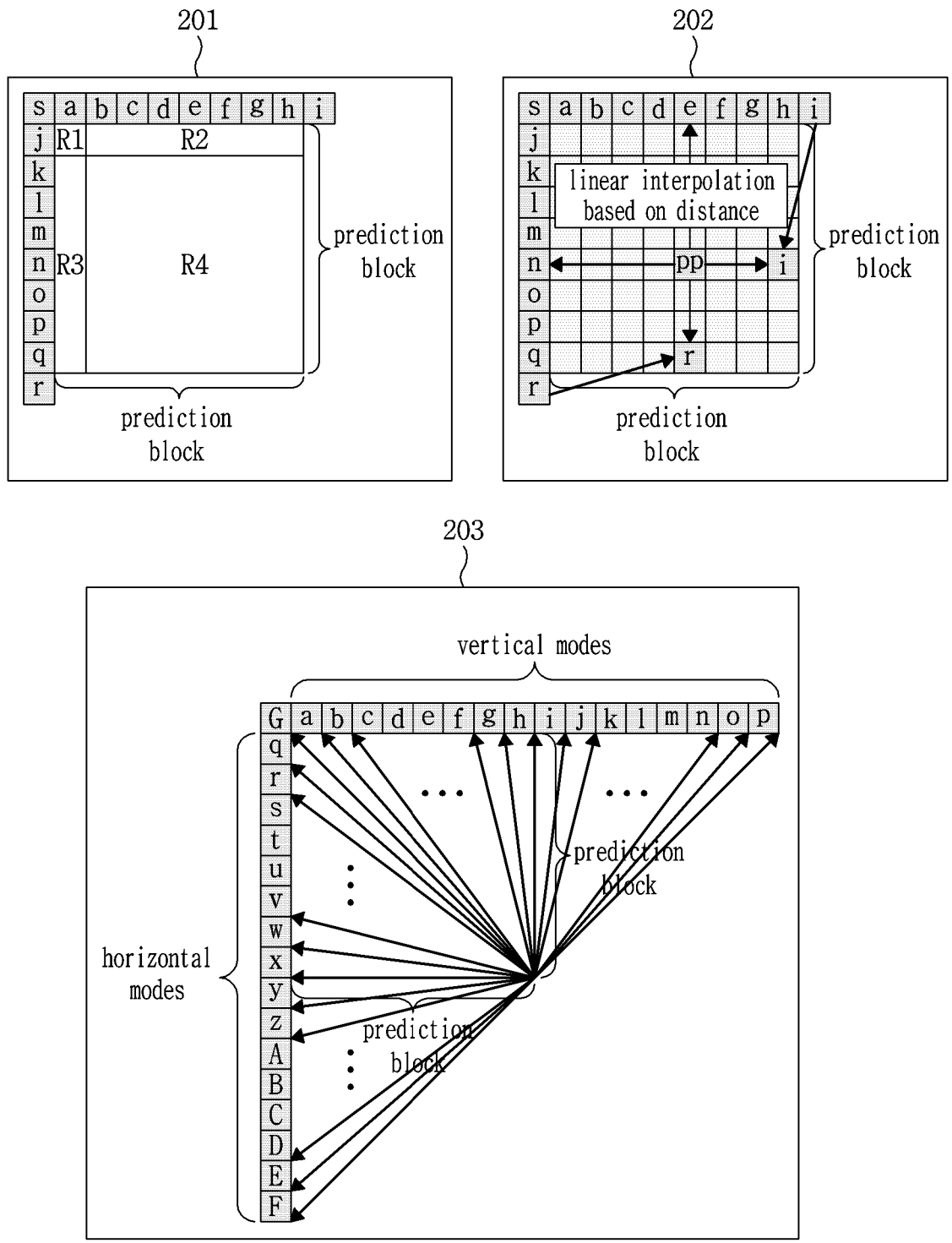
FIG. 2 is a flowchart illustrating an Intra prediction mode according to one embodiment of the present invention.

In FIG. 2, 201 represents a method of generating a prediction block using DC mode.

Referring to 201 of FIG. 2, the average value of the pixel values of "a" through "s" reference pixels is applied to every prediction sample within R1 to R4 regions. Next, a final prediction block is generated such that a final prediction sample within the region R1 is generated by performing FIR filtering with two nearby reference pixels "a" and "j" and a final sample of each pixel within the regions R2 and R3 is generated by FIR filtering with one nearby reference pixel among pixels "b" through "h" and "l" through "q".

In FIG. 2, 202 represents a method of generating a prediction block using planar mode.

Referring to 202 of FIG. 2, in planar mode, a final prediction block is generated by linear interpolation of a top/left reference pixel and a bottom/right copied reference pixel.

In FIG. 2, 203 represents N prediction directions in angular prediction mode.

Referring to 203 of FIG. 2, a final prediction block is generated by applying a nearby reference pixel vale in a prediction direction to a prediction block.

Figure 3:
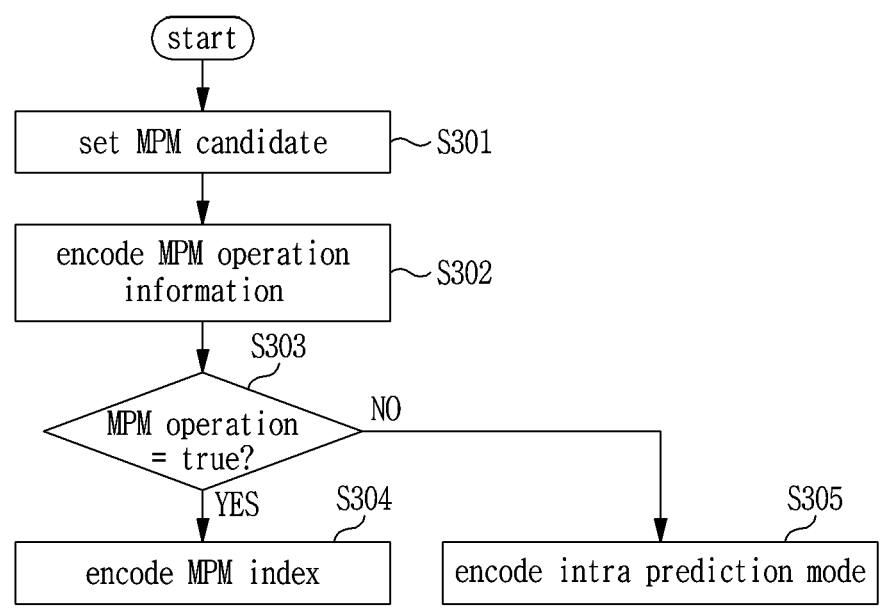
FIG. 3 is a flowchart illustrating a method of encoding the optimal prediction mode of a current prediction block among intra prediction modes.

FIG. 3 is a flowchart illustrating a method of encoding the optimal prediction mode of a current prediction block.

Referring to FIG. 3, in step S301, a most probable mode (MPM) candidate is set. The method of setting an MPM candidate will be described with reference to FIG. 4 below.

In step S302, information indicating whether to encode the optimal intra prediction mode is encoded using MPM.

In step S303, it is determined whether there is MPM operation Information. When the information has a value of true, in step S304, index information indicating which MPM candidate is the same as the optimal intra prediction mode of the current prediction block is encoded. Conversely, when the information has a value of false, in step S305, information indicating which intra prediction mode among intra prediction modes except for the intra prediction mode the same as the MPM candidate is optimal may be encoded.

FIG. 4 is a diagram illustrating a method of setting an MPM candidate according to one embodiment of the present invention.

In FIG. 4, L represents the intra prediction mode information of a neighboring block located to the left part of a current prediction block, and A represents the intra prediction mode information of a neighboring block located to the top part of the current prediction block.

Referring to FIG. 4, three MPM candidates may be finally determined according to each of the specified conditions.

The number of MPM candidates may be set to P (P is an integer greater than 0, P>0)), and MPM candidates may be determined in various ways.

Referring to FIG. 1, the inter prediction module of the prediction module 102 may generate a prediction block using information on either one or both of the preceding picture and the subsequent picture of a current picture. In some cases, the prediction block may be generated using information on a previously encoded region within a current picture. The inter prediction module 103 may include a reference picture interpolation unit, a motion prediction unit, and a motion compensation unit.

For inter prediction, an inter prediction mode such as AMVP mode, merge mode, or skip mode may be used.

Hereinafter, the AMVP mode among the inter prediction modes will be described with reference to FIGS. 5 to 7.

In AMVP mode, AMVP candidates may be set from prediction information of neighboring blocks of a current prediction block.

Figure 5:
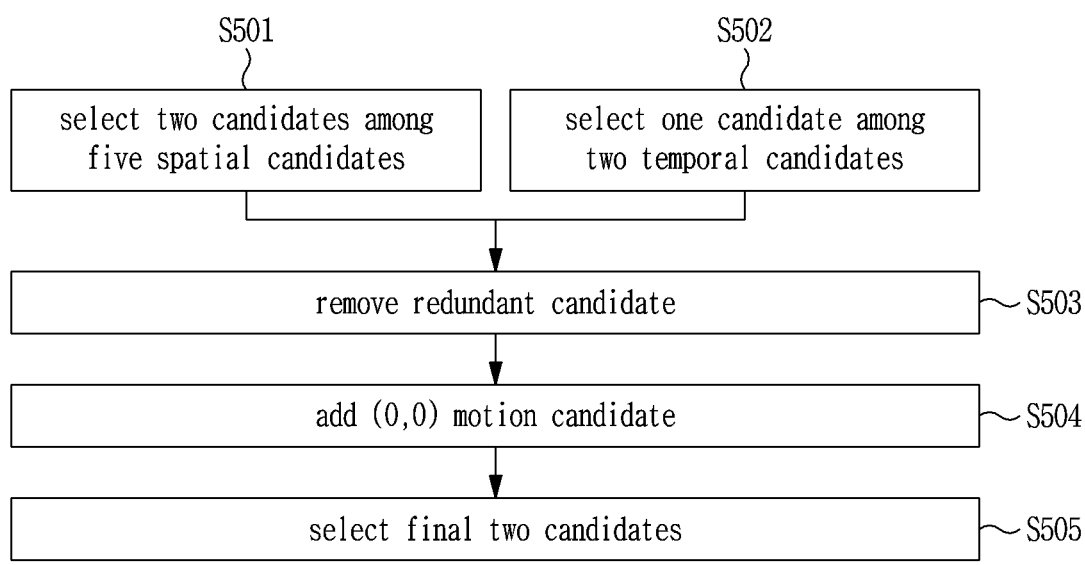
FIG. 5 is a flowchart illustrating a method of setting an AMVP candidate for inter prediction, according to one embodiment of the present invention.
Figure 6:
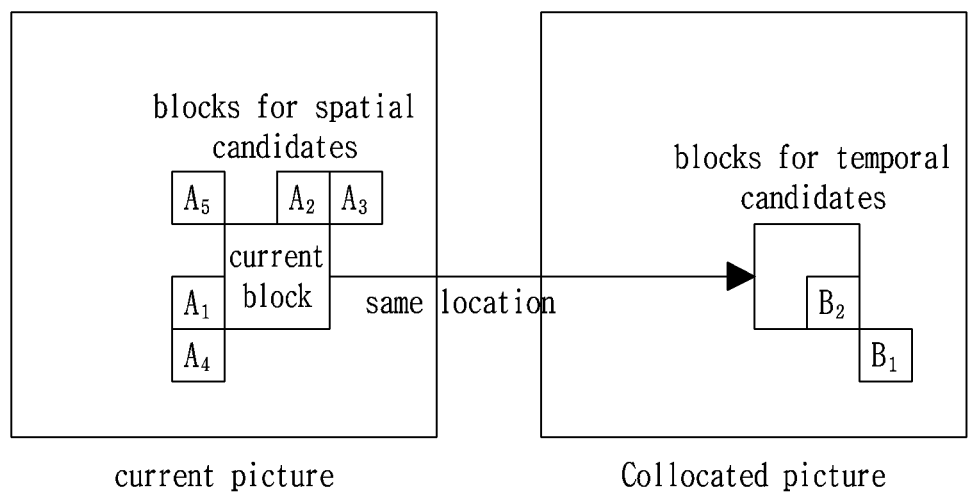
FIG. 6 is a diagram showing locations of neighboring blocks of a current prediction block.

FIG. 5 is a flowchart illustrating a method of setting AMVP candidates and FIG. 6 is a diagram showing locations of neighboring blocks of a current prediction block.

Referring to FIG. 5, in step S501, two spatial candidates may be derived from neighboring blocks of a current prediction block. Specifically, one of the two spatial candidates is derived from an earlier available neighboring block among A1 and A4 which are scanned in this order, and the other one is derived from an earlier available neighboring block from among A3, A2, and A5 which are scanned in this order in FIG. 6.

In step S502, to select two temporal candidates, neighboring blocks are scanned in order of B1→B2 in FIG. 6, and then one earlier available candidate is selected. Next, the method of deriving motion information of the temporal candidates will be described later with reference to FIG. 7.

In step S503, redundant candidates among the spatial candidates derived in step S501 and the temporal candidates derived in step S502 may be removed.

In step S504, when the number of candidates that have been derived until this time is smaller than the number of final AMVP candidates, (0, 0) motion information may be added. Here, the number of final AMVP candidates can also be determined in various ways.

In step S505, two derived AMVP candidates are finally selected. Among the two derived AMVP candidates, one final AMVP candidate with the lowest RD cost is determined through a RDO process. Then, a motion estimation process is performed starting from a point indicated by the motion vector of the final AMVP candidate, thereby identifying the optimal motion vector through motion estimation.

The number of AMVP candidates may be set to Q (Q is an integer greater than 0, Q>0)), and AMVP candidates may be determined in various ways.

Figure 7:
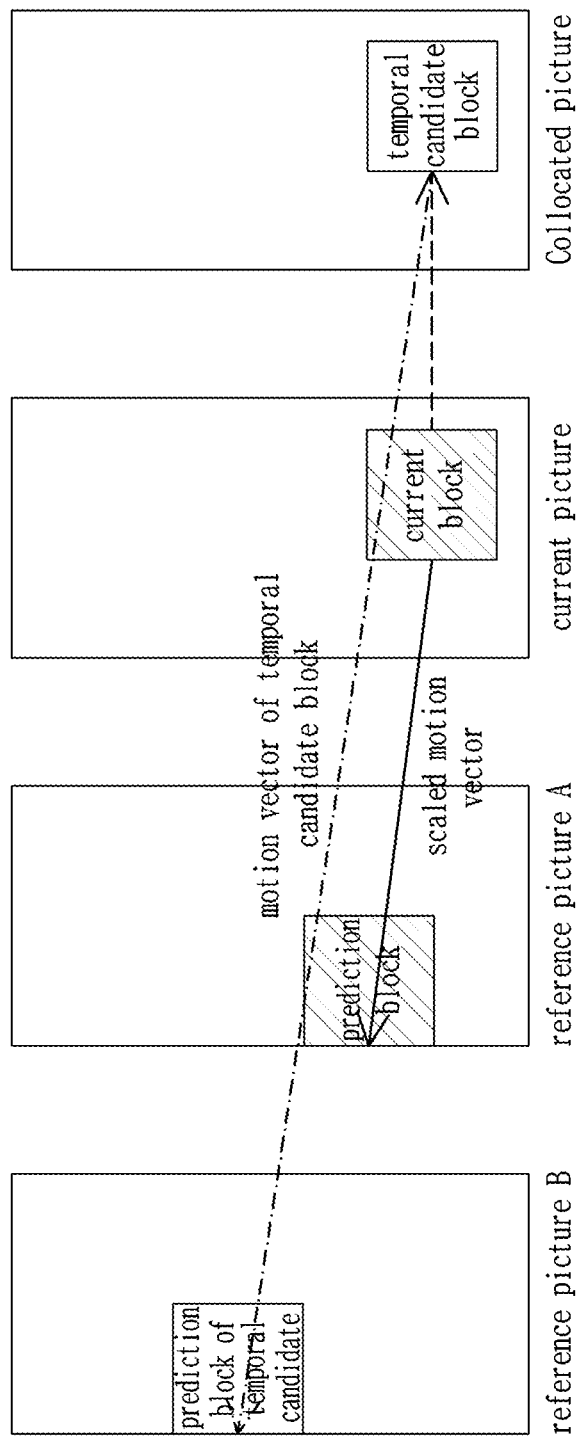
FIG. 7 is a diagram illustrating a method of deriving motion information of a temporal candidate.

FIG. 7 is a diagram illustrating a method of deriving motion information of a temporal candidate.

Referring to FIG. 7, motion information of a temporal candidate block may be searched for from a block within a collocated picture, the block being located at the same position as a current block of a current picture. The motion vector of the motion information indicates a prediction block in a reference picture B. A scaled motion vector may be derived by calculating the temporal distance (for convenience in description, referred to as a first temporal distance) between the reference picture B and the collocated picture and then scaling the first temporal distance to match the temporal distance (for convenience in description, referred to as a second temporal distance) to a reference picture A referred to by the current picture. Here, the scaled motion vector may be used as motion information of a temporal candidate. The reference picture A and the reference picture B may be the same picture.

Hereinafter, merge mode among the inter prediction modes will be described with reference to FIG. 8.

In merge mode, merge candidates may be set using prediction Information of neighboring blocks of a current prediction block.

Figure 8:
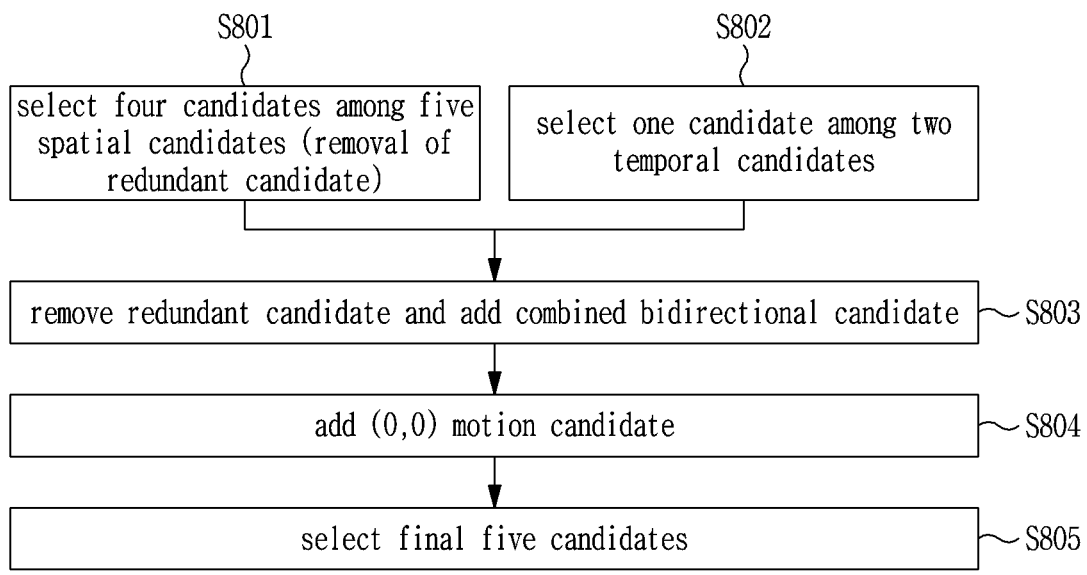
FIG. 8 is a flowchart illustrating a method of selecting a candidate for merge mode from among inter prediction modes, according to one embodiment of the present invention.

FIG. 8 is a flowchart illustrating a method of setting merge candidates.

Referring to FIG. 8, in step S801, to derive spatial candidates, five blocks A1 through A5 in FIG. 6 are scanned in order of A1→A2→A3→A4→A5, and earlier four available candidates are selected.

In step S802, the temporal candidate is derived in the same manner as step S502 of FIG. 5.

In step S803, redundant candidates among the candidates that have been derived until this time are removed and combined bidirectional candidates are added. The combined bidirectional candidate is a combination of bidirectional motion information based on previously determined candidate motion information.

In step S804, when the number of candidates that have been derived until this time is smaller than the number of final merge candidates, (0, 0) motion information may be added. Here, the number of final merge candidates can also be determined in various ways. Herein, the number is assumed to be five.

In step S805, five candidates among the derived candidates are determined as the final merge candidates. Among the five derived merge candidates, the merge candidate having optimal motion information for the current prediction block may be determined through the RDO process.

The number of merge candidates may be set to R (R is an integer greater than 0, R>0)), and merge candidates may be determined in various ways.

Figure 9:
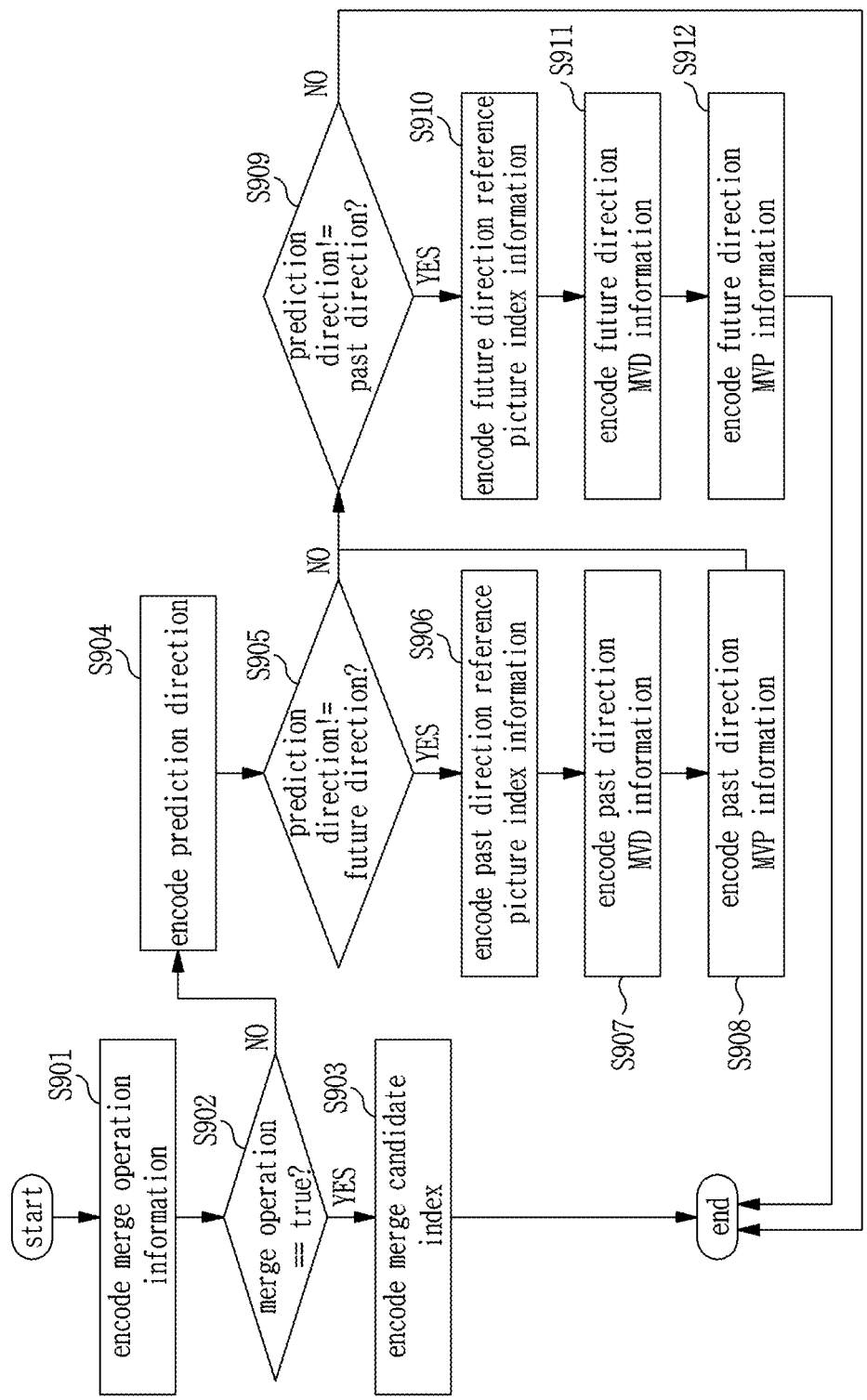
FIG. 9 is a flowchart illustrating a method of encoding information of inter prediction mode, according to one embodiment of the present invention.

FIG. 9 is a flowchart illustrating a method of encoding inter prediction mode information, according to one embodiment of the present invention;

Referring to FIG. 9, merge operation information is encoded in step S901.

In step S902, whether to perform merge operation is determined on the basis of merge operation information.

When the merge operation information has a value of true, the index information of the merge candidate is encoded in step S903, and the flow of FIG. 9 ends. When the merge operation information has a value of false, the prediction direction is encoded in step S904. The prediction direction may be encoded into one of three direction types: bidirectional, past direction, and future direction.

In step S905, whether the prediction direction is future direction or not is determined. When the prediction direction is not future, direction, the reference picture Index information for the past direction is encoded in step S906, and the past direction MVD information is encoded in step S907. Here, MVD is an abbreviation of motion vector difference which is information indicating the difference between the past-direction optimal motion vector of the current prediction block and the motion vector of the optimal to AMVP candidate in the past direction.

In step S908, the past MVP information is encoded. MVP is an abbreviation of motion vector predictor which indicates the optimal AMVP candidate among the two final AMVP candidates.

In step S909, whether the prediction direction past or not is determined. When the prediction direction is not past, the reference picture index information for the future direction is encoded in step S910, and the future direction MVD information is encoded in step S911. In step S912, the future direction MVP information is encoded.

Next, the skip mode of inter prediction will be described.

In the skip mode, the motion information of a neighboring block of a current prediction block may be directly applied to the current prediction block as it is. In the skip mode, a prediction sample of a current prediction block is generated using motion information of a neighboring block, and the prediction sample is used as a reconstruction sample as it is. That is, in the skip mode, generation of a residual block is omitted.

The prediction module 102 determines a neighboring block whose motion information is to be used as motion information of a current block when skip mode is used.

In addition, the prediction module 102 may encode coding mode information indicating the prediction mode of a coding block. As described above, a coding block may be divided into at least one prediction block, and the same prediction method may be used for the prediction block(s) generated from one encoding block. However, the prediction mode that can be used for the prediction blocks generated from one coding block may vary for each prediction block.

For example, when a current coding block is encoded through inter prediction, prediction sample of a first prediction block in the current coding block may generate using AMVP mode and prediction samples of a second prediction block may be generated using merge mode.

That is, the coding mode information may be encoded on a per coding block basis, and the prediction mode information may be encoded on a per prediction block basis.

Referring back to FIG. 1, the transform module 103 transforms a residual block which is the difference between an original block and a prediction block to generate a transform block. Here, the transform block may be the smallest size (basic unit) used for the transform and quantization process.

The transform module 103 transforms a residual signal into a frequency domain to generate a transform block having transform coefficients. Here, a variety of transform techniques such as discrete cosine transform (DCT), discrete sine transform (DST), and Karhunen_Loeve transform (KLT) may be used as a method of transforming a residual signal into a frequency domain. Through this process, the residual signal is transformed into the frequency domain. Thus, transform coefficients are generated. In order to use the transform technique, a matrix operation is performed using a basis vector. Depending on a prediction mode in which a prediction block is encoded, a variety of transform techniques may be used in matrix operation. For example, discrete cosine transform may be used for a horizontal direction operation and discrete cosine transform may be used for a vertical direction operation, depending on the intra prediction mode when intra prediction is performed.

In this case, a transform method to be used is determined depending on the intra prediction mode used to generate a residual block of a prediction block. For example, in a certain intra prediction mode, DCT may be used for the horizontal direction and DST may be used for the vertical direction.

For each coding block, the transform block may be divided by the quad tree (QT) scheme or the binary tree (BT) to determine an optimal transform block partition type. Then, the transform block partition information may be transmitted to the image decoding apparatus 1000. Such a transform block dividing method may be referred to as a CU-based residual tree (RU) structure. This means that the transform may be performed in units of a size other than a prediction block and that a transform block may be determined regardless of the boundary of a prediction block.

The transform block partitioning method is determined to be the QT partition scheme or the BT partition scheme on a per prediction block basis, and transform block partition information may be transmitted to the image decoding apparatus 100 on a per transform block basis. This transform block partitioning method may be referred to as a PU-based residual tree (RU) structure. This means that transform blocks cannot be generated through partitioning across the boundary of a prediction block. That is, a transform block cannot extend over the boundary of a prediction block.

In the case of the CU-based RT structure, the transform block partition information may not be transmitted. That is, transform may be performed on the entire coding block by determining the entire coding block as a transform block. A similar process is also possible for the PU-based RT structure.

The quantization module 104 may quantize a transform block to generate a quantized transform block. That is, the quantization module 104 may quantize the transform coefficients of the transform block generated by the transform module 103 to generate a quantized transform block having the quantized transform coefficients. For quantization, the dead zone uniform threshold quantization (DZUTQ) or the quantization weighted matrix may be used. Alternatively, a quantization method improved from those quantization methods may be used.

Although the image encoding apparatus 100 including both the transform module 103 and the quantization module 104 is illustrated and has been described above, the transform module 103 and the quantization module 104 may be selectively included. That is, the image encoding apparatus 100 may perform only a transform process of transforming a residual block to generate a transform block but may not perform a quantization process. Alternatively, the image encoding apparatus 100 may not perform a transform process of transforming a residual block into frequency coefficients but may perform only a quantization process. Further alternatively, the image encoding apparatus 100 may perform neither the transform process nor the quantization process.

Even in the case where the image encoding apparatus 100 may perform neither the transform process nor the quantization process, a block input to the entropy encoding module 105 is called a quantized transform block.

The entropy encoding module 105 encodes the quantized transform block to generate a bitstream. The entropy encoding module 105 encodes the coefficients of the quantized transform block output from the quantization module 104 using a variety of encoding techniques, thereby generating and outputting a bitstream including auxiliary information (for example, information on prediction mode, quantization coefficients, etc.) required for decoding of the encoded blocks in an image decoding apparatus to be described below as well as the encoded image signal.

For entropy encoding, various encoding methods such as exponential-Golomb, context-adaptive variable length coding (CAVLC) and context-adaptive binary arithmetic coding (CABAC) can be used.

The dequantization module 106 performs dequantization (the reverse process of the quantization) on the quantized transform block to obtain a dequantized transform block (reconstruction process). Here, the quantization and the dequantization are the same technique but are opposite in the process sequence.

The Inverse transform module 107 uses a method the same as the method used in the transform process to inverse-transform the dequantized transform block, thereby reconstructing the residual block. The transform and the inverse transform are the same technique but are opposite in the process sequence.

The dequantization module 106 and the inverse transform module 107 perform the reverse sequence of the quantization and the transform used in the quantization module 104 and the transform module 103, respectively. When only the quantization is performed at an earlier stage (i.e., by the transform module 103 and the quantization module 104), only the dequantization may be performed at a later stage (i.e., by the inverse transform module and the dequantization module). That is, the inverse transform may not be performed in this case. When neither the transform or the quantization is performed at an earlier stage, neither the inverse transform nor the dequantization is performed by the inverse transform module 107 and the dequantization module 106 in the image decoding apparatus 100. It is also possible that the image decoding apparatus 100 does not include the dequantization module 106 and the inverse transform module 107 in this case.

The adder 108 adds the residual signal (residual block) output from the inverse transform module 107 to the prediction signal (prediction block) generated through the prediction process, thereby reconstructing a current block.

The in-loop filter 109 optionally filters the entire picture after all of the blocks within the current picture are reconstructed. The in-loop filter 109 includes at least one filter among a deblocking filter, a sample adaptive offset (SAO), and an adaptive loop filter (ALF).

The deblocking filter removes block artifacts caused by the boundary between blocks within a reconstructed picture. When determining whether to perform deblocking, it is possible to determine whether to perform deblocking on a current block on the basis of several pixel rows and columns included in the current block. When performing deblocking, a strong filter or a weak filter may be used according to a deblocking filtering strength required. When performing horizontal filtering and vertical filtering by using a deblocking filter, the vertical filtering and the horizontal filtering may be performed in parallel.

Sample adaptive offset (SAO) means a process of minimizing the difference between the reconstructed picture and the original picture by adding or subtracting a predetermined value to the reconstructed pixels.

Adaptive loop filtering (ALF) is performed on the basis of the results of comparison between the filtered reconstructed picture and the original picture. Pixels within a picture may be grouped into a plurality of pixel groups, and filtering may be differently performed on each pixel group. the information indicating whether to apply the ALF may be transmitted on a per coding unit (CU) basis. The shape and the filter coefficient of the ALF filter to be used may differ block by block. Alternatively, the same type of ALF filter may be used, regardless of the characteristics of target blocks to be filtered.

The memory module 110 stores the reconstructed current block that is generated through the addition of the residual signal output from the inverse transform module 107 and the prediction signal and through the optional filtering by the in-loop filter module 109. The stored reconstructed current block is used for prediction of the next block or the next picture.

The adder 111 may generate the reconstructed block based on the current original block and the predicted block.

Figure 10:
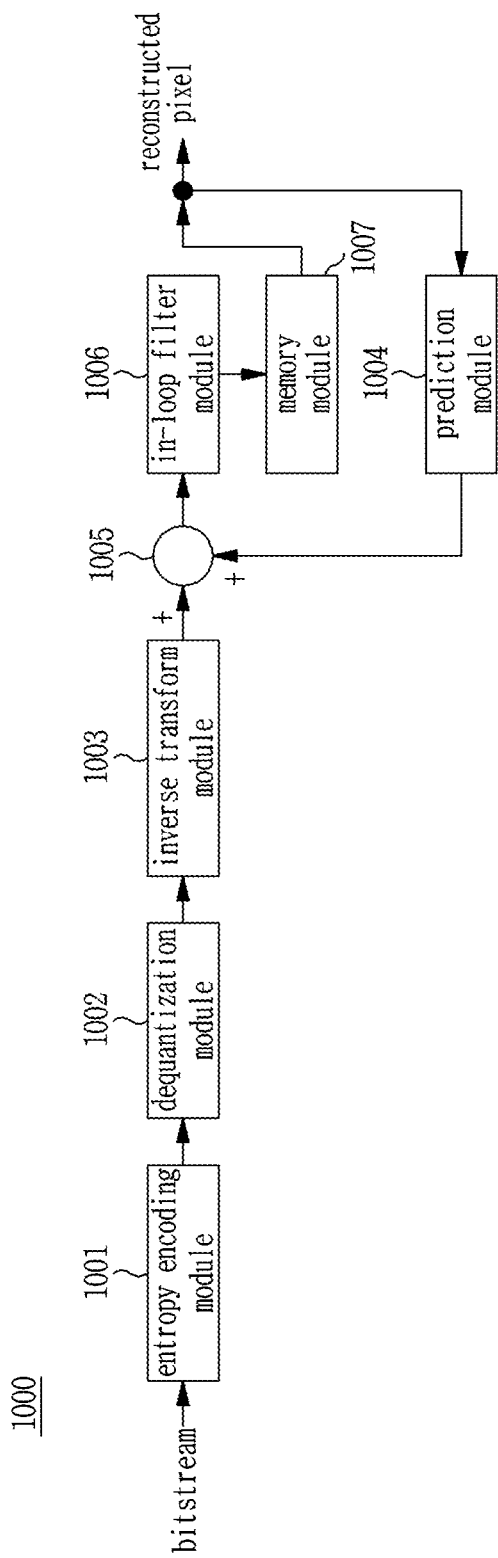
FIG. 10 is a block diagram of an image decoding apparatus according to one embodiment of the present invention.

FIG. 10 is a block diagram illustrating an image encoding apparatus 1000 according to an embodiment of the present invention.

Referring to FIG. 10, the image decoding apparatus 1000 includes an entropy decoding module 1001, a dequantization module 1002, an inverse transform module 1003, a prediction module 1004, an adder 1005, an in-loop filter module 1004, and a memory module 1007.

When a bit stream generated by the image encoding apparatus 100 is input to the image decoding apparatus 1000, the input bit stream is decoded by undergoing the operations performed by the image encoding apparatus 100 in reverse. The term "coding block" used to describe the encoding process performed by the image encoding apparatus 100 will be referred to as "decoding block" to describe the decoding process performed by the image decoding apparatus 1000.

The entropy decoding module 1001 parses a bitstream transmitted from the image encoding apparatus 100 and obtains quantized transform coefficients and a variety of information required for decoding of a block.

The entropy decoding module 1001 performs entropy decoding which is reverse in procedure to the entropy encoding performed by the entropy encoding module 105 of the image encoding apparatus 100. For example, one of a method among various methods such as exponential-Golomb, context-adaptive variable length coding (CAVLC) and context-adaptive binary arithmetic coding (CABAC) may be used depending on the encoding method used in the image encoding apparatus. In the entropy decoding module 1001, the coefficients in a transform block may be decoded sub-block by sub-block in the transform block. The decoding may be performed using various flags representing a coefficient other than zero, a coefficient having the absolute value greater than 1 or 2, a sign of each coefficient, etc. A coefficient that cannot be represented only by a flag is decoded by summing a coefficient represented by a flag and a signaled coefficient.

In addition, the entropy decoding module 100 may decode information associated with intra prediction and inter prediction performed in the image encoding apparatus.

The dequantization module 1002 performs the same process as the quantization technique used for quantization, in reverse, on the quantized transform coefficients decoded by the entropy decoding module 1001, to obtain a dequantized transform block having dequantized coefficients. The dequantization module 1002 operates substantially in the same way as the dequantization module 106 of FIG. 1.

The inverse transform module 1003 performs the same process as the transform technique used for transformation of the current coding block, in reverse, on the dequantized transform block, to obtain a residual block, i.e., residual signal. The inverse transform module 1003 operates substantially in the same way as the inverse transform module 107 of FIG. 1.

The prediction module 1004 generates a prediction block using coding mode information that is decoded by the entropy decoding module 1001. Alternatively, the prediction module 1004 may generate a prediction block using the same prediction method used by the prediction module 102 of the image encoding apparatus 100.

Figure 11:
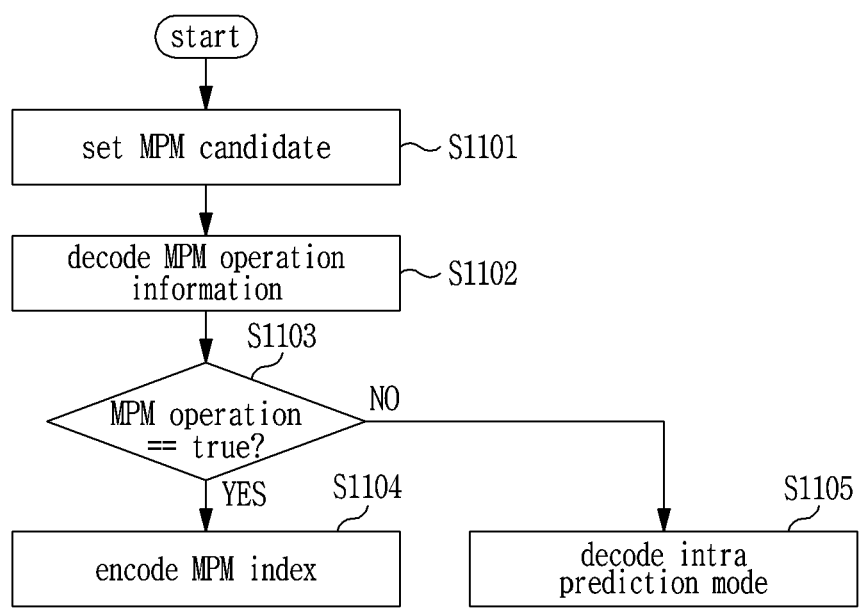
FIG. 11 is a flowchart illustrating a method of decoding optimal intra prediction mode for a current prediction block.

FIG. 11 is a flowchart illustrating a method of decoding the optimal intra prediction mode for a current prediction block.

Referring to FIG. 11, in step S1101, a most probable mode (MPM) candidate is set. A method of setting the MPM candidate may be the same as the MPM candidate setting method of FIG. 3 that is performed by the prediction module 102 of the image encoding apparatus 100.

In step S1102, information indicating whether the intra prediction mode is encoded using MPM is decoded.

In step S1103, whether there is MPM operation information is determined on the basis of the information decided in step S1102. When the information is true, in step S1104, index information indicating which MPM candidate is the same as the intra prediction mode is decoded to determine the optimal intra prediction mode of the current prediction block. Conversely, when the information is false, in step S1105, information indicating which intra prediction mode among intra prediction modes excluding the intra prediction mode the same as the MPM candidate is optimal is decoded to determine the intra prediction mode of the current prediction block.

Figure 12:
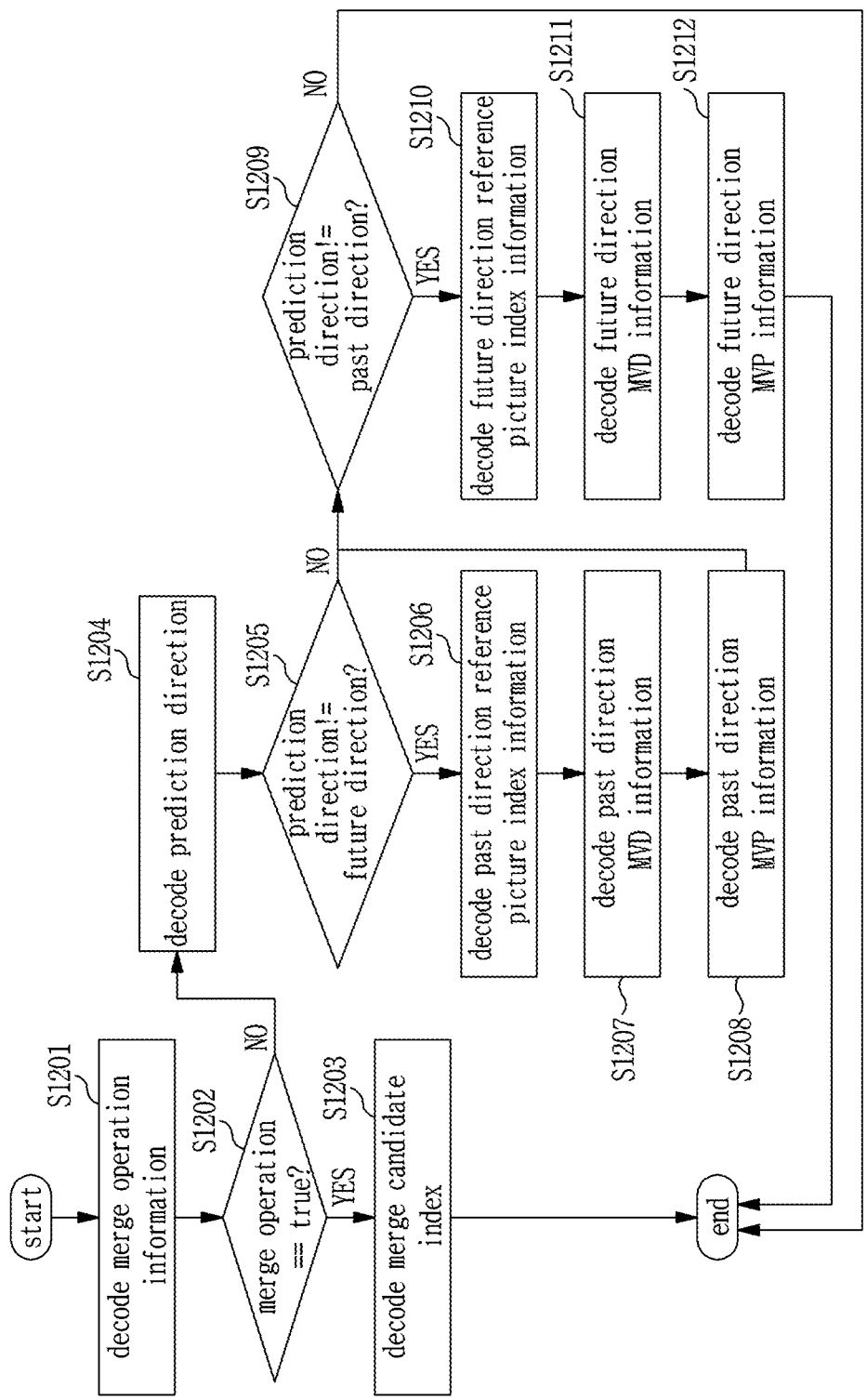
FIG. 12 is a flowchart illustrating a method of decoding information of inter prediction mode, according to one embodiment of the present invention.

FIG. 12 is a flowchart illustrating a method of decoding information of inter prediction mode, according to one embodiment of the present invention.

Referring to FIG. 12, the merge operation information is decoded in step S1201.

In step S1202, whether to perform merge operation is determined on the basis of the merge operation information that is decoded in step S1201.

When the merge operation information has a value of true, index information of the merge candidate is decoded in step S1203, and the flow of FIG. 12 ends. When the merge operation information indicates has a value of false, the prediction direction is decoded in step S1204. The prediction direction may be decoded into one of three direction types: bidirectional, past direction, and future direction.

In step S1205, whether the prediction direction is future direction is determined. When the prediction direction is not future direction, the reference picture index information for the past direction is decoded in step S1206, and the past direction MVD information is decoded in step S1207.

In step S1208, the past direction MVP information is decoded.

In step S1209, whether or not the prediction direction is past direction is determined. When the prediction direction is not past direction, the reference picture index information for the future direction is decoded in step S1210, and the future direction MVD information is decoded in step S1211. In step S1212, future direction MVP information is decoded.

Referring back to FIG. 10, the adder 1005 adds the prediction block generated by the prediction module 1004 and the residual block generated by the inverse transform module 1004, thereby generating a reconstructed block.

The in-loop filter 1006 module optionally filters the entire picture area after all of the blocks within the current picture are decoded. The in-loop filter module 1006 includes a deblocking filter and a sample adaptive offset (SAO). Information on whether or not a deblocking filter has been applied to the corresponding block or picture is received from the image encoding apparatus 100. When a deblocking filter is applied, information on whether a strong fitter is applied or a weak filter is applied is received from the image encoding apparatus 100. The in-loop filter module 1006 operates substantially in the same way as the in-loop filter of FIG. 1.

The memory module 1007 stores the reconstructed current block that is generated through the addition of the residual signal output from the inverse transform module 1003 and the prediction signal to and through the optional filtering by the in-loop filter module 1006. The stored reconstructed current block is used for prediction of the next block or the next picture.

As described above, for convenience of description of embodiments of the present invention, the term "coding unit" refers to both a basic unit for encoding and a basic unit for decoding. The units or blocks are elements segmented from a picture. In the embodiments of the present invention, the unit and the block are interchangeably used, and the current coding block means a target block to be immediately encoded or decoded.

Hereinafter, a method of dividing a coding block will be described in detail with reference to FIGS. 13 to 15.

Figure 13:
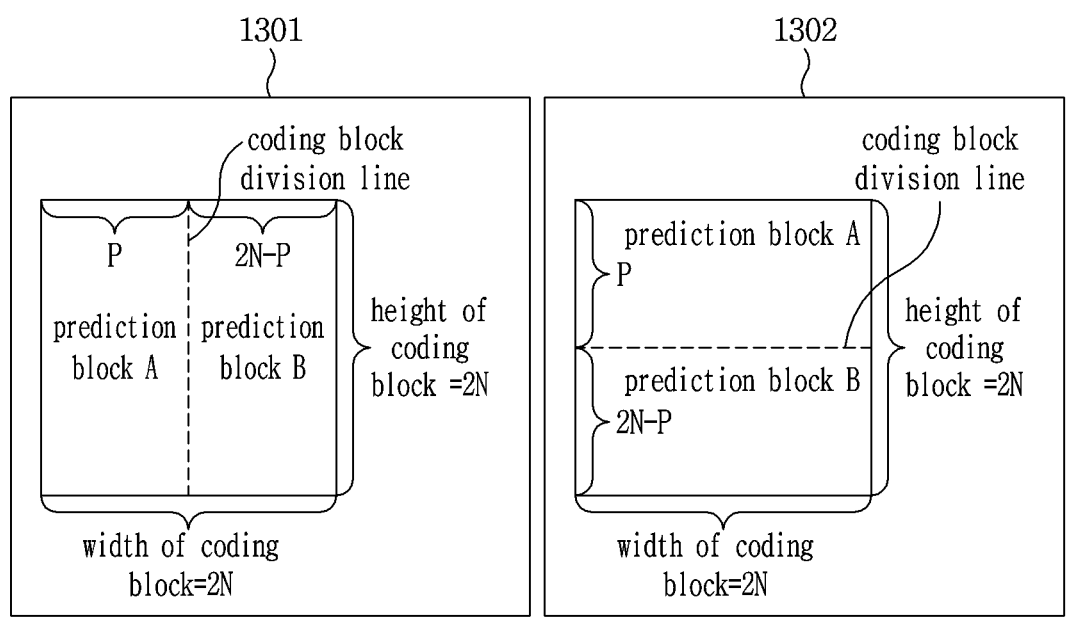
FIG. 13 is a diagram illustrating a first method of dividing a current coding block.

FIG. 13 is a diagram illustrating a first method of dividing a current coding block.

Referring to FIG. 13, a coding block may be divided into smaller square or rectangular coding blocks. In FIG. 13, 1301 is a vertical partition line by which a coding block is divided into left and right halves and 1302 is a horizontal partition line by which a coding block is divided into upper and lower halves. Prediction blocks A and B within a coding block may undergo prediction in that order. A dotted line within the coding block is a block partition line that is a boundary between prediction blocks. In FIG. 13, the block partition lines 1301 and 1302 are used to divide a coding block in various ways, including a way of dividing a coding block into halves.

There are two methods of determining an optimal block partition type. First, an RD cost is calculated for each block partition type while varying the value of P from 1 to 2N-1 in a horizontal direction and a vertical direction, and the block partition type having the least RD cost is determined as the optimal block partition type.

Figure 14:
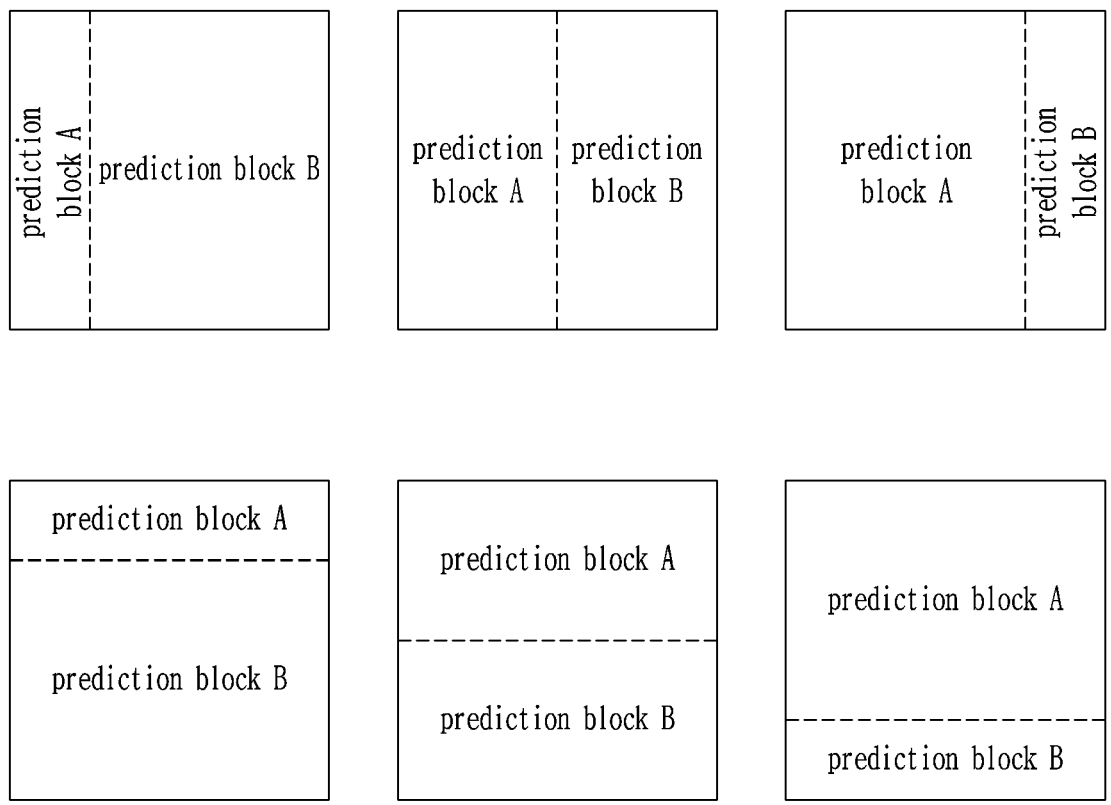
FIG. 14 and FIG. 15 are diagrams illustrating a second method of dividing a current coding block.
Figure 15:
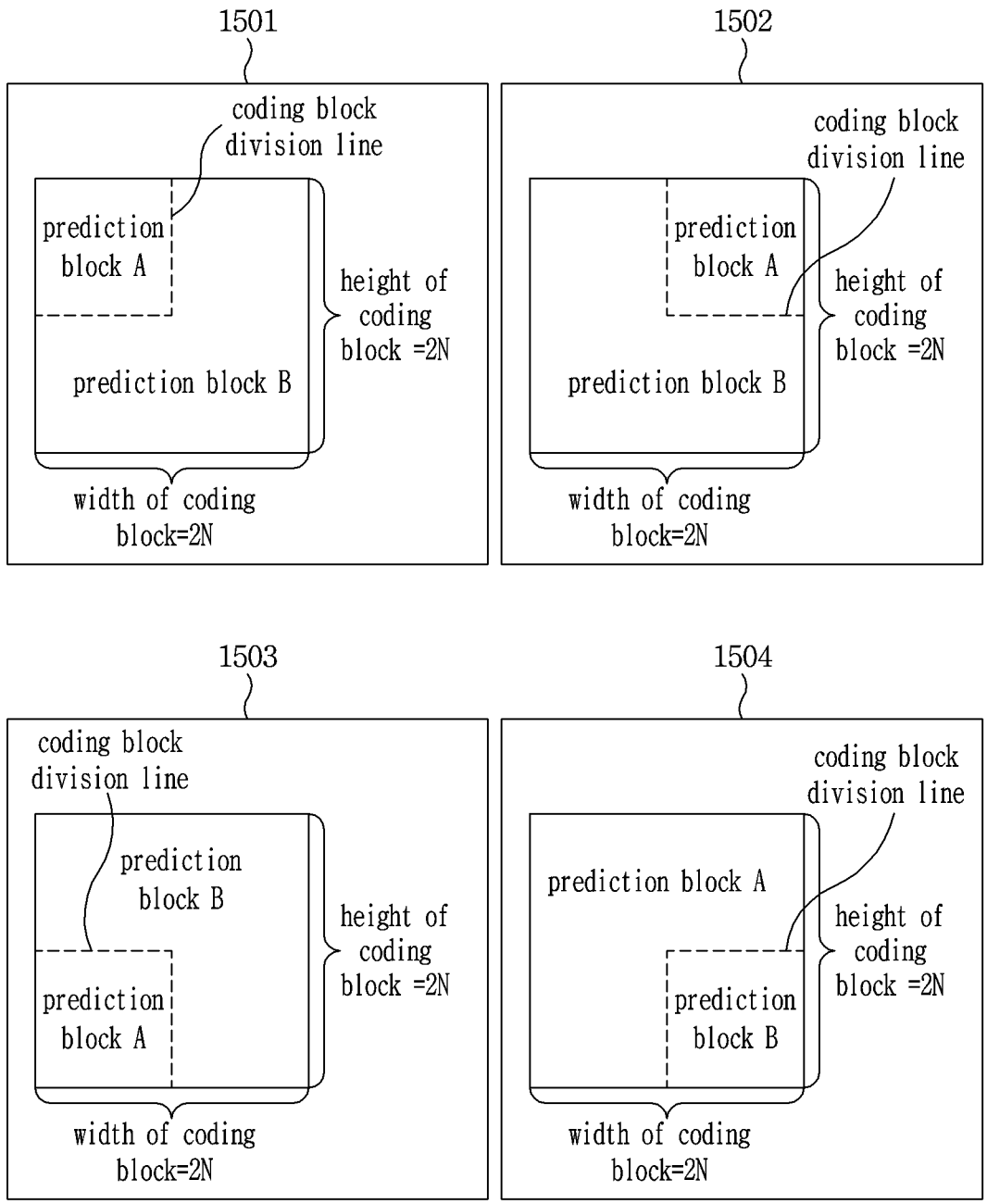

FIG. 14 and FIG. 15 are diagrams illustrating a second method of dividing a current coding block.

In this method, possible block partition forms are preset, an RD-dost for each passible block partition form is calculated, and the block partition form having the least RD cost is determined as the optimal block partition type. Information indicating the preset possible block partition types may be inserted into an upper-level header for transmission. The upper-level header means a transmission layer which is above a block layer, for example, a video parameter layer, a sequence parameter layer, a picture parameter layer, a slice layer, etc.

The preset block partition types include symmetric vertical partition, symmetric horizontal partition, asymmetric vertical partition, and asymmetric horizontal partition.

Referring to FIG. 14, ¼ and ¾ and vertical partition, ½ and ½ vertical partition, ¾ and ¼ and vertical partition, ¼ and ¾ horizontal partition, ½ and ½ horizontal partition, ¾ and ¼ and horizontal partition are possible. Referring to FIG. 14, ¼ and ¾ horizontal partition, ¾ and ¼ and vertical partition, ¼ and ¾ vertical partition, and ¾ and ¼ and vertical partition are asymmetric partition forms, and ½ and ½ horizontal partition ½ and ½ vertical partition are symmetric partition forms.

A corner partition may be performed according to a preset partition form.

Referring to FIG. 15, top left corner partition 1501, top right corner partition 1502, bottom left corner partition 1503, and bottom right corner partition 1504 are possible. Here, a corner prediction block generated from corner partition may have a quarter size (¼) of a cording block.

In the case of a top left corner partition 1501, there are two prediction blocks: a first prediction block A having an N×N size located at the top left corner of a coding block; and a second prediction block B that is the rest area of the coding block.

In the case of a top right corner partition 1502, there are two prediction blocks: a first prediction block A having an N×N size located at the top right corner of a coding block; and a second prediction block B that is the rest area of the coding block.

In the case of a bottom left corner partition 1503, there are two prediction blocks: a first prediction block A having an N×N size located at the bottom left corner of a coding block; and a second prediction block B that is the rest area of the coding block.

In the case of a top right corner partition 1504, there are two prediction blocks: a first prediction block A having an N×N size located at the top right corner of a coding block; and a second prediction block B that is the rest area of the coding block. For every partition type, the encoding order may be the order of prediction blocks A and B. When a coding block is partitioned in the manner described above, a prediction block may have a size larger or smaller than a ¼ area of the coding block.

In addition, prediction blocks generated through the partitioning may have various shapes such as a rectangle, a square, etc. In addition, the RD costs of the partition types are compared, and the partition type having the least RD cost may be determined as the optimal partition type of the current coding block.

Hereinafter, a coding mode (hereinafter referred to as hybrid mode) for generating prediction samples of a prediction block using a plurality of prediction modes in one coding block according to an embodiment of the present invention will be described.

The prediction modes available in the hybrid mode include: intra prediction modes including planar mode, DC mode, and angular mode; inter prediction modes including AMVP mode, merge mode, and skip mode; decoder-side motion information derivation (DMID) mode; and decoder-side intra mode derivation (DIMD) mode. In a coding mode which is encoded with hybrid mode, prediction samples of a prediction block are generated by using multiple prediction modes selected among the above-mentioned prediction modes.

The DMID mode refers to a prediction mode in which motion compensation information which is not encoded by the image encoding apparatus 100 is directly derived by the image decoding apparatus 1000 and prediction samples are generated on the basis of the motion compensation information. Here, motion information which is not encoded by the image encoding apparatus 100 and is thus required to be directly derived by the image decoding apparatus 1000 may be motion information induding a motion vector.

For example, in the DMID mode, the image decoding apparatus 1000 derives initial motion information of a prediction block from neighboring blocks of a coding block, derives final motion information of the prediction block on the basis of the derived initial motion information, and generates prediction samples of the prediction block on the basis of the final motion information.

Alternatively, in the DMID mode, the image decoding apparatus 1000 may derive final motion information of a prediction block on the basis of initial motion information transmitted from the image encoding apparatus 100, and generate prediction samples of the prediction block on the basis of the final motion information.

The DIMD mode refers to a prediction mode in which an intra prediction mode which is not encoded by the image encoding apparatus 100 is directly derived by the image decoding apparatus 1000 and prediction samples of a prediction block are generated by using the derived intra prediction mode.

For example, in the DIMD mode, the image decoding apparatus 100 sets a template block using a reconstructed region located around a coding block and uses an intra prediction mode by which an optimal prediction pixel value of the template block is derived as prediction information of a prediction block within the coding block.

On the other hand, when a coding block is encoded with hybrid mode and is divided into prediction blocks A and B, the prediction information of the prediction block A may be determined to use the prediction information of a neighboring block of the prediction block A as it is, and the prediction information of the prediction block B is determined on the basis of one mode among intra prediction modes (planar mode, DC mode, and angular mode), inter prediction modes (AMVP mode, merge mode, skip mode), DMID mode, and DIMD mode.

Figure 16A:
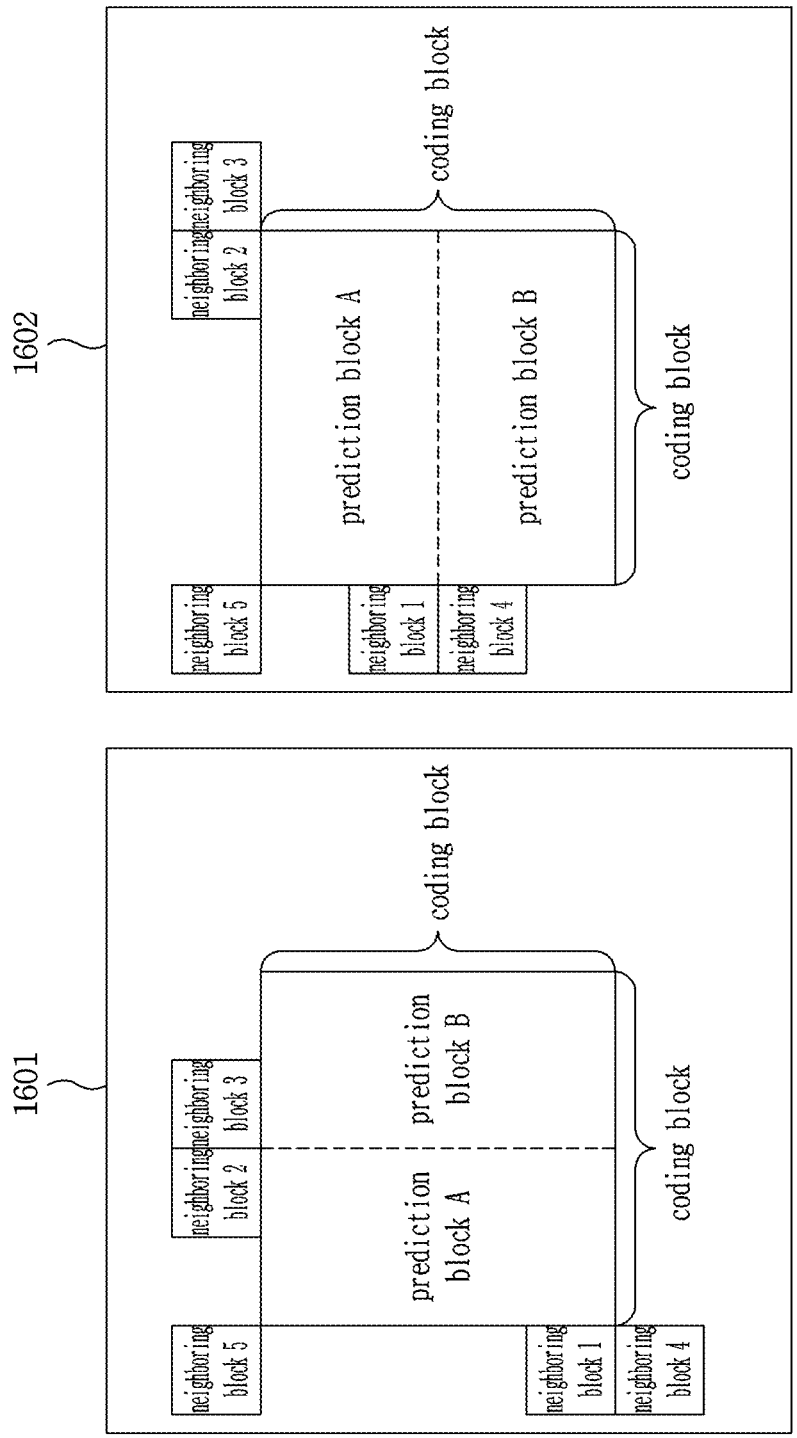
FIGS. 16A, 16B, and 16C and FIGS. 17A, 17B, and 17C are diagrams illustrating a method of determining prediction information of prediction blocks within a coding block that is encoded/decoded with hybrid mode.
Figure 16B:
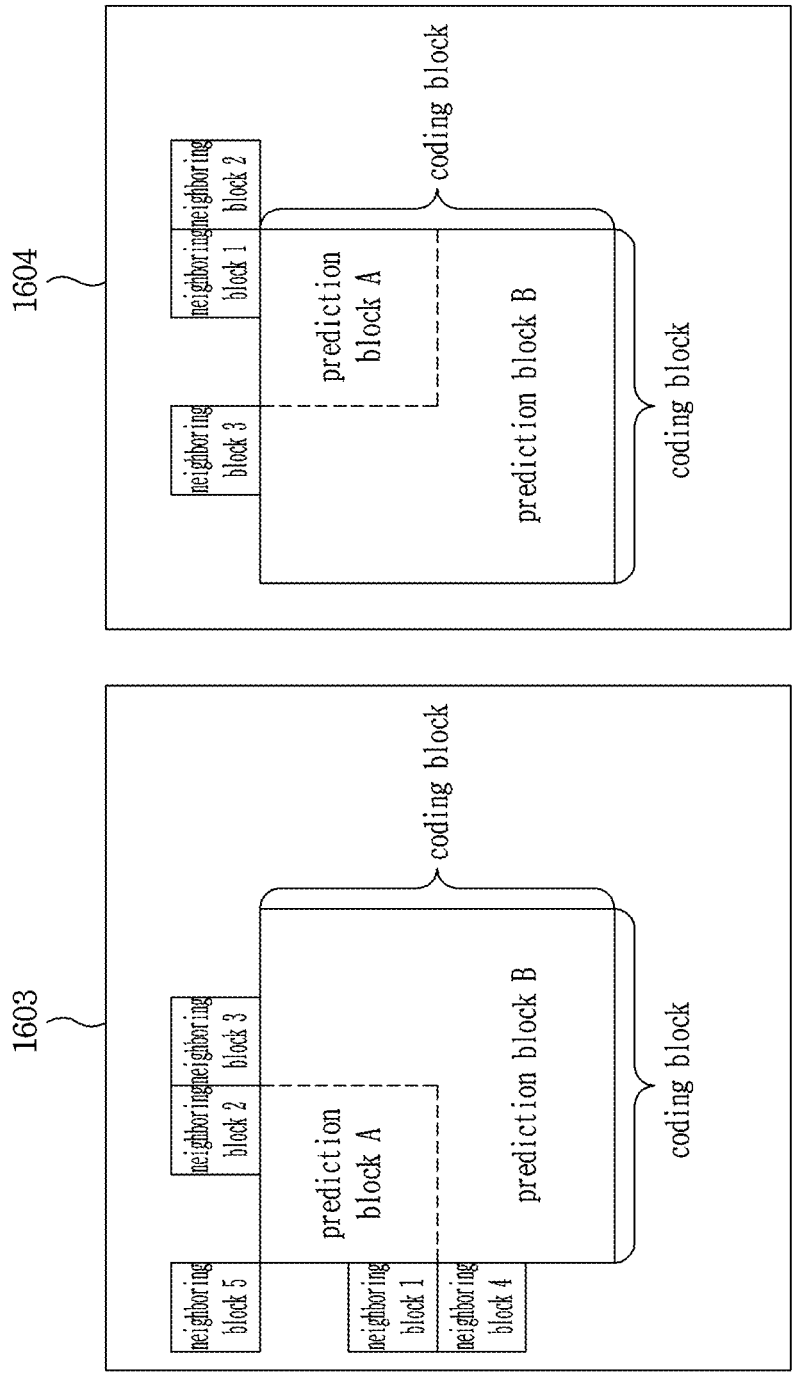
Figure 16C:
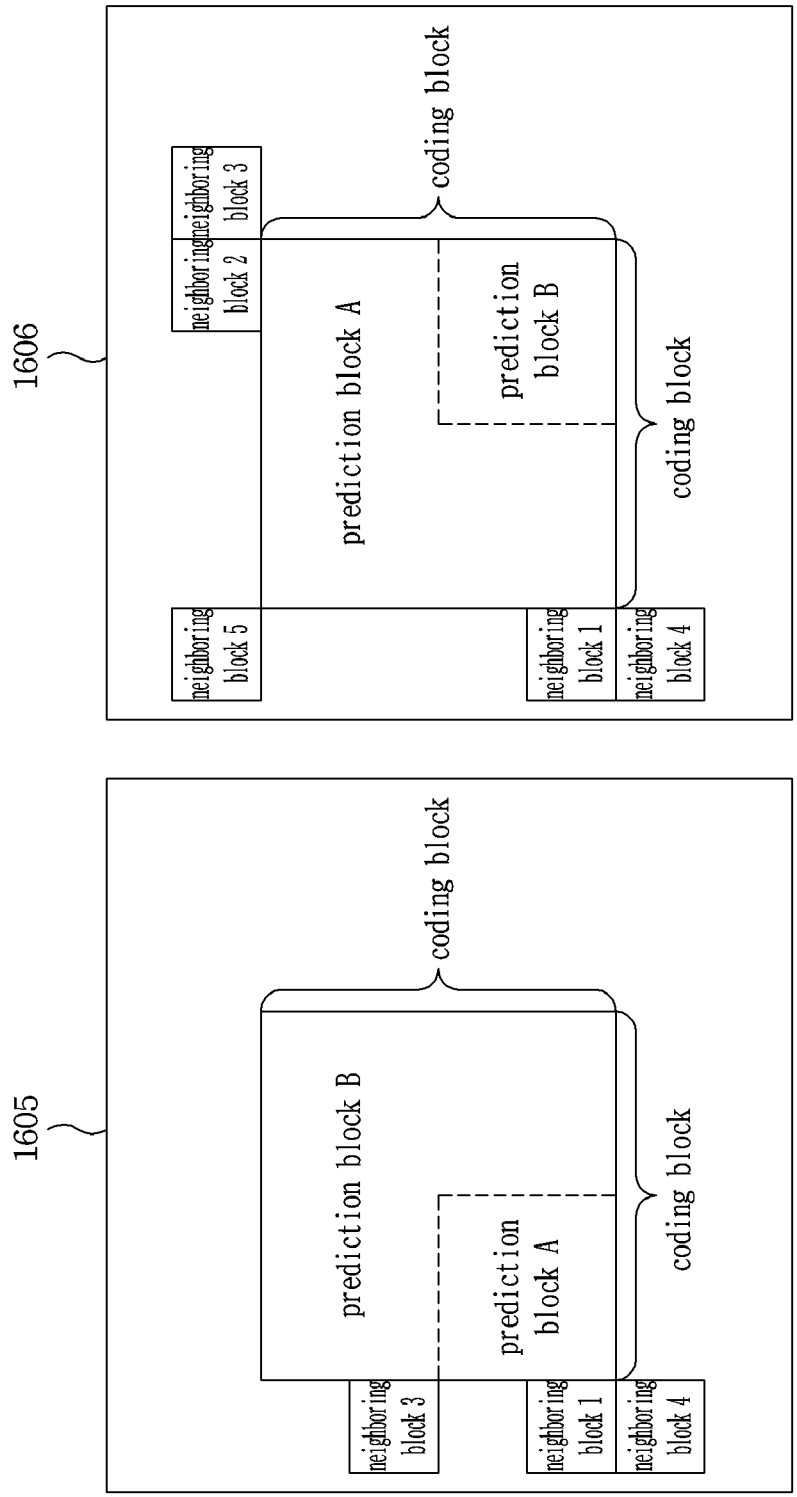

FIGS. 16A, 16B, and 16C are diagrams illustrating a method of determining prediction information of a prediction block A by using prediction information of a neighboring block as it is.

When generating prediction samples of the prediction block A, prediction information that is optimal for the prediction block A is searched from prediction information of previously encoded neighboring blocks located around the prediction block A, and the prediction samples of the prediction block A are generated by using the detected optimal prediction sample as the prediction information of the prediction block A.

The neighboring blocks of the prediction block A may be located at the positions denoted by 1601 through 1606 in FIGS. 16A, 16B, and 16C. When the neighboring blocks of the prediction block A have priorities, the optimal prediction information is searched from the neighboring blocks according to a given priority order. The present embodiment assumes that neighboring blocks 1, 2, 3, 4, and 5 are in this priority order.

Referring to 1601 of FIG. 16A, a prediction block A has five neighboring blocks 1, 2, 3, 4, 5.

The RD cost is calculated by sequentially applying the prediction information of the neighboring blocks 1 through 5 to the prediction block, and the prediction information of the neighboring block having the least RD cost is determined as the prediction information of the prediction block A.

Regarding 1602 of FIG. 16A, the description thereof may be the same as the description of 1601 except for the positions of the neighboring blocks.

FIGS. 16B and 16C illustrate that the number and position of neighboring blocks may vary depending on the position of the prediction block A. In each case, the prediction information of the neighboring block is applied to the prediction block A to calculate the RD cost, the prediction information having the least RD cost is determined as the optimal prediction information of the to prediction block A, and the prediction samples of the prediction block A are generated using the prediction information.

On the other hand, regarding the method of determining the prediction information of the prediction block B, the prediction information of a neighboring block of the prediction block may be used, as it is, as the prediction information of the prediction block B. In addition, it is also possible to determine the prediction information of the prediction block B by searching for the optimal prediction information among the intra prediction modes (this method is called intra prediction) or by searching the optimal prediction information from a reconstructed reference picture through motion estimation (this method is called inter prediction).

However, in some cases, the prediction information of the prediction block B can be determined with reference to the prediction information of the prediction block A Here, the cases will be described below.

Figure 17A:
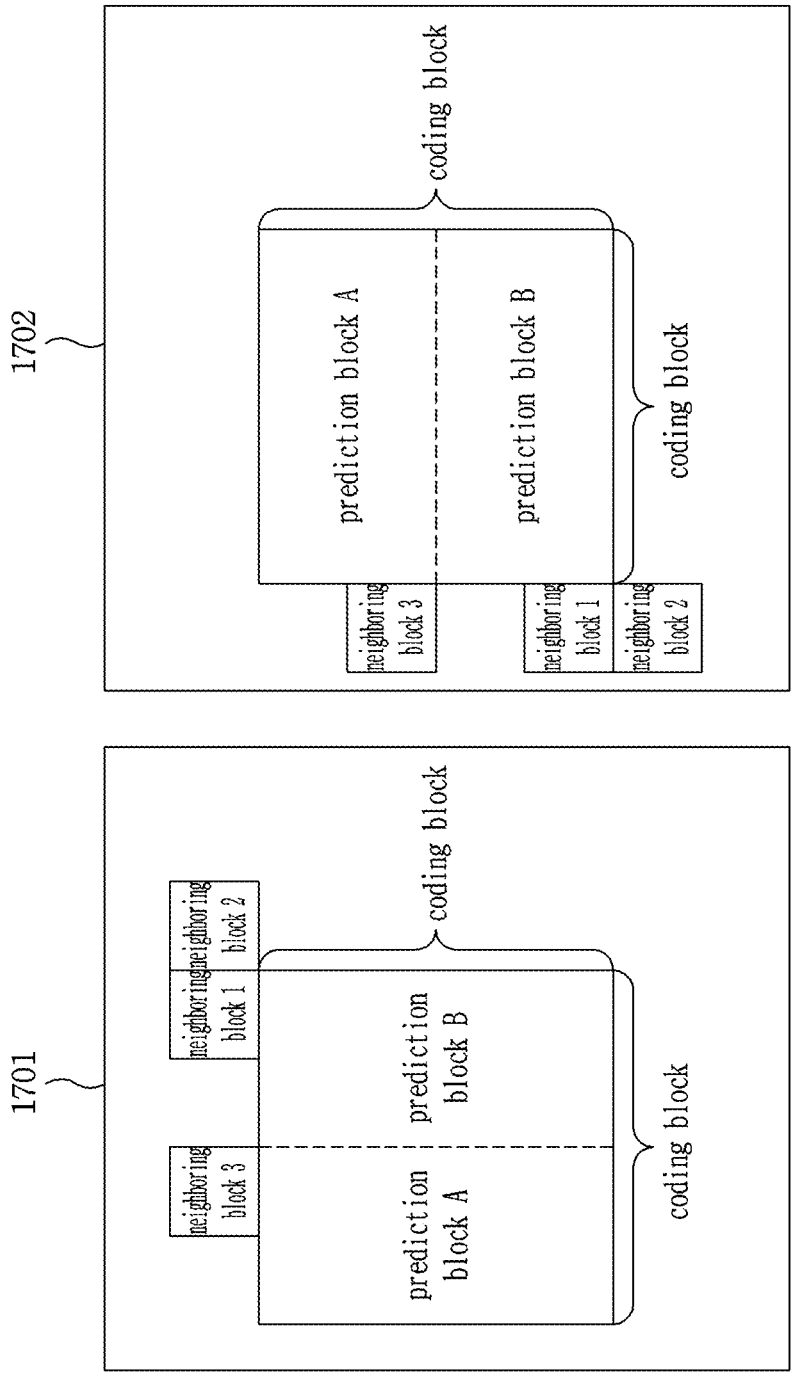
Figure 17B:
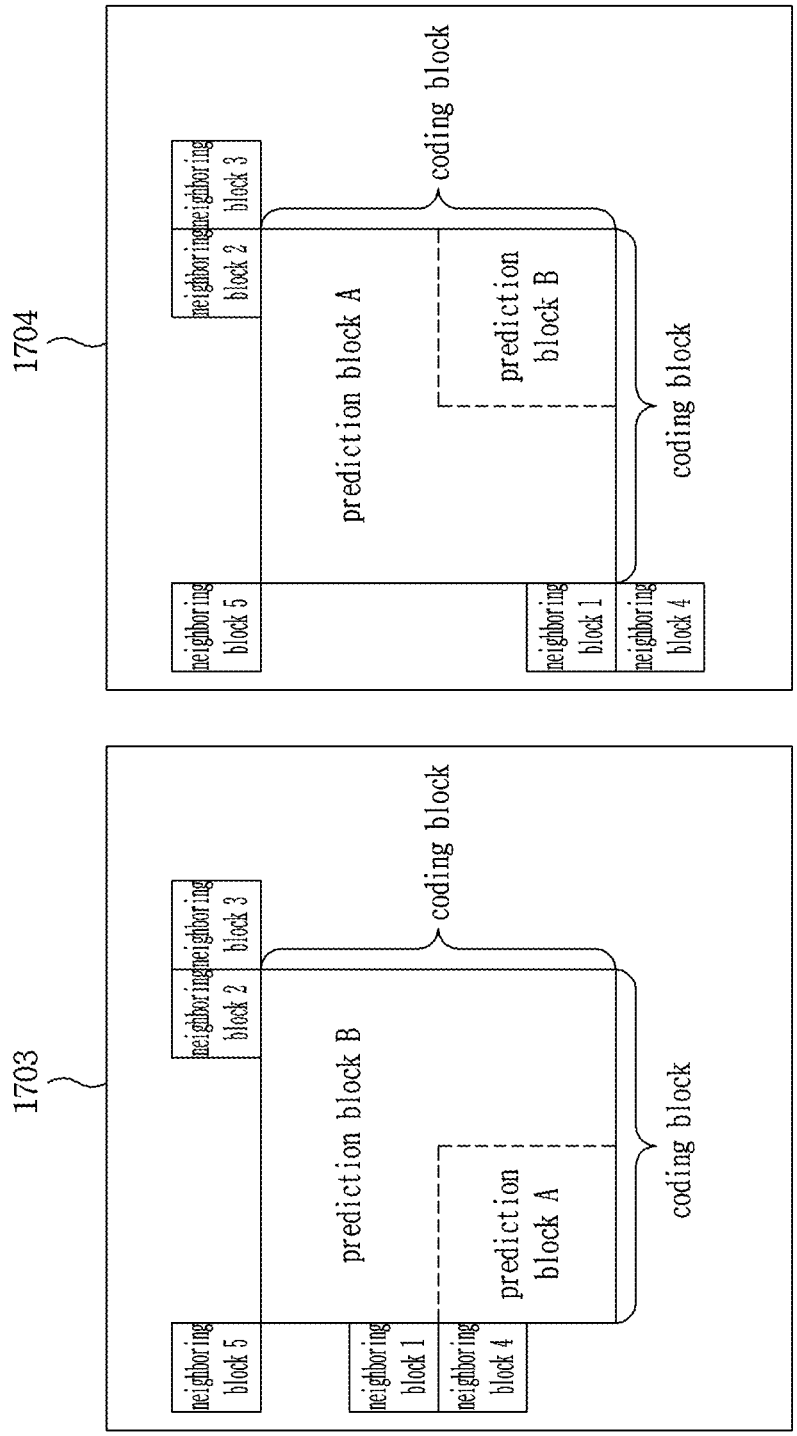
Figure 17C:
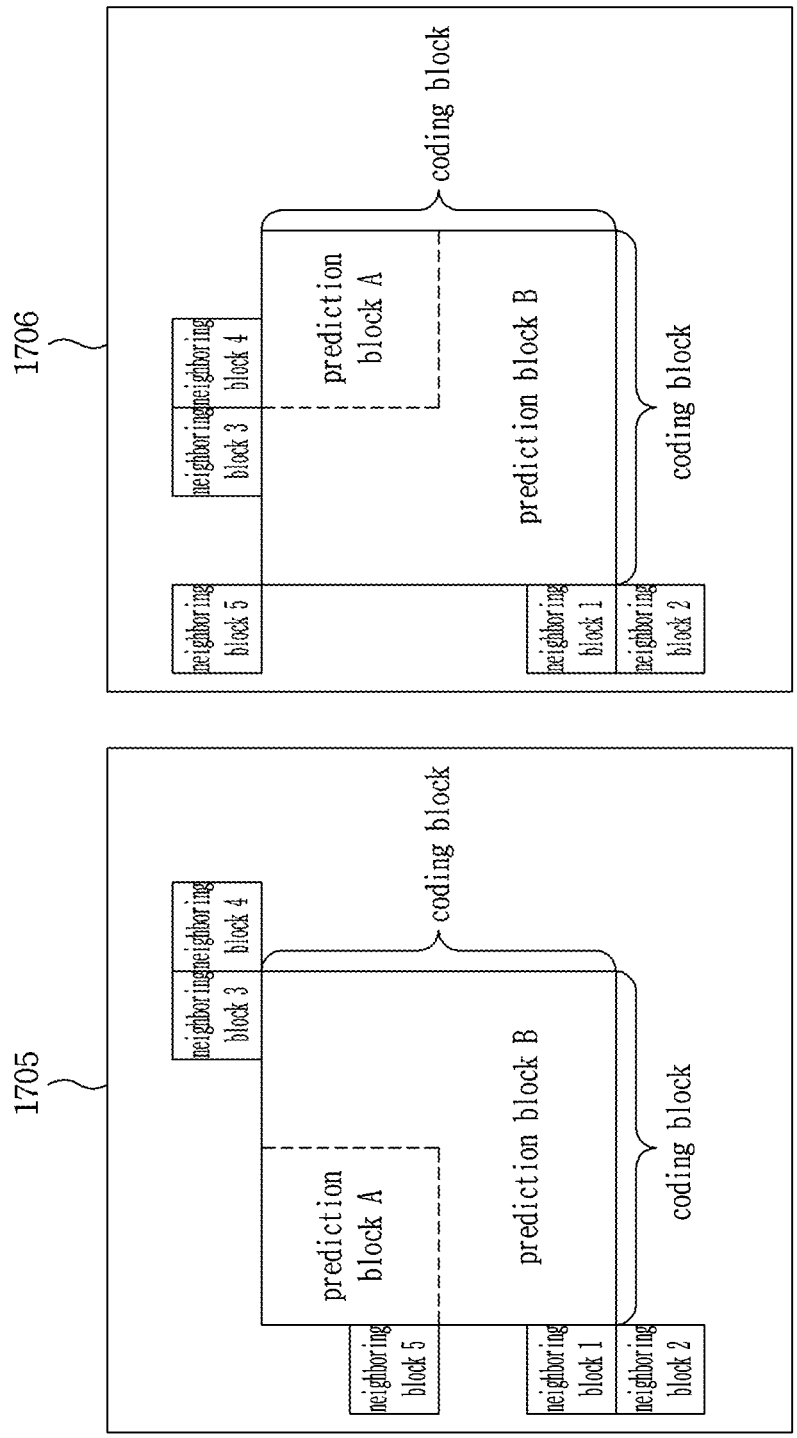

FIGS. 17A, 17B, and 17C are diagrams illustrating a method of determining the prediction information of a prediction block B.

The neighboring blocks of the prediction block B may be located at the positions denoted by 1701 through 1706 in FIGS. 17A, 17B, and 17C. When the neighboring blocks of the prediction block B have priorities, the optimal prediction information is searched from the neighboring blocks according to a given priority order. The present embodiment assumes that the neighboring blocks 1, 2, 3, 4, and 5 are in this priority order.

The number of neighboring block candidates 1701 may not be five but may be three or four as illustrated in the diagrams 1701 and 1702 of FIG. 12.

The prediction information of the prediction block B can be determined by referring to the prediction information of the prediction block A depending on a transform block partition structure.

When the transform block partition structure of the current coding block is the CU-based RT structure, when any one of the following conditions is satisfied, the prediction information of the prediction block B may be determined by referring to the prediction information of the prediction block A:
1) when the prediction block A is divided into sub-blocks and the prediction information varies from sub-block to sub-block; and
2) when the prediction block A is not divided into sub-blocks, the prediction block B is divided into sub-blocks, and prediction information varies from sub-block to sub-block.

On the other hand, when the transform block partition structure of the current coding block is the PU-based RT structure, when any one of the following conditions is satisfied, the prediction information of the prediction block B may be determined by referring to the prediction information of the prediction block A:
1) when the prediction block A is divided into sub-blocks and the prediction information varies from sub-block to sub-block;
2) when the prediction block A is not divided into sub-blocks, the prediction block B is divided into sub-blocks, and prediction information varies from sub-block to sub-block;
3) when the optimal prediction information of the prediction blocks A and B are skip mode, the remaining cases except for the case where the prediction block B refers to the prediction information of the prediction block A.

On the other hand, the prediction information of the prediction block B may be determined on the basis of the intra prediction mode or the inter prediction mode as described above. In this case, as described above in connection with the prediction module 102 of the image encoding apparatus 100 of FIG. 1, prediction information may be determined for each prediction mode, and prediction blocks may be generated using the determined prediction information.

Figure 30:
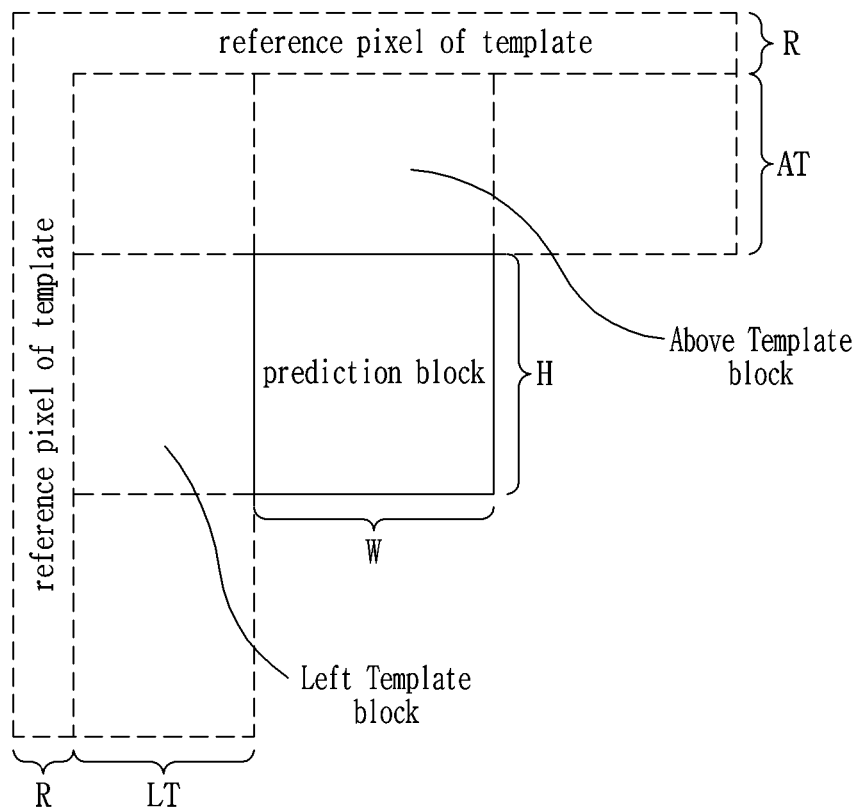
FIG. 30 is a diagram illustrating a method of deriving an intra prediction mode in DIMD mode.

The prediction information of the prediction block B may be determined by DMID mode or DIMD mode. FIGS. 18, 19, and 30 are diagrams illustrating a method of searching for prediction information in DMID mode and DIMD mode.

Figure 18A:
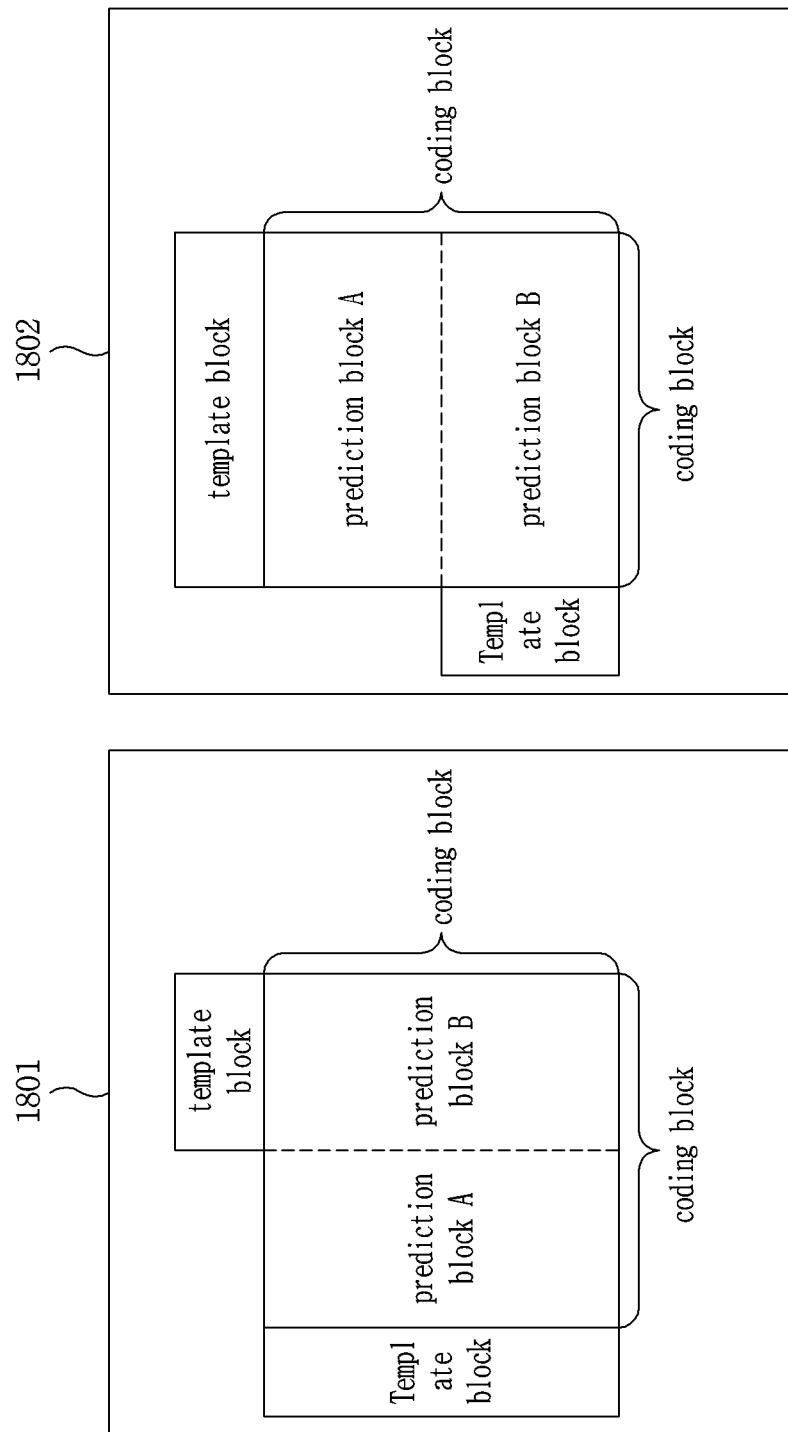
FIGS. 18A, 18B, and 18C are diagrams illustrating the locations and sizes of nearby template blocks for each split type when DMID mode is used.
Figure 18B:
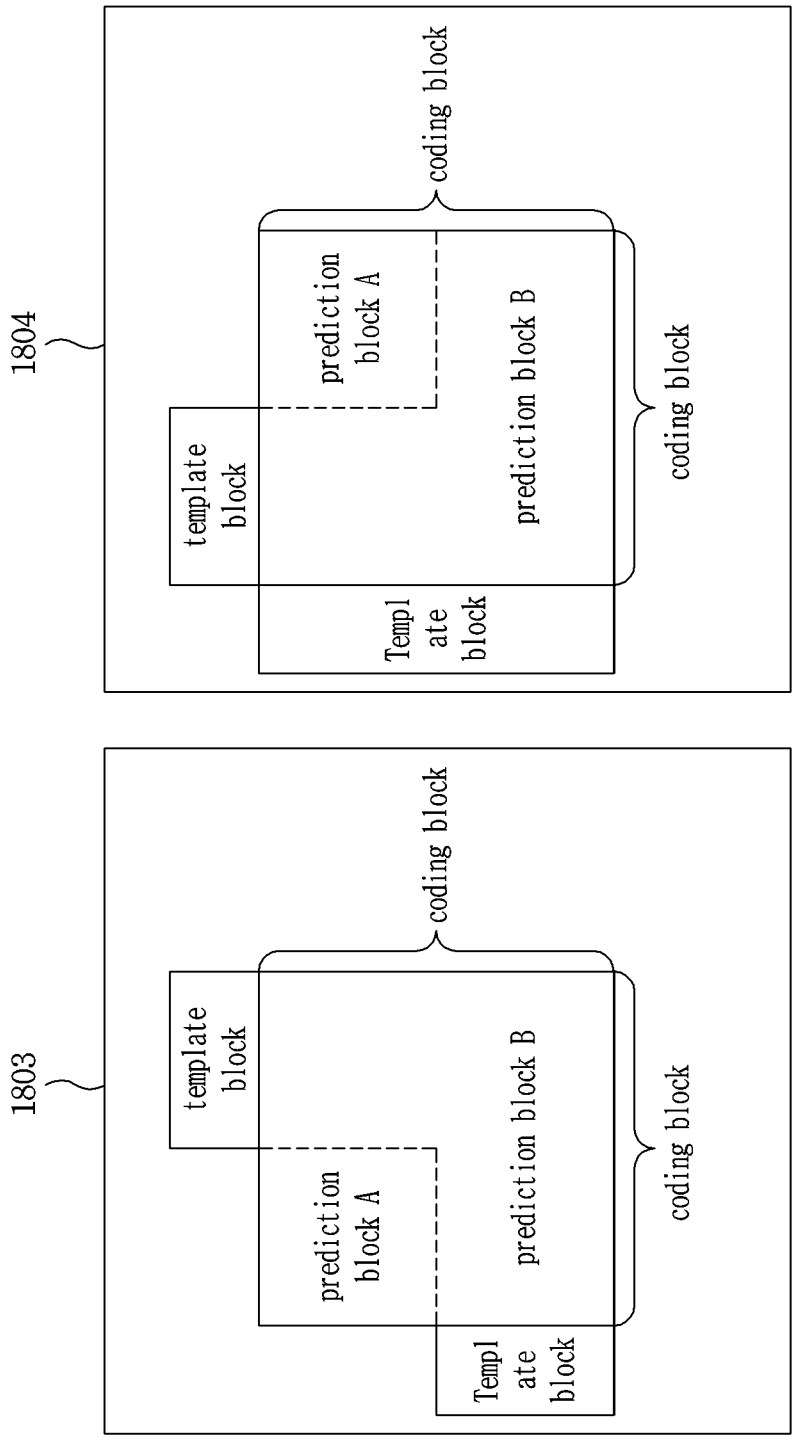
Figure 18C:
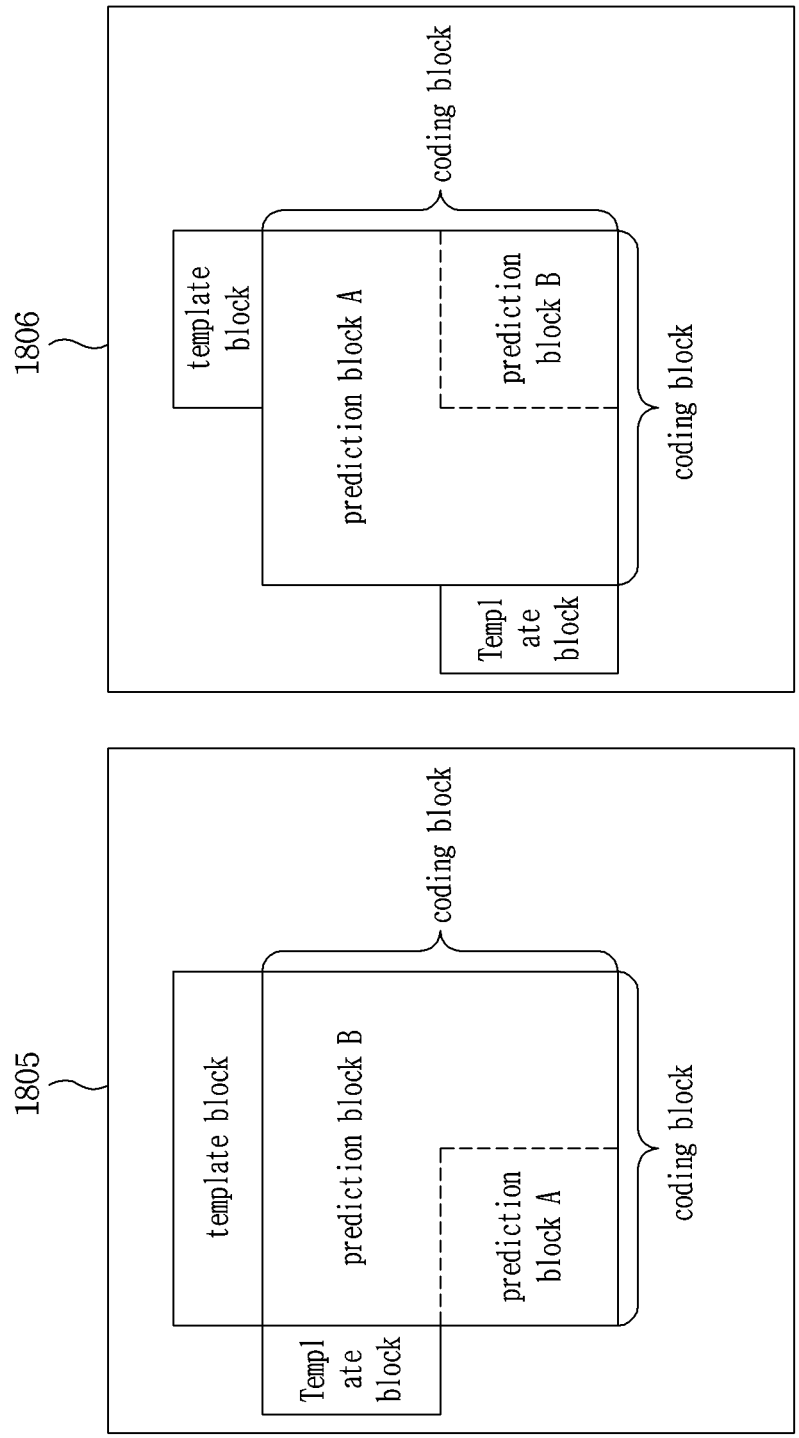
Figure 19:
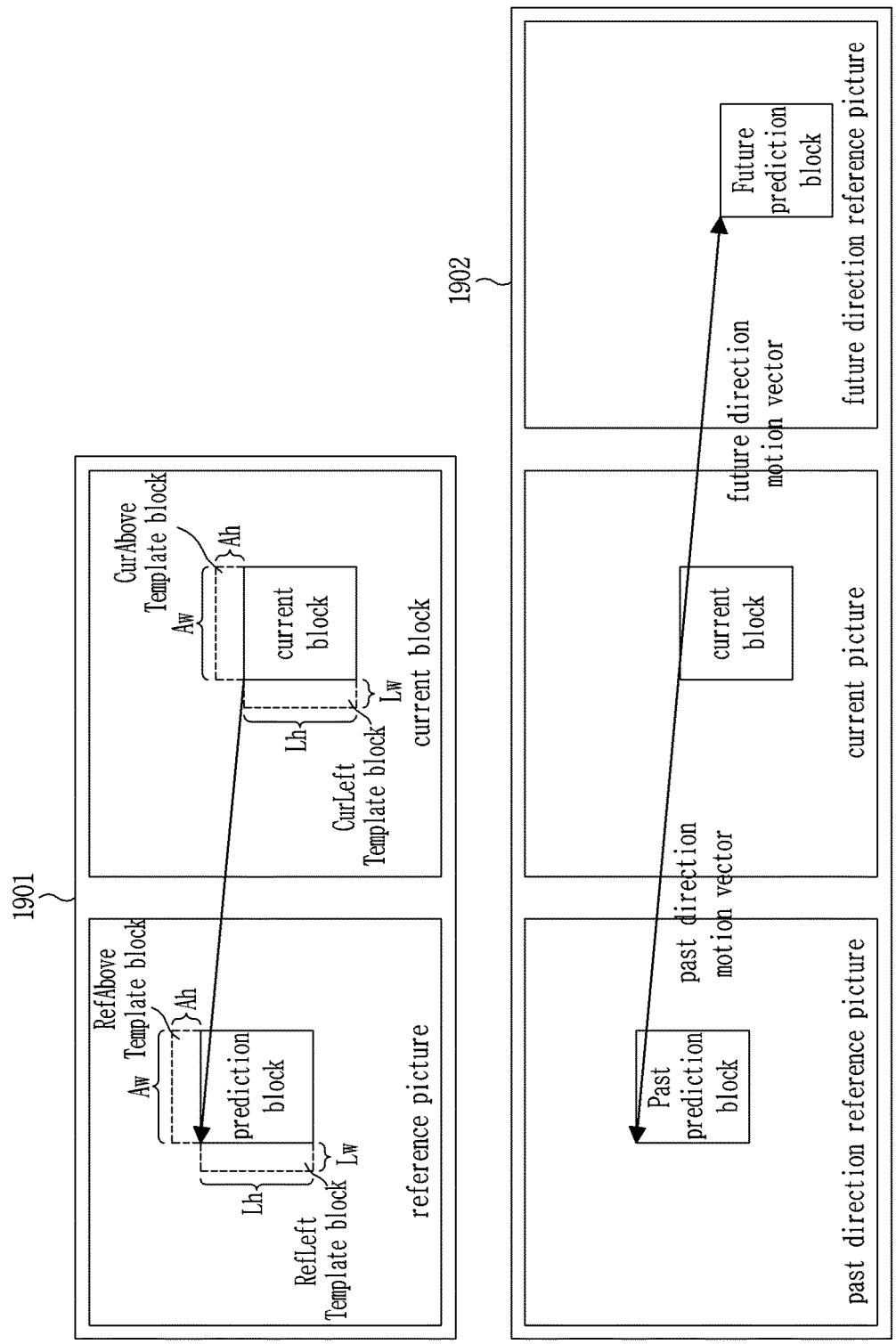
FIG. 19 is a diagram illustrating a method of deriving motion information in DMID mode.

FIGS. 18A, 18B, and 18C shows examples of a neighboring template for each partition type when searching for a prediction mode of a prediction block B generated from a current coding block in DMID mode or DIMD mode. The template block may be determined by using a previously reconstructed region located around the current coding block.

In DMID mode, the image decoding apparatus 1000 searches for prediction information by setting assuming the difference between a neighboring template located around a prediction block within a reference picture and determined according to an initial motion vector and a neighboring template of a current block within a current picture as an error for calculating the RD cost, instead of the difference between the prediction block. In DIMD mode, the image decoding apparatus 1000 searches for prediction information by setting the difference between the reconstructed pixel value of a template region and the predicted pixel value of the template region, which is derived by using the reference pixels located around the template region, an error for calculating the RD cost. In DMID mode, as an initial motion vector for motion estimation, motion vectors of motion information of reconstructed neighboring blocks.

In a diagram 1801 of FIG. 18A, an above template is adjacent to the prediction block B and a left template is not adjacent to the prediction block B. This is to perform transform and quantization on a per coding block basis. It is also possible to generate a left template block located within the prediction block A adjacent to the left edge of the prediction block B. This is to perform transform and quantization on a per prediction block basis.

In a diagram 1802 of FIG. 18A, a left template is adjacent to the prediction block B but an above template is not adjacent to the prediction block B. It is also possible to generate an above template block located within the prediction block A adjacent to the upper edge of the prediction block B.

Even in cases where the shape of the prediction block B is neither a square nor a rectangular as illustrated in diagrams 1803 to 1805 of FIGS. 18B and 18C, an above template block and a left template block may differ in size and shape.

In FIG. 18C, reference numeral 1806 denotes a partition type in which a prediction block is adjacent to neither an above template nor a left template. When transform and quantization are performed on a per prediction block basis, a template block may be generated to be located within a prediction block A so as to be adjacent to a prediction block B.

In the cases denoted by reference numerals 1801 through 1806 in FIGS. 18A, 18B, and 18C, a template block in only one direction of a prediction block B is available, only the available template block may be used.

In addition to the examples of the template blocks illustrated in FIGS. 18A, 188, and 18C, the position, size, and shape of the template block may diversely vary.

FIG. 19 is a diagram illustrating a method of searching for prediction information in DMID mode.

1901 in FIG. 19 denotes a case where prediction information is searched for using any one template block shown in FIGS. 18A to 18C in DMID mode, and 1902 in FIG. 19 denotes a case where when prediction direction is determined to be bidirectional, prediction information is searched for without using a template block in DMID mode.

Referring to 1901 in FIG. 19, there are template blocks on the upper side and the left side of a current block in a current picture. The template block on the upper side is denoted by CurAboveTemplate and the template block on the left side is denoted by CurLeftTemplate block in FIG. 19.

The above template block CurAboveTemplate have a width (horizontal size) of Aw and a height (vertical size) of Ah, and the left template block CurLeftTemplate has a width of Lw and a height of Lh.

The width and height of a reference above template block RefAboveTemplate within a reference picture may be the same as the width and height of a neighboring template block located around the current block.

In DMID mode, motion estimation refers to a process of searching for a template block most similar to the neighboring template block of the current block from a reference picture and a block adjacent to the detected template block within the reference picture is determined as a prediction block. The method may be applied regardless of the prediction directions (past direction, future direction, bidirectional).

In FIG. 19, reference numeral 1902 denotes a case where a DMID coding method in which a template block is not used when the prediction direction is bidirectional. A point at which the difference between a prediction block in the past direction and a prediction block in the future direction is minimum is searched through bidirectional prediction, and motion information indicating the point is determined as prediction information of the current block.

FIG. 30 shows a method of searching for prediction information in DIMD mode. FIG. 30 illustrates examples of a neighboring template for each partition type when a prediction mode of a prediction block B generated from a current coding block is searched for in DIMD mode. A template region may be determined by using a previously reconstructed region located around a current coding block.

A template region on the upper side is denoted by AboveTemplate and a template region on the left side is denoted by LeftTemplate.

The above template region AboveTemplate has a width W and a height AT, the left template region LeftTemplate has a width LT and a height H, and pixels on R pixel lines in each template region may be used. The template region may also be referred to as template block.

An intra prediction mode that can generate a prediction pixel value having the least error with a reconstructed pixel value within the template region may be searched for. The intra prediction mode detected in this way is determined as prediction information of the template region, and the prediction information is used as prediction information of the current block.

Figure 20:
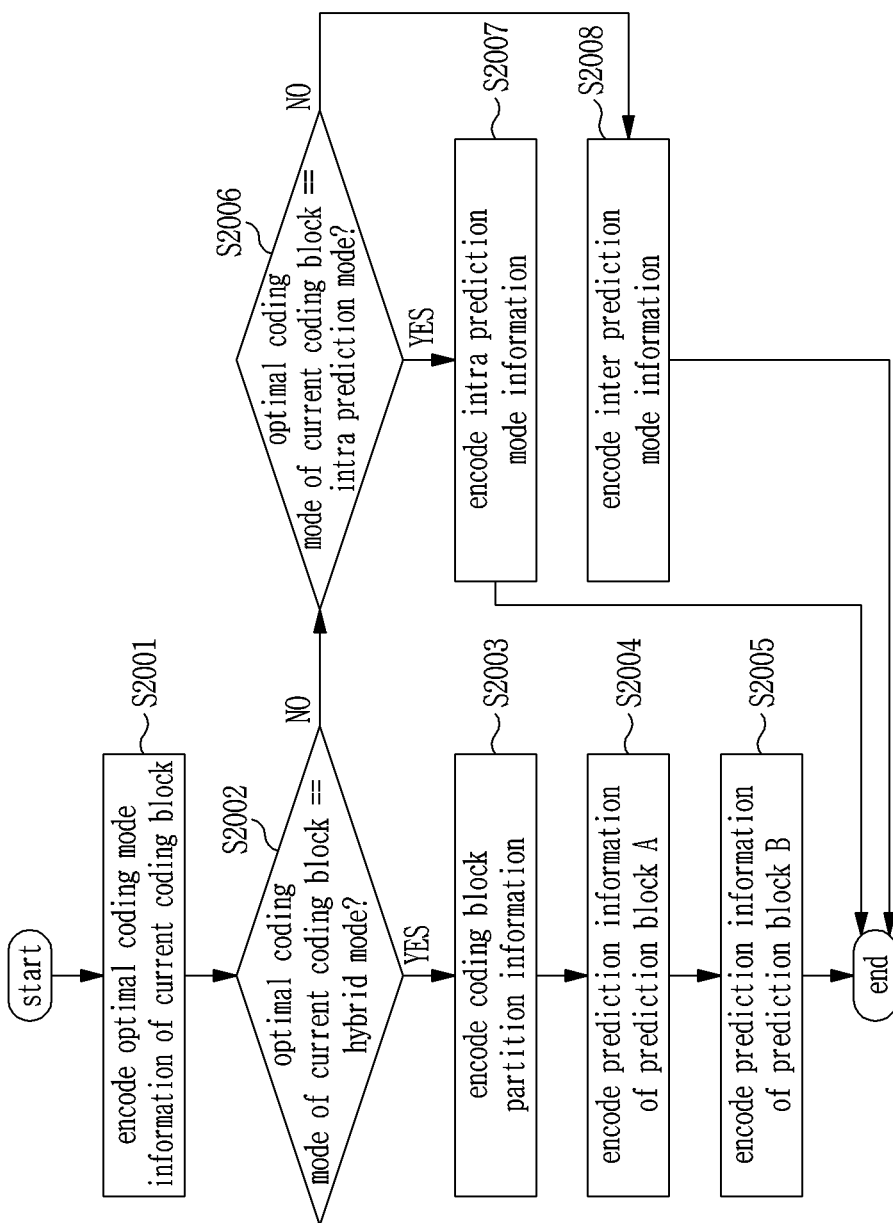
FIG. 20 is a diagram illustrating a method of encoding prediction information in hybrid mode.

FIG. 20 is a diagram illustrating a method of encoding prediction information in hybrid mode. FIG. 20 illustrates an example in which a current coding block is partitioned into a prediction block A and a prediction block B.

Referring to FIG. 20, optimal prediction mode information of the current coding block is encoded in step S2001. In this case, the RD costs for hybrid mode, the RD cost for intra prediction mode, and the RD cost for inter prediction mode are compared, and a coding mode incurring the least RD cost is determined as the optimal coding mode of the current coding block.

A method of determining the coding mode of the current coding block through comparison of the RD costs will be further detailed with reference to FIG. 21.

Figure 21:
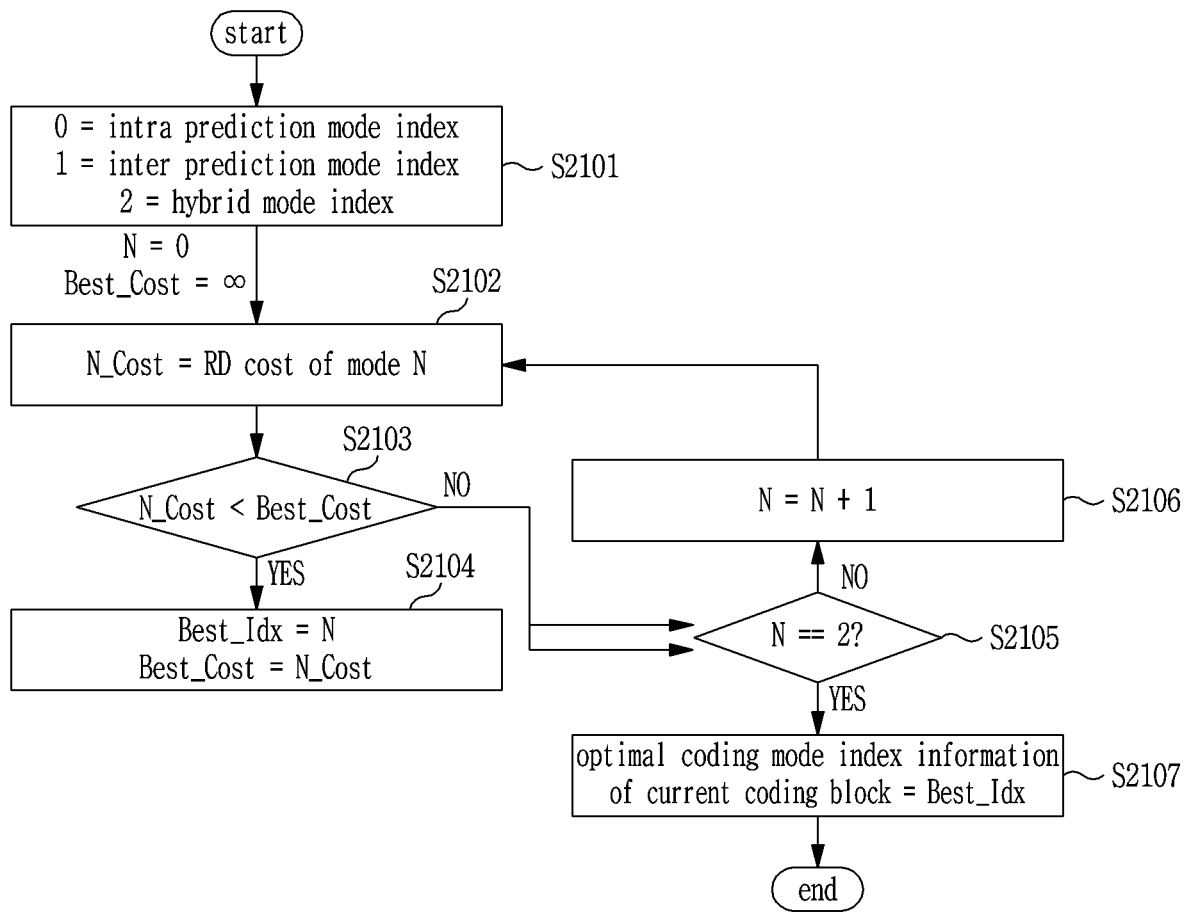
FIG. 21 is a flowchart illustrating a method of determining the optimal prediction mode among intra prediction mode, inter prediction mode, and hybrid mode, in an image encoding apparatus.

FIG. 21 is a flowchart illustrating a method of determining the optimal coding mode among intra prediction mode, inter prediction mode, and hybrid mode, in the image encoding apparatus 100.

Referring to FIG. 21, in step S2101, each coding mode of the three coding modes may be assigned prediction mode index information. For example, 0 may be intra prediction mode index, 1 may be inter prediction mode index, and 2 may be hybrid mode index.

In step S2102, the initial value of N is zero and the initial value of Best_Cosat is infinity. In this step, the RD cost of intra prediction mode assigned an index of 0 is calculated, and the calculated value is stored as the value of a variable N_Cost.

In step S2103, whether the N_Cost is greater than the current Best_Cost is determined. When the N_Cost is determined to be less than the current Best_Cost, the current value of N is stored as Best_Idx and the current value of the N_Cost is stored as the Best_Cost in step S2104.

In step S2105, whether the current value of N is 2 or not is determined. When the current value of N is not 2, the value of N is increased by 1 in step S2106, the process is returned to step S2102, and step S2106 and the subsequent steps are performed. When the current value of N is 2, the current value of the Best_Idx is determined as the optimal coding mode index information of the current coding block in step S2107 and the flow of FIG. 21 ends.

Referring back to FIG. 20, when the hybrid mode is determined as the optimal coding mode through the method of FIG. 21, the hybrid mode information may be encoded as the optimal coding mode information of the current coding block in step S2001.

In addition, information on whether the hybrid mode operation is to be performed may be inserted into in an upper-layer header so as to be transmitted, and the hybrid mode operation may be controlled by the upper-layer header.

In step S2002, it is determined whether the optimal coding mode of the current coding block determined in step S2001 is hybrid mode. When the optimal coding mode of the current coding block is hybrid mode, the process proceeds to step S2003. On the other hand, when the optimum coding mode of the current coding block is not hybrid mode, the process proceeds to step S2006.

In step S2006, it is determined whether or not the optimal coding mode of the current coding block is intra prediction mode. When the optimal coding mode of the current coding block is intra prediction mode, intra prediction mode information is encoded through the same process as described with reference to FIG. 3 in step S2007. When the optimal coding mode of the current coding block is not intra prediction mode, inter prediction mode information is encoded through the same process as described with reference to FIG. 9 in step S2008.

Meanwhile, in step S2003, the partition information of the current coding block may be encoded. In this case, when the current coding block is divided into two parts as shown in FIG. 13, information indicating vertical partition or horizontal partition may be encoded, and then P information may be encoded. Alternatively, as index information indicating the optimal partition type among preset partition types shown in FIG. 14 may be encoded.

In addition, when the current coding block is partitioned at a corner as shown in FIG. 15, index information indicating which corner is partitioned may be encoded. That is, when the current coding block is partitioned into a first prediction block A and a second prediction block B whose area ratios to the entire area of the current coding block are respectively ¼ and ¾, index information indicating in which direction the ¼-area block (first prediction block) is located may be encoded.

In step S2004, prediction information of the prediction block A is encoded. Among prediction information of neighboring blocks, index information of a neighboring block having prediction information that is the most optimal for the prediction block A may be encoded. A detailed description to thereof will be given below with reference to FIG. 22.

Figure 22:
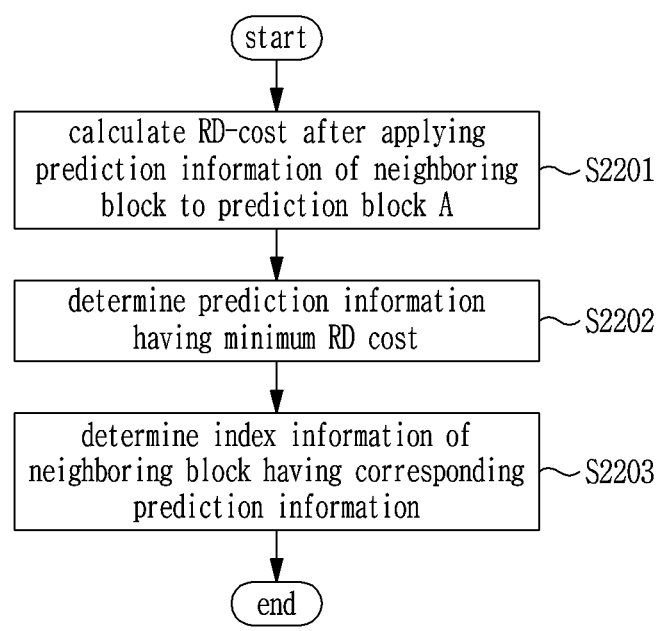
FIG. 22 is a flowchart illustrating a method of encoding prediction information of a prediction block within a coding block that is encoded with hybrid mode, in an image encoding apparatus.

FIG. 22 is a flowchart illustrating a method of encoding prediction information of a prediction block A in the image encoding apparatus 100.

Referring to FIG. 22, in step S2201, prediction information of available neighboring blocks is applied to the prediction block A to generate a prediction block, and the RD cost for each prediction information is calculated.

In step S2202, prediction information having the least RD cost is selected from among the multiple prediction information entries is determined. In step S2203, index information of a neighboring block having the selected prediction information may be stored.

There is an alternative to the method of FIG. 22. That is, the comparison of the RD costs is not performed, and prediction information of an available neighboring block having a higher priority and occurring earlier among the neighboring blocks may be used as it is by searching for an available neighboring block according to the priority order.

Returning to the description of FIG. 20, in step S2005, prediction information of the prediction block B may be encoded.

The image encoding apparatus according to an exemplary embodiment of the present invention may determine the optimal prediction mode of the prediction block B by taking into account only one predetermined prediction mode among five prediction modes which are merge mode, AMVP mode, DMID mode, intra prediction mode, and DIMD mode.

In this case, the prediction information may be encoded in the same manner as in the encoding method of FIG. 9 described above when the preset prediction mode is merge mode or AMVP mode (inter prediction mode). When the preset prediction mode is intra prediction mode, the prediction information may be encoded in the same manner as in the encoding method shown in FIG. 3.

Figure 23:
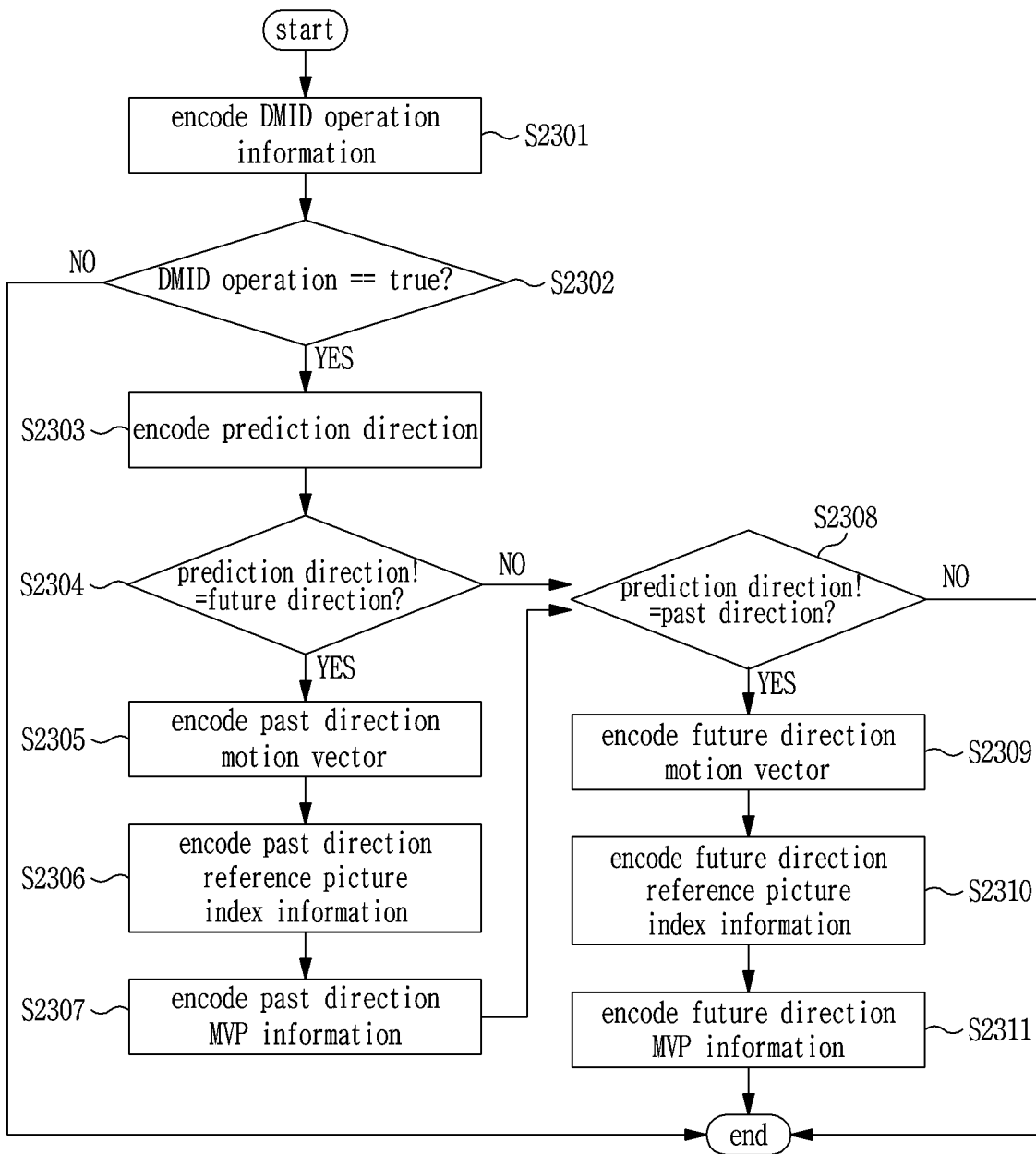
FIG. 23 is a flowchart illustrating a method of encoding prediction information in DMID mode.

On the other hand, when the predetermined prediction mode is DMID mode, the prediction information may be encoded in the same manner as in the encoding method shown in FIG. 23.

FIG. 23 is a flowchart illustrating a method of encoding prediction information in DMID mode.

Referring to FIG. 23, DMID operation information may be encoded in step S2301. Here, the DMID operation information may be information indicating whether to encode the prediction information in DMID mode.

In step S2302, whether to perform DMID operation or not is determined on the basis of the DMID operation information. When the DMID operation information has a value of false, the flow ends. When the DMID operation information has a value of true, the process proceeds to step S2303.

In step S2303, the prediction direction may be encoded. This process may be the same as the description of step S904 of FIG. 9.

In step S2304, whether or not the prediction direction is future direction is determined. When the prediction direction is determined not to be future direction, the process proceeds to step S2305. When the prediction direction is determined to be future direction, the process proceeds to step S2308.

In step S2305, the motion vector of the past direction may be encoded. Before the image decoding apparatus derives a motion vector through motion estimation, the image decoding apparatus may receive a motion vector having a low resolution from the image encoding apparatus and may derive a motion vector having a final resolution (finer resolution) by using the received low resolution motion vector as an initial motion vector.

Alternatively, a motion vector may not be transmitted from the image encoding apparatus (step S2305 is omitted). In this case, the image decoding apparatus may derive a motion vector having a final resolution on its own by using a motion vector in motion information of a previously reconstructed neighboring block as an initial motion vector to be used for motion estimation. This process may differ from that of step S907 of FIG. 9.

In step S2306, past direction reference picture index information may be encoded. This may be the same as the description of step S906 of FIG. 9 described above. However, the image decoding so apparatus may determine the past direction reference picture index information on its own without a process in which the image encoding device encodes the past direction reference picture index information.

In step S2307, MVP information in the past direction may be encoded. This may be the same as the description of step S907 of FIG. 9. However, the image decoding apparatus may determine the past direction MVP information its own without a process in which the image encoding device encodes the past direction MVP information. Alternatively, the image decoding apparatus may determine the past direction optimal motion information through motion estimation without using the MVP information.

In step S2308, whether or not the prediction direction is past direction is determined. When the prediction direction is determined to be past direction, the flow ends. When the prediction direction is determined not to be past direction, the motion vector in the future direction may be encoded in step S2309. This process may differ from the description of step S911 of FIG. 9. Before the image decoding apparatus derives a motion vector through motion estimation, the image decoding apparatus may receive a motion vector having a low resolution from the image encoding apparatus and may derive a motion vector having a final resolution (finer resolution) by using the received low resolution motion vector as an initial motion vector.

Alternatively, a motion vector may not be transmitted from the image encoding apparatus (step S2309 may be omitted). In this case, the image decoding apparatus may derive a motion vector having a final resolution on its own by using a motion vector in motion information of a previously reconstructed neighboring block as an initial motion vector to be used for motion estimation.

In step S2310, the reference picture index information in the future direction may be encoded. This process may be the same as the description of step S910 of FIG. 9. However, it is also possible to determine the future-direction reference picture index information in a manner that the image decoding apparatus determines the future-direction reference picture index information on its own determination without encoding the future reference picture index information in the image encoding apparatus side.

In step S2311, future-direction MVP information may be encoded. This may be the same as the description of step S911 of FIG. 9. However, the image decoding apparatus may determine the future-direction MVP information on its own determination without a process in which the image encoding device encodes the future-direction MVP information. Alternatively, the image decoding apparatus may determine the future-direction optimal motion information through motion estimation without using the MVP information.

The image encoding apparatus according to an exemplary embodiment of the present invention may determine the optimal prediction mode of the prediction block B by taking into account only one predetermined prediction mode among five prediction modes which are merge mode, AMVP mode, DMID mode, intra prediction mode, and DIMD mode. A detailed description thereof will be given below with reference to FIG. 24.

Figure 24:
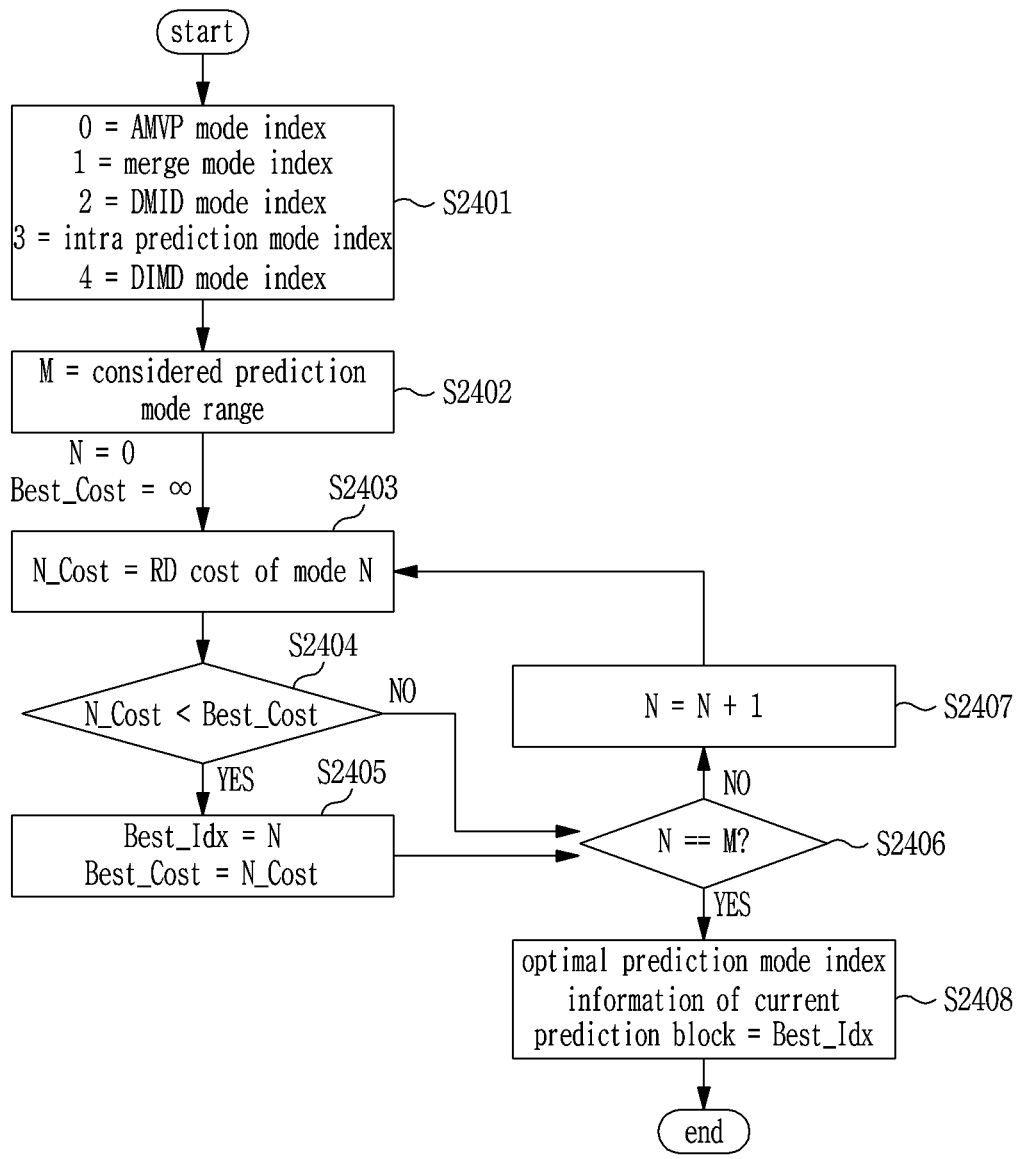
FIG. 24 is a flowchart illustrating a method of determining a prediction mode for a prediction block within a coding block that is encoded with hybrid mode, in an image encoding apparatus.

FIG. 24 is a flowchart illustrating a method in which an image encoding apparatus determines a prediction mode of a prediction block B.

Referring to FIG. 24, in step S2401, each prediction mode may be assigned mode index to information. For example, AMVP mode may be assigned 0, merge mode may be assigned 1, DMID mode may be assigned 2, intra prediction mode may be assigned 3, and DIMD mode may be assigned 4.

In step S2402, a mode number range of the prediction modes considered by the image encoding apparatus is determined according to M. For example, when M is 2, the prediction mode of the prediction block B may be determined from among only three prediction modes: AMVP mode, merge mode, and DMID mode.

In step S2403, the initial value of N is 0 and the initial value of Best_Cost is infinity. First, RD cost of mode number 0 is calculated and the result is stored in N_Cost.

In step S2404, whether or not the current N_Cost is smaller than the stored Best_Cost is determined. When the N_Cost is smaller than the Best_Cost, it is possible to store the current N as Best_Idx and the N_Cost as Best_Cost in step S2405.

In step S2406, whether or not the current value of N is equal to the maximum value M of the prediction mode range. When the current value of N is not equal to the maximum value M of the prediction mode range, the value of N is increased by 1 in step S2407, and the process returns to step S2403. When the current value of N is equal to the maximum value M, the Best_Idx is stored as an optimal prediction mode index of the current prediction block in step S2408, and the flow ends.

Next, the Best_Idx information is encoded, and prediction information of a prediction mode corresponding to the index information is encoded.

In the case where the prediction mode is AMVP mode or merge mode (inter prediction mode), prediction information may be encoded through the same process as described with reference to FIG. 9. In the case where the prediction mode is intra prediction mode, prediction information may be encoded through the same process as described with reference to FIG. 3.

In the case where the prediction mode is DMID mode, prediction infomiation may be encoded through the same process as described with reference to FIG. 23.

Hereinabove, a method in which an image encoding apparatus encodes prediction information when a current coding block is encoded in hybrid mode has been described.

Figure 25:
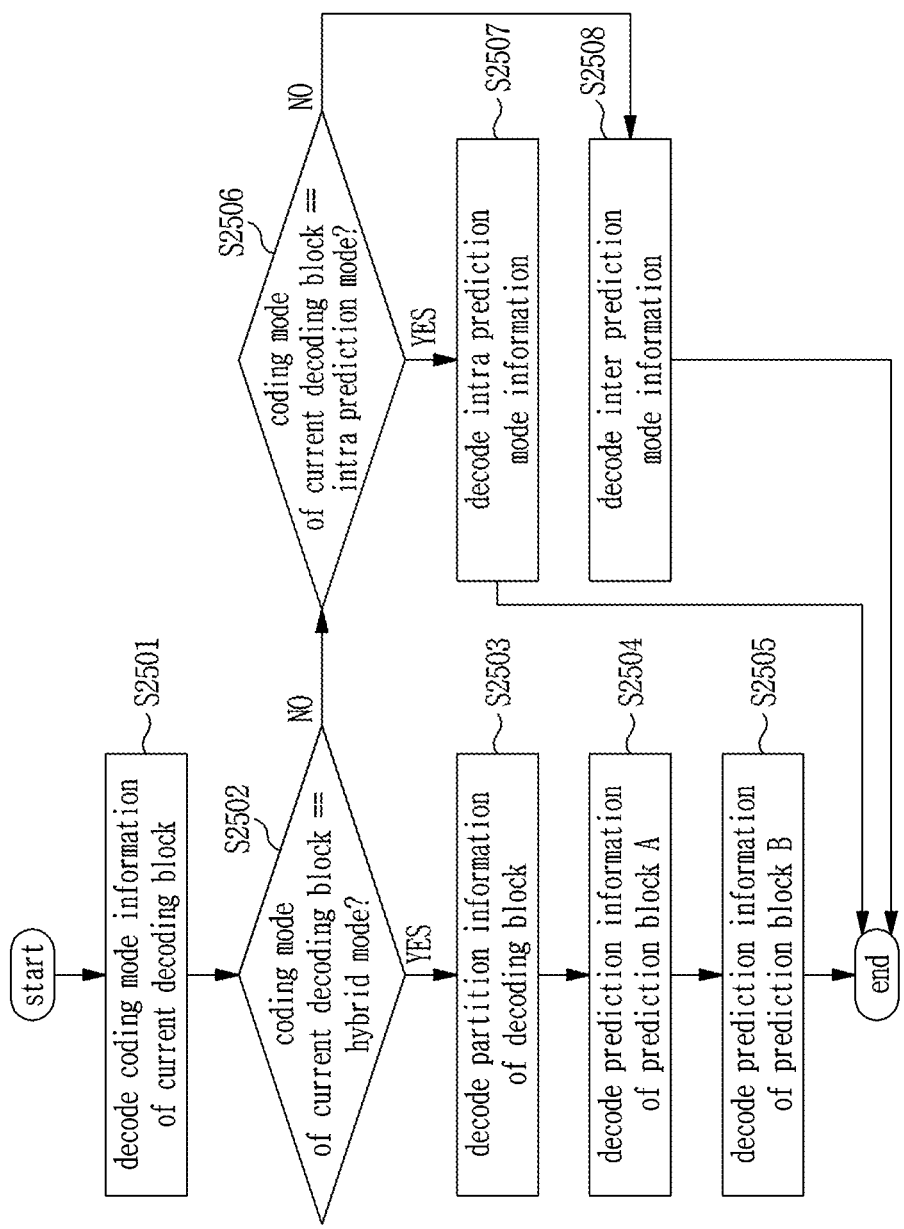
FIG. 25 is a flowchart illustrating a method of decoding prediction information in hybrid mode.

Hereinafter, a method in which an image decoding apparatus decodes prediction information when a current coding block is encoded in the hybrid mode will be described with reference to FIGS. 25 and 26. In FIG. 25, a decoding block means a coding block.

FIG. 25 is a flowchart illustrating a method of decoding prediction information in hybrid mode. FIG. 25 illustrates an example in which a current coding block is partitioned into a prediction block A and a prediction block B.

Referring to FIG. 25, coding mode information of a current coding block is decoded in step S2501. The coding mode information of the current coding block is information indicating any one mode among intra prediction mode, inter prediction mode, and hybrid mode.

It is possible to determine whether the coding mode of the current coding block is hybrid mode on the basis of the prediction mode information that is decoded in step S2501. When the coding mode of the current coding block is determined to be hybrid mode, the process proceeds to step S2503. On the other hand, when the coding mode of the current coding block is determined not to be hybrid mode, the process proceeds to step S2506.

In step S2506, it is determined whether or not the coding mode of the current coding block is intra prediction mode. When the coding mode of the current coding block is determined to be intra prediction mode, intra prediction mode information is decoded through the same process as S2007 of FIG. 20 in step S2507. Here, the method of decoding the intra prediction mode information is the same as the method illustrated in FIG. 11.

When the coding mode of the current coding block is determined not to be intra prediction mode, inter prediction mode information is decoded through the same process as S2008 of FIG. 20 in step S2508. Here, the method of decoding the inter prediction mode information is the same as the method illustrated in FIG. 12.

On the other hand, in step S2503, the partition information of the current decoding block encoded in step S2003 of FIG. 20 may be decoded.

In step S2504, the prediction information of the prediction block A that is encoded in step S2004 of FIG. 20 may be decoded.

In step S2505, the prediction information of the prediction block B encoded in step S2005 of FIG. 20 may be decoded. Here, when the prediction mode of the prediction block B is DMID mode, the prediction information may be decoded as shown in FIG. 26.

Figure 26:
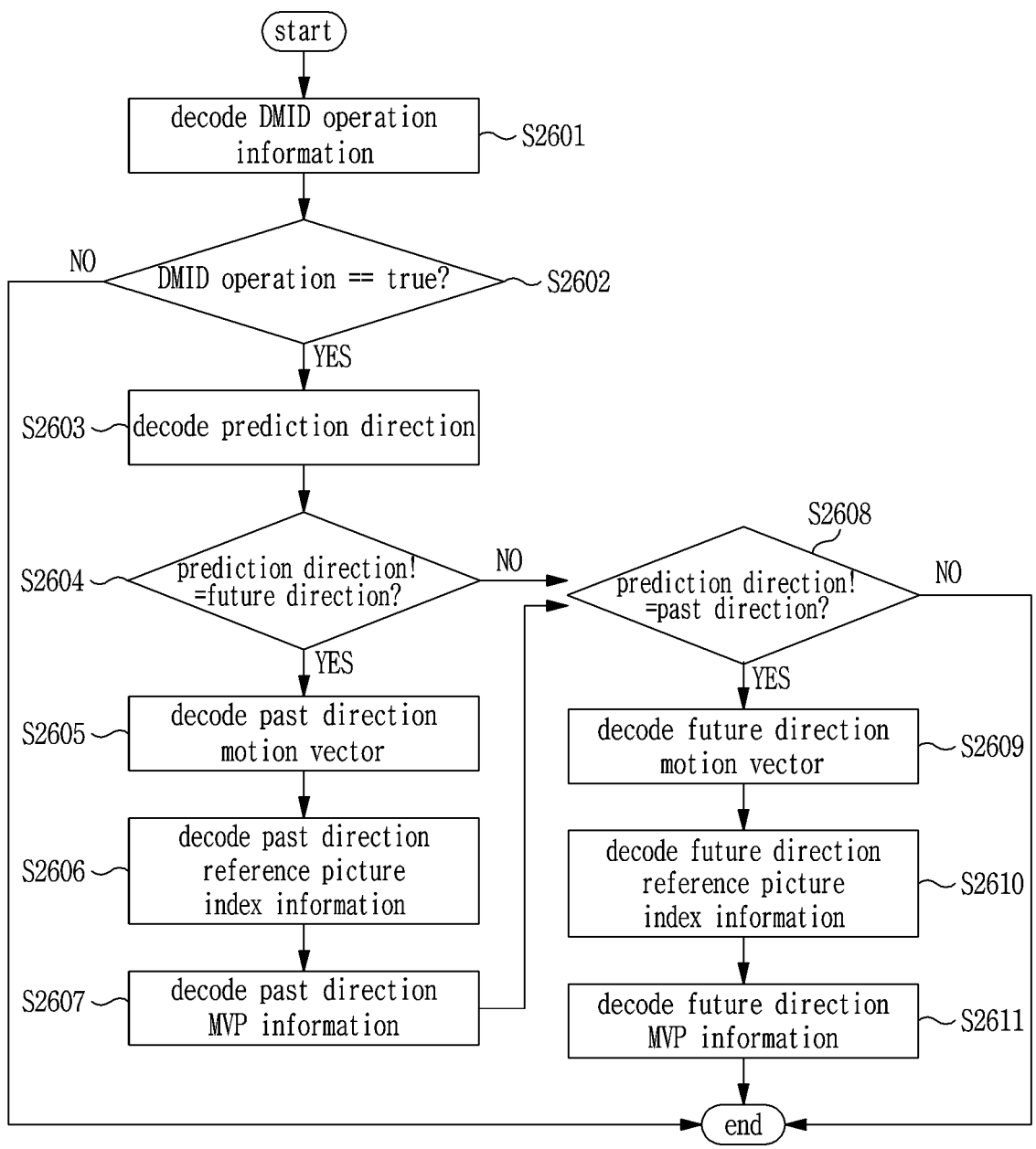
FIG. 26 is a flowchart illustrating a method of decoding prediction information in DMID mode.

FIG. 26 is a flowchart illustrating a method of decoding prediction information in DMID mode.

Referring to FIG. 26, in step S2601, the DMID operation information encoded in the step S2301 of FIG. 23 described above may be decoded.

In step S2602, it is determined whether or not DMID mode operation is to be performed on the basis of the decoded DMID operation information. When the DMID mode operation is determined not to be performed, the process flow of FIG. 26 ends. When the DMID mode operation is determined to be performed, the process proceeds to step S2603.

In step S2603, the prediction direction encoded in step S2303 of FIG. 23 described above may be decoded. When the prediction direction information has not been encoded, this step may be omitted.

In step S2604, whether or not the prediction direction is future direction is determined on the basis of the decoded prediction direction information. When the prediction direction is determined not to be future direction, the process proceeds to step S2605. When the prediction direction is determined to be future direction, the process proceeds to step S2608.

In step S2605, the past-direction motion vector encoded in step S2305 of FIG. 23 may be decoded. When the information has not been encoded, this step may be omitted.

In step S2606, the past-direction reference picture index information encoded in step S2306 of FIG. 23 may be decoded. When the information has not been encoded, this step may be omitted.

In step S2607, the past-direction MVP information encoded in step S2307 of FIG. 23 may be decoded. When the information has not been encoded, this step may be omitted.

In step S2608, whether or not the prediction direction is past direction is determined on the basis of the decoded prediction direction information. When the prediction direction is past direction, the process flow ends. When the prediction direction is not past direction, the future-direction motion vector encoded in step S2309 of FIG. 23 may be decoded in step S2609. When the information has not been encoded, this step may be omitted.

In step S2610, the future-direction reference picture index information encoded in step S2310 of FIG. 23 may be decoded. When the information has not been encoded, this step may be omitted.

In step S2611, the future-direction MVP information encoded in step S2311 of FIG. 23 may be decoded. When the information has not been encoded, this step may be omitted.

Figure 27:
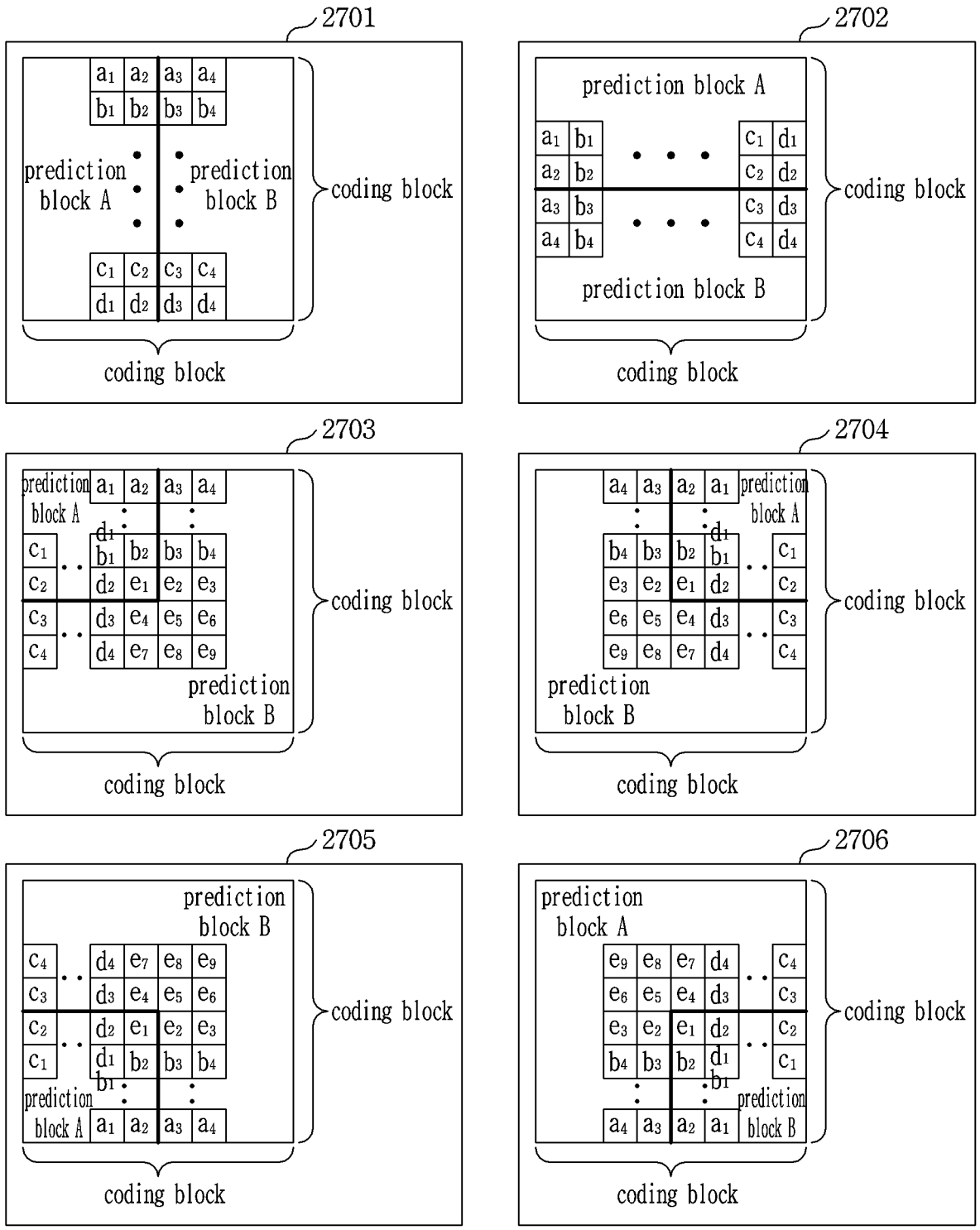
FIG. 27 is a diagram illustrating a boundary filtering method.

FIG. 27 is a diagram Illustrating a boundary filtering method according to one embodiment of the present invention.

Prediction blocks A and B generated from a current coding block may experience blocking artifacts at the boundary regions thereof. Therefore, smoothing filtering is required to smooth the boundary regions.

Referring to FIG. 27, after the prediction modes of the prediction block A and the prediction block B within the current coding block are determined and then two predicted blocks corresponding to the prediction blocks A and B are generated, filtering is performed on the boundaries of the two predicted blocks.

In FIG. 27, reference numerals 2701 and 2702 denote pixels which are to be filtered and located at the boundary between the two prediction blocks within the current coding block. The filters at the boundary between the prediction blocks are filtered. In this case, the filter tap is four and filter coefficients are W1 through W4. W1 to W4 are arbitrary real numbers, and the sum of the W1, W2, W3 and W4 (W1+W2+W3+W4) is always 1. Equation 2 shows a filtering equation for 2701 and 2702.

$$\begin{aligned} a2 &= (W1 \times a1) + (W2 \times a2) + (W3 \times a3) + (W4 \times a4) \\ a3 &= (W4 \times a1) + (W3 \times a2) + (W2 \times a3) + (W1 \times a4) \\ b2 &= (W1 \times a1) + (W2 \times a2) + (W3 \times a3) + (W4 \times a4) \\ b3 &= (W4 \times a1) + (W3 \times a2) + (W2 \times a3) + (W1 \times a4) \\ &\vdots \qquad\qquad\qquad\qquad \vdots \\ c2 &= (W1 \times a1) + (W2 \times a2) + (W3 \times a3) + (W4 \times a4) \\ c3 &= (W4 \times a1) + (W3 \times a2) + (W2 \times a3) + (W1 \times a4) \\ d2 &= (W1 \times a1) + (W2 \times a2) + (W3 \times a3) + (W4 \times a4) \\ d3 &= (W4 \times a1) + (W3 \times a2) + (W2 \times a3) + (W1 \times a4) \end{aligned} \qquad \text{[Equation 2]}$$

In FIG. 27, reference numerals 2703 through 2706 denote pixels which are to be filtered and located at the boundary between two prediction blocks within the current coding block in the case where a corner region of the current prediction bock is partitioned. In this case, diagonal filtering may be applied to boundary pixels e1, e2, e4, and e5 at the corner boundary of a prediction block. Here, d1 and b1 within one rectangular means the same pixel denoted by both b1 and d1.

Equation 3 shows a filtering equation for 2703 through 2706 in FIG. 27.

$$\begin{aligned}
a2 &= (W1 \times a1) + (W2 \times a2) + (W3 \times a3) + (W4 \times a4) \\
a3 &= (W4 \times a1) + (W3 \times a2) + (W2 \times a3) + (W1 \times a4) \\
&\vdots \\
b2 &= (W1 \times a1) + (W2 \times a2) + (W3 \times a3) + (W4 \times a4) \\
b3 &= (W4 \times a1) + (W3 \times a2) + (W2 \times a3) + (W1 \times a4) \\
e1 &= (W1 \times (b1 \text{ or } d1)) + (W2 \times e1) + (W3 \times e5) + (W4 \times e9) \\
e2 &= (W4 \times d2) + (W3 \times e1) + (W2 \times e2) + (W1 \times e3) \\
c4 &= (W4 \times b2) + (W3 \times c1) + (W2 \times c4) + (W1 \times c7) \\
e5 &= (W4 \times (b1 \text{ or } d1)) + (W3 \times e1) + (W2 \times e5) + (W1 \times e9) \\
c2 &= (W1 \times a1) + (W2 \times a2) + (W3 \times a3) + (W4 \times a4) \\
c3 &= (W4 \times a1) + (W3 \times a2) + (W2 \times a3) + (W1 \times a4) \\
&\vdots \\
d2 &= (W1 \times a1) + (W2 \times a2) + (W3 \times a3) + (W4 \times a4) \\
d3 &= (W4 \times a1) + (W3 \times a2) + (W2 \times a3) + (W1 \times a4)
\end{aligned}$$

[Equation 3]

Referring to Equation 3, diagonal filtering is applied to boundary pixels e1, e2, e4, and e5 at the corner boundary.

Figure 28:
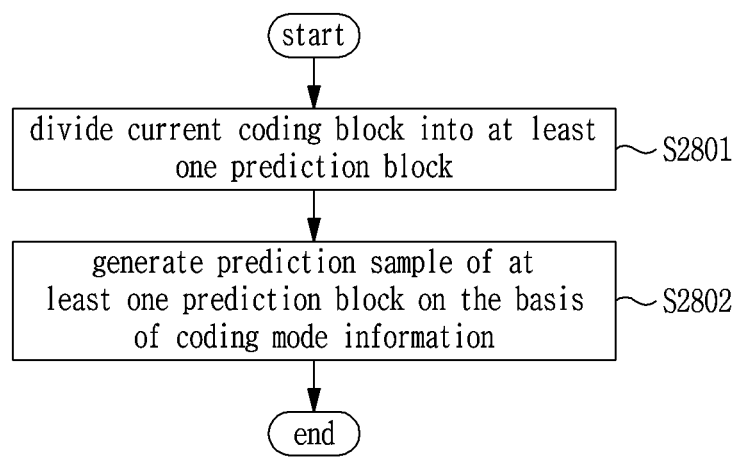
FIG. 28 is a flowchart illustrating an encoding method according to a first embodiment of the present invention.

FIG. 28 is a flowchart illustrating an image encoding method according to a first embodiment of the present invention.

Referring to FIG. 28, the image encoding apparatus may divide a current coding block into at least one prediction block in step S2801.

The image encoding apparatus may generate prediction samples of the at least one prediction block on the basis of coding mode information of the current coding block in step S2802.

The coding mode information means information indicating any one mode among intra mode, inter mode, and hybrid mode.

When the coding mode information of the current coding block indicates hybrid mode, the image encoding apparatus may divide the current coding block into a first prediction block and a second prediction block.

In this case, the image encoding apparatus may generate prediction samples of the first prediction block using prediction information of at least one neighboring block of the first prediction block. The Image encoding apparatus may generate prediction samples of the second prediction block using prediction information derived on the basis of any one mode among intra prediction mode, inter prediction mode, decoder-side motion information (DMID) mode, and decoder-side intra mode derivation (DIMD) mode.

The intra prediction modes may include planar mode, DC mode, and n angular prediction modes.

The inter prediction modes may include AMVP mode, merge mode, and skip mode.

When the coding mode information of the current coding block indicates hybrid mode, the image encoding apparatus may determine a prediction mode of the second prediction block and encode prediction mode information of the second prediction block.

At least one prediction block may be partitioned at a corner of the current coding block.

In this case, diagonal filtering may be applied to boundary pixels located at the corner boundary of a prediction block. Since a detailed description thereof has been made above with reference to FIG. 27, a redundant description will be omitted.

Figure 29:
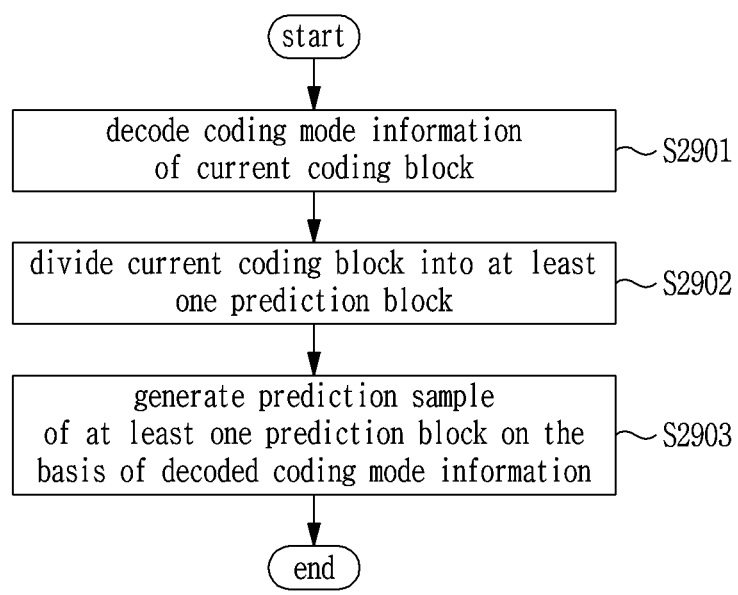
FIG. 29 is a flowchart illustrating an image decoding method according to a first embodiment of the present invention.

FIG. 29 is a flowchart illustrating an image decoding method according to a first embodiment of the present invention.

Referring to FIG. 29, the image decoding apparatus may decode the coding mode information of a current coding block in step S2901.

The coding mode information means information indicating any one mode among intra mode, inter mode, and hybrid mode.

The image decoding apparatus may divide the current coding block into at least one prediction block in step S2902.

When the coding mode information of the current coding block indicates hybrid mode, the image decoding apparatus may divide the current coding block into a first prediction block and a second prediction block.

The image decoding apparatus may generate prediction samples of the at least one prediction block on basis of the decoded coding mode information in step S2903.

When the coding mode information of the current coding block indicates hybrid mode, prediction samples of the first prediction block may be generated using prediction information of at least one neighboring block of the first prediction block, and prediction samples of the second prediction block may be generated using prediction information derived by one mode among intra prediction mode, inter prediction mode, decoder-side motion information derivation (DMID) mode, and decoder-side intra mode derivation (DIMD) mode.

In this case, the prediction information of the second prediction block may be derived by decoding the prediction mode information of the second prediction block.

The DMID mode may be a process of deriving final motion information on the basis of initial motion information derived from a neighboring block of the current coding block and of using the derived final motion information as prediction information of the prediction block within the current coding block.

The DIMD mode may be a process of setting a template block using a reconstructed region around the current coding block and of using intra prediction information that produces an optimal prediction pixel value of the template block as prediction information of the prediction block within the current block.

The optimal prediction pixel value of the template block may mean a prediction pixel value having the least difference (least error) with a reconstructed pixel value of the template block. The optimal prediction pixel value of the template block may be generated using neighboring reference pixels located around the template block.

In this case, diagonal filtering may be applied to boundary pixels located at the corner boundary of the prediction block. Since a detailed description thereof has been made above with reference to FIG. 27, a redundant description will be omitted.

A bitstream generated by the image encoding method of FIG. 28 may be recorded in a recording medium.

Figure 31:
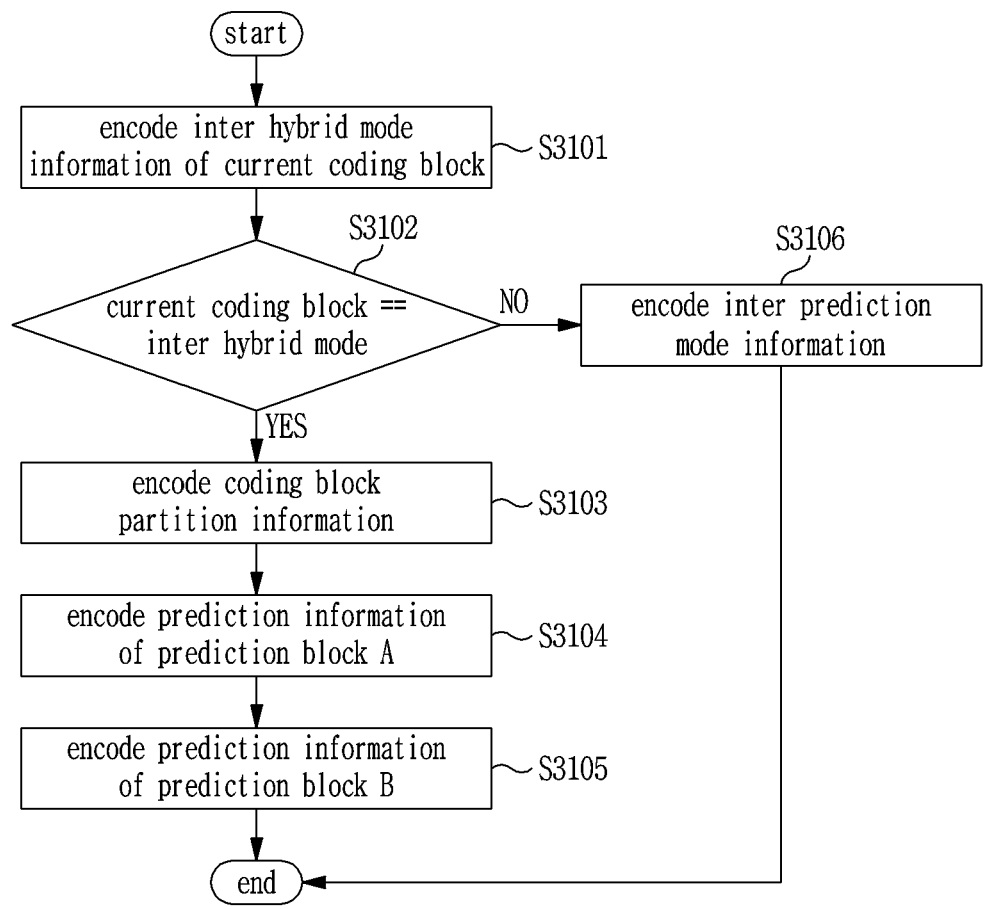
FIG. 31 is a diagram illustrating a method of encoding prediction information of a current coding block according to a second embodiment of the present invention.

FIG. 31 is a diagram illustrating a method of encoding prediction information of a current coding block according to a second embodiment of the present invention. In FIG. 31, it is assumed that the current coding block is divided into a prediction block A and a prediction block B, and the coding mode of the current coding block is inter prediction mode.

Referring to FIG. 31, inter hybrid mode information of the current coding block is encoded In step S3101. The inter hybrid mode information means information indicating whether the current coding block is to be encoded in inter hybrid mode.

The RD costs of the inter hybrid mode and the inter prediction mode are compared. When the RD cost of the inter hybrid mode is minimum, the inter hybrid mode information of the current coding block having a value of true is encoded. The inter hybrid mode information may be encoded into flags.

Figure 32:
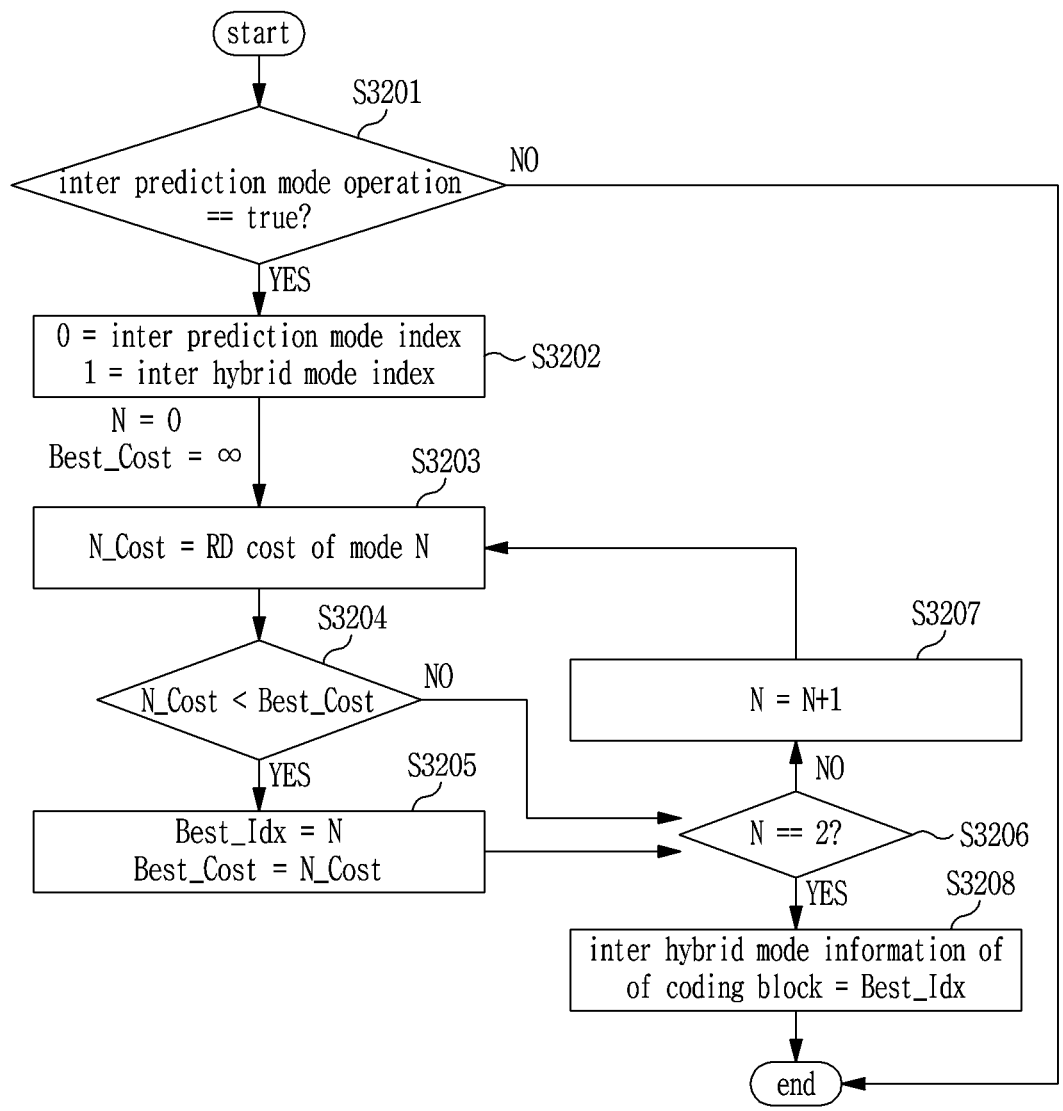
FIG. 32 is a flowchart illustrating a method of encoding information of inter hybrid mode in an image encoding apparatus.

FIG. 32 is a flowchart illustrating a method of encoding the inter hybrid mode information in the image encoding apparatus 100.

Referring to FIG. 32, in step S3201, whether or not the inter prediction mode operation is true. When the inter prediction mode operation is false, the process flow ends. When the inter prediction mode operation is true, the process proceeds to step S3202.

In step S3202, the inter prediction mode is assigned index information of zero and the inter hybrid mode is assigned index information of one.

In step S3203, the initial value of N is zero and the initial value of Best_Cosat is infinity. In this step, the RD cost of the intra prediction mode is calculated and the result is stored in N_Cost.

In step S3204, whether the N_Cost is greater than the current Best_Cost is determined. When the N_Cost is determined to be less than the current Best_Cost, the current value of N is stored in Best_ldx and the current value of the N_Cost is stored in the Best_Cost in step S3205.

In step S3206, whether the current value of N is 1 or not is determined. When the current value of N is not 1, the value of N is increased by 1 in step S3207, the process is returned to step S3203, and step S3203 and the subsequent steps are performed. When the current value of N is 1, the current value of the Best_Idx is determined as the inter hybrid mode information of the current coding block in step S3208 and the flow of FIG. 32 ends.

The intra hybrid mode information generated through the process is encoded in the step S3101 as the inter hybrid mode information of the current coding block. In addition, information on whether the inter hybrid mode operation is to be performed may be inserted into in an upper-layer header so as to be transmitted, and the inter hybrid mode operation may be controlled at the upper-layer header.

Referring back to FIG. 31, in step S3102, it is determined whether the current coding block is to be encoded in inter hybrid mode, on the basis of the inter hybrid mode information of the current coding block.

When the current coding block is determined to be encoded in inter hybrid mode, the process proceeds to step S3103 so that the partition information of the current coding block is encoded.

In this case, when the current coding block is to be divided into two halves as shown in FIG. 13, information indicating vertical partition or horizontal partition may be encoded, and then P information also may be encoded. Alternatively, index information indicating the optimal partition type to among preset partition types shown in FIG. 14 may be encoded. When the coding block is to be partitioned into a ¼ prediction block and a ¾ block as illustrated in FIG. 15, index information indicating in which direction the ¼ prediction block is located is encoded to determine the partition type of the current coding block.

In step S3104, prediction information of the prediction block A may be encoded. The prediction information of the prediction block A may be determined using merge mode. As to the method of encoding the prediction information of the prediction block A, FIG. 5 will be referred to.

In step S3104, merge mode may not be used, but prediction information of an available neighboring block having a higher priority among the neighboring blocks may be used as it is.

In step S3105, prediction information of the prediction block B is encoded.

The image encoding apparatus according to an exemplary embodiment of the present invention may determine the optimal prediction mode of the prediction block B by taking into account only one predetermined prediction mode among three prediction modes which are merge mode, AMVP mode, and DMID mode.

When the preset prediction mode is merge mode or AMVP mode, the detailed prediction information may be encoded in the same manner as the encoding method of FIG. 6 described above.

On the other hand, when the preset prediction mode is DMID mode, the prediction information may be encoded in the same manner as the encoding method of FIG. 23.

Referring back to step S5105 of FIG. 31, an image encoding apparatus according to another embodiment of the present invention may determine the optimal prediction mode of the prediction block B by taking into account two or more prediction modes among three prediction modes which are merge mode, AMVP mode, and DMID mode. A detailed description thereof will be given below with reference to FIG. 19.

Figure 33:
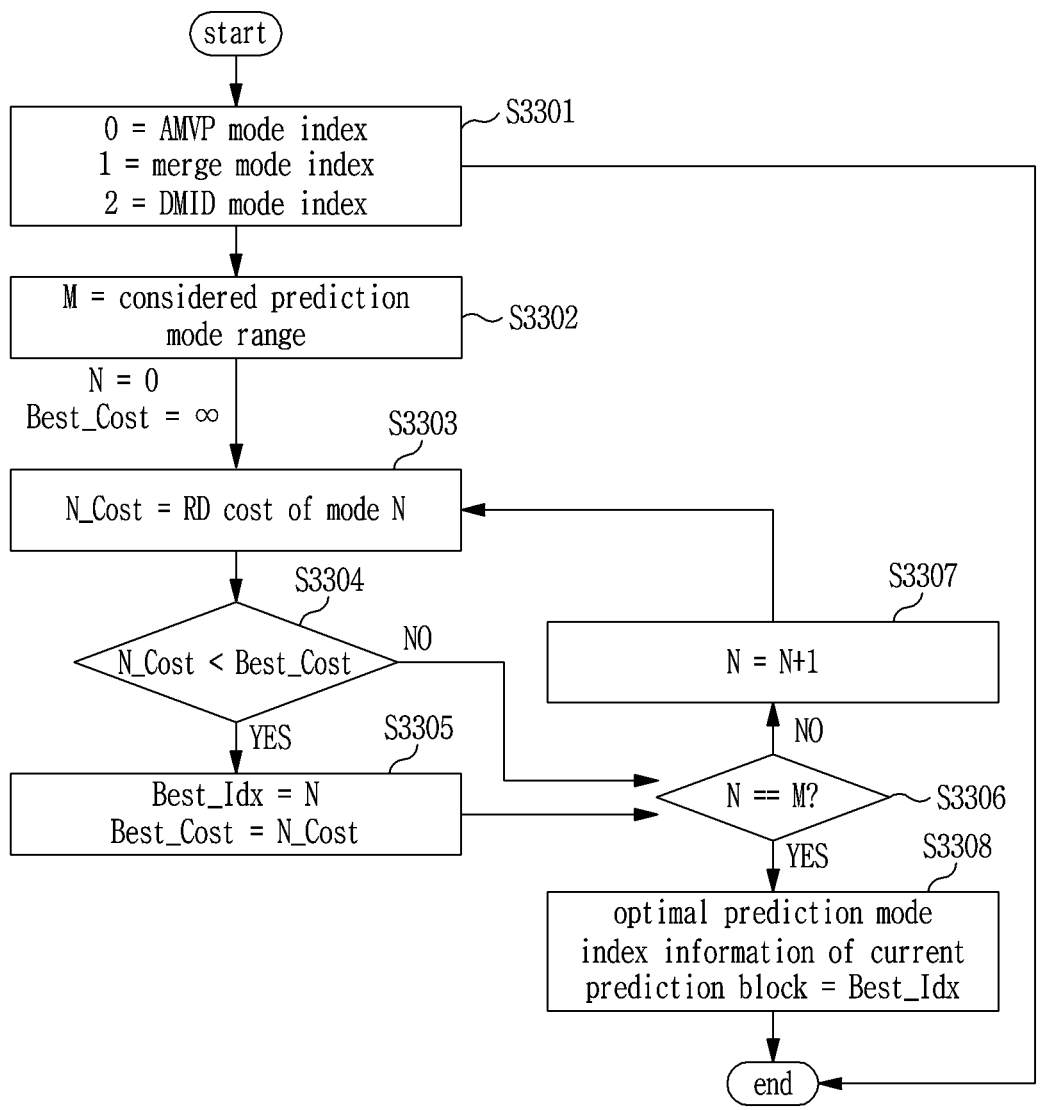
FIG. 33 is a flowchart illustrating a method of determining a prediction mode of a second prediction block in a coding block that is encoded with inter hybrid mode, in an image encoding apparatus.

FIG. 33 is a flowchart illustrating a method In which an image encoding apparatus according to a second embodiment of the present invention determines a prediction mode of a prediction block B. a decoding coding block according to a second embodiment of the present invention.

Referring to FIG. 33, in step S3301, each prediction mode may be assigned Index information. For example, VMVP mode may be assigned 0, merge mode may be assigned 1, and DMID mode may be assigned 2.

In step S3302, a mode number range of the prediction modes considered by the image encoding apparatus is determined according to M. For example, when M is 2, the prediction mode of the prediction block B may be determined from among only three prediction modes: AMVP mode, merge mode, and DMID mode.

In step S3303, the initial value of N is 0 and the initial value of Best_Cost is infinity. First, RD cost of mode number 0 is calculated and the result is stored in N_Cost.

In step S3304, whether or not the current N_Cost is smaller than the stored Best_Cost is determined. When the N_Cost is smaller than the Best_Cost, it is possible to store the current N as Best_Idx and the N_Cost as Best_Cost in step S3305.

In step S3306, whether or not the current value of N is equal to the maximum value M of the prediction mode range. When the current value of N is not equal to the maximum value M of the prediction mode range, the value of N is increased by 1 in step S3307, and the process returns to step S3303. When the current value of N is equal to the maximum value M, the Best_Idx is stored as an optimal prediction mode index of the current prediction block in step S3308, and the flow ends.

Next, the Best_Idx information is encoded, and prediction information of a prediction mode corresponding to the index information is encoded.

In the case where the prediction mode is AMVP mode or merge mode, prediction information may be encoded through the same process as described with reference to FIG. 6. In the case where the prediction mode is DMID mode, prediction information may be encoded through the same process as described with reference to FIG. 23.

Hereinabove, a method in which an image encoding apparatus encodes prediction information when a current coding block inter is encoded in inter hybrid mode has been described.

Figure 34:
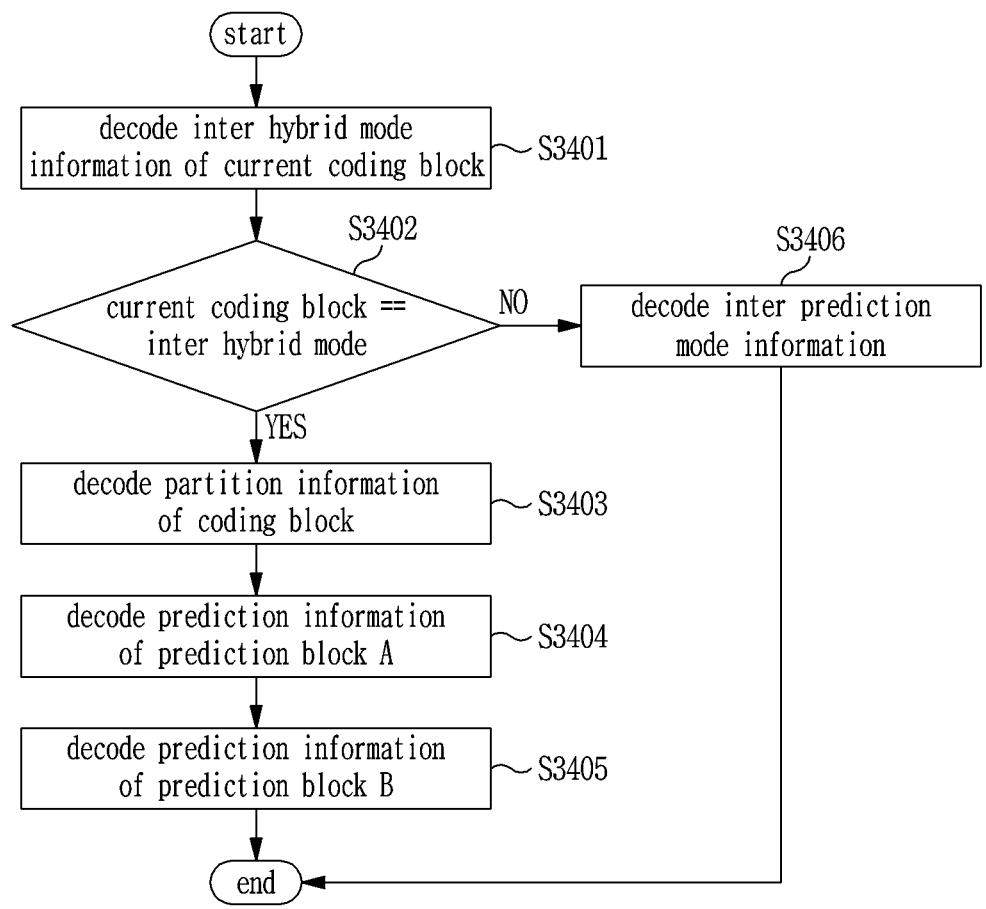
FIG. 34 is a diagram illustrating a method of decoding prediction information of a current coding block according to a second embodiment of the present invention.

Hereinbelow, a method in which an image decoding apparatus according to a second embodiment of the present invention decodes prediction information of a current coding block will be described with reference to FIG. 34. In FIG. 34, a coding mode of a current coding block is assumed to be inter prediction mode. Here, a current decoding block means a current coding block.

Referring to FIG. 34, inter hybrid mode information of the current coding block is decoded in step S3401.

In step S3402, whether the current decoding block has been encoded in inter hybrid mode on the basis of the decoded inter hybrid mode information.

When the current coding block is determined to be encoded in inter hybrid mode, the process proceeds to step S3403 so that the partition information of the current coding block is decoded.

On the other hand, in step S3403, the partition information of the current decoding block which has been encoded in step S3103 of FIG. 31 may be decoded. The current coding block may be divided using the decoded partition information. Since the detailed description regarding this has been given above with reference to FIGS. 13 through 1b, a redundant description will be omitted.

In step S3404, the prediction information of the prediction block A that is encoded in step S3104 of FIG. 31 may be decoded. Specifically, in step S3104, the prediction information of the prediction block A may be derived from the prediction information of a neighboring block that is selected from among neighboring blocks on the basis of index information (or merge index information) of the neighboring blocks. Alternatively, the prediction information of an available neighboring block having a higher priority among predetermined available neighboring blocks may be derived as the prediction information of the prediction block A.

In step S3405, the prediction information of the prediction block B encoded in step S3105 of FIG. 31 may be decoded. Here, when the prediction mode of the prediction block B is DMID mode, the prediction information may be decoded as shown in FIG. 26.

Figure 35:
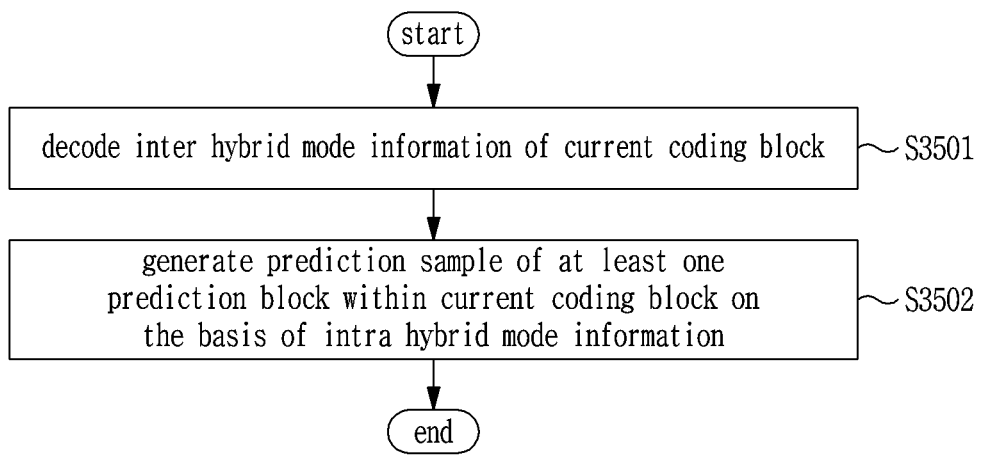
FIG. 35 is a flowchart illustrating an image decoding method according to a second embodiment of the present invention.

FIG. 35 is a flowchart illustrating an image decoding method according to a second embodiment of the present invention;

Referring to FIG. 35, the image decoding apparatus may decode inter hybrid mode information of a current coding block in step S3101.

The image decoding apparatus may generate prediction samples of the at least one prediction block within the current coding block on the basis of the inter hybrid mode information in step S3502. A detailed description of step S3502 will be made below with reference to FIG. 24.

Figure 36:
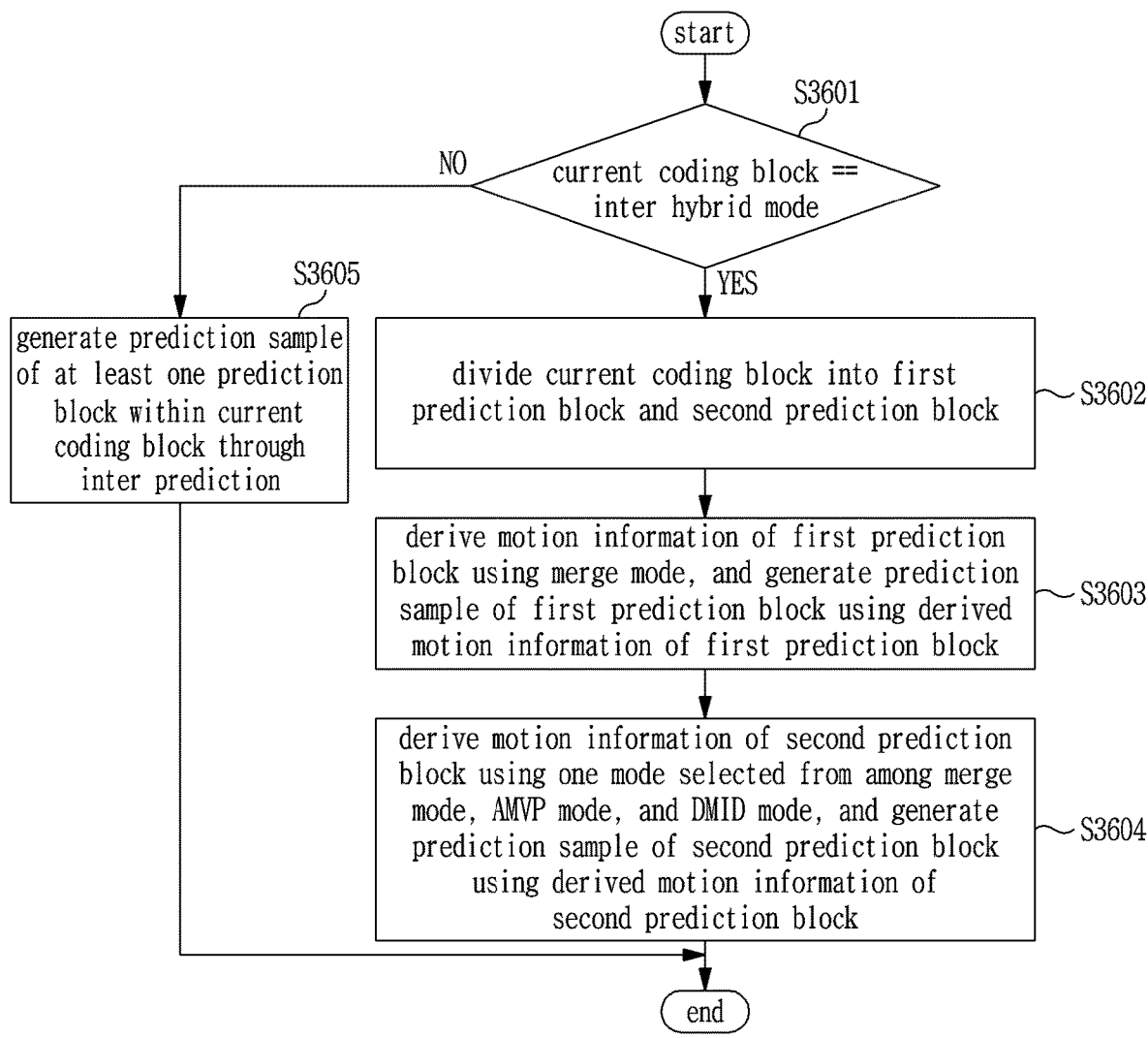
FIG. 36 is a flowchart illustrating the image decoding method according to the second embodiment of the present invention.

FIG. 36 is a flowchart illustrating the image decoding method according to the second embodiment of the present invention.

Referring to FIG. 36, when the current coding block is in inter hybrid mode (Yes in 83601), the image decoding apparatus may divide the current coding block into a first prediction block and a second prediction block in step S3602.

The first prediction block and the second prediction block may be prediction blocks obtained by partitioning a corner of the current coding block as illustrated in FIG. 11.

In this case, as having been described with reference to FIG. 27, diagonal filtering may be applied to pixels adjacent to the corner boundary of the first prediction block.

The image decoding apparatus derives the motion information of the first prediction block using merge mode, and generates prediction samples of the first prediction block using the derived motion information of the first prediction block in step S3603.

The image decoding apparatus derives motion information of the second prediction block using one mode selected among merge mode, AMVP mode, decoder-side motion information derivation (DMID) mode and generates prediction samples of the second prediction block using the derived motion information of the second prediction block in step S3604.

Here, The DMID mode may be a process of deriving final motion information on the basis of initial motion information derived from a neighboring block of the current coding block and of using the derived final motion information as the prediction information of the prediction block within the current coding block.

On the other hand, the image decoding apparatus may decode the inter prediction mode of the second prediction block and determine the prediction mode used to derive the motion information of the second prediction block. The inter prediction mode information of the second prediction block may be information signaled from the image encoding apparatus.

FIG. 36 is a flowchart illustrating an image encoding method according to a second embodiment of the present invention.

Figure 37:
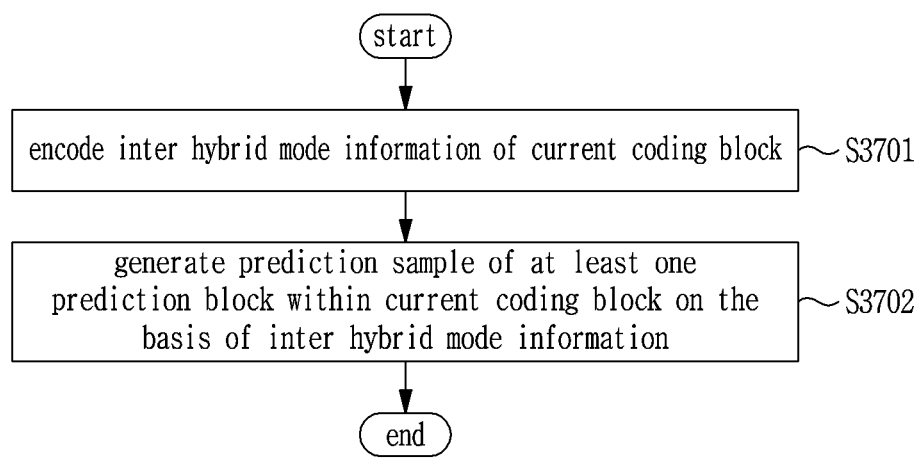
FIG. 37 is a flowchart illustrating an image encoding method according to a second embodiment of the present invention.

Referring to FIG. 37, an image encoding apparatus may encoded inter hybrid mode information of a current coding block in step S3701.

An image decoding apparatus may generate prediction samples of at least one prediction block within the current coding block on the basis of the inter hybrid mode infomiation in step S3702.

Next, Step S3702 will be described below in detail. The image encoding apparatus divides a current coding block into a first prediction block and a second prediction block when the current coding block is encoded in inter hybrid mode. Next, the image encoding apparatus may derive motion information of the first prediction block using merge mode and generate prediction samples of the first prediction block using the derived motion information of the first prediction block. Next, the image encoding apparatus may derive motion information of the second prediction block using one mode selected among merge mode, AMVP mode, decoder-side motion information derivation (DMID) mode and generate prediction samples of the second prediction block using the derived motion information of the second prediction block.

A bitstream generated by the image encoding method of FIG. 37 may be recorded in a recording medium.

Hereinbelow, inter hybrid mode according to one embodiment of the present invention will be described.

The inter hybrid mode is one of the intra prediction modes. When the coding mode of the current coding block is intra prediction mode and intra hybrid mode, the prediction information of the first prediction block (prediction block A) is determined using the intra prediction information of a neighboring block as it is, and the prediction information of the second prediction block (prediction block B) is determined on a per prediction block basis using the same method as illustrated in FIG. 3 or determined on a per prediction block basis using the DIMD.

The DIMD mode refers to a prediction mode in which an intra prediction mode which is not encoded by the image encoding apparatus 100 is directly derived without encoding by the image decoding apparatus 1000 and prediction samples of a prediction block are generated by using the derived intra prediction mode.

For example, in the DMID mode, the image decoding apparatus 1000 derives intra prediction modes of the neighboring blocks, derives a final intra prediction mode of the prediction block on the basis of the derived intra prediction modes, and generates prediction samples of the prediction block.

FIG. 30 shows a method of searching for prediction information in DIMD mode. FIG. 30 illustrates examples of neighboring template regions for each partition type when searching for a prediction mode of the prediction block B within the current coding block using DIMD mode. A template region may be determined by using a previously reconstructed region located around the current coding block.

A template region on the upper side is denoted by AboveTemplate and a template region on the left side is denoted by LeftTemplate.

The above template region AboveTemplate has a width W and a height AT, the left template region LeftTemplate has a width LT and a height H, and pixels on R pixel lines in each template region may be used. The template region may also be referred to as a template block.

An intra prediction mode that can generate a prediction pixel value having the least error with a reconstructed pixel value within the template region may be searched for. The intra prediction mode detected in this way is determined as prediction information of the template region, and the prediction information is used as prediction information of the current block.

When the intra mode coding block is not encoded in intra hybrid mode, the prediction information may be determined on a per prediction block basis as illustrated in FIG. 3.

The method of determining the prediction Information of the prediction block A using the intra prediction information of a neighboring block as it is will be described below. The prediction information may be an intra prediction mode.

When generating prediction samples of the prediction block A, the optimal prediction information of the prediction block A is searched from prediction information of previously encoded neighboring blocks located around the prediction block A, and the prediction samples of the prediction block A are generated by determining the detected optimal prediction sample as the prediction information of the prediction block A as they are.

When determining the prediction information of the prediction block B, the optimal prediction mode is searched for from among planar mode, DC mode, and N angular modes using the neighboring reference pixels of the prediction block, and the prediction samples may be generated using the prediction information. Alternatively, the optimal prediction mode is searched using DMID mode, and the prediction samples may be generated using the prediction information.

However, in some cases, the prediction information of the prediction block B may be determined by referring to the prediction information of the prediction block A Here, the cases will be described below.

In the image decoding apparatus, in the DMID mode, the prediction information is searched for while assuming the difference between the reconstructed pixel value of the template region and the predicted pixel value of the template region obtained by using the reference pixels around the template region as an error used for calculation of the RD cost, instead of the difference between the prediction block and the original block.

The prediction information of the prediction block B may be determined by referring to the prediction information of the prediction block A depending on a transform block partition structure.

When the current transform block partition structure is the PU-based RT structure, the prediction information of the prediction block B cannot be determined by referring to the prediction information of the prediction block A.

On the other hand, when the current transform block partition structure is the PU-based RT structure, the prediction information of the prediction block B may be determined by referring to the prediction Information of the prediction block A.

On the other hand, the prediction information of the prediction block B may be determined on a per prediction block basis as described above. In this case, as described above in connection with the prediction module 102 of the image encoding apparatus 100 of FIG. 1, prediction information may be determined on a per prediction block basis, and prediction blocks may be generated using the determined intra prediction mode or DIMD mode.

Figure 38:
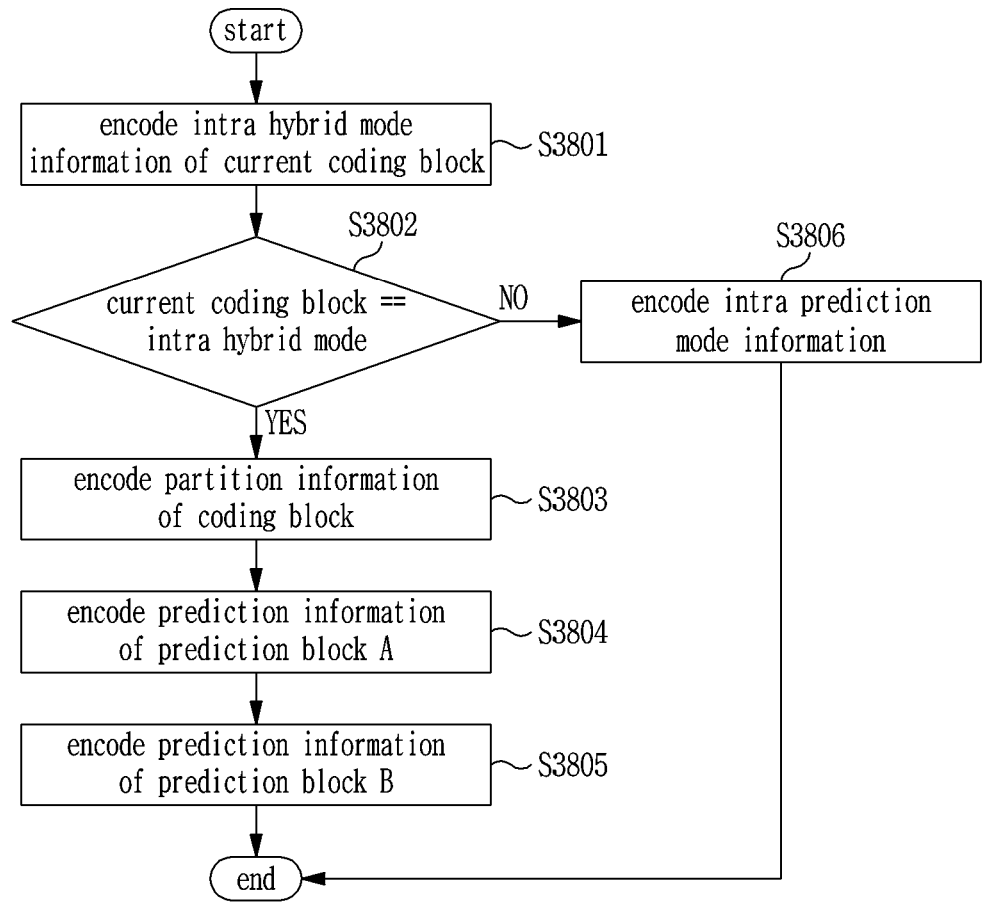
FIG. 38 is a diagram illustrating a method of encoding prediction information of a current coding block according to a third embodiment of the present invention.

FIG. 38 is a diagram illustrating a method of encoding prediction information of a current coding block. In FIG. 38, it is assumed that a current coding block is divided into a prediction block A and a prediction block B and the coding mode of the current coding block is intra mode.

Referring to FIG. 38, intra hybrid mode information of the current coding block is encoded in step S3801. The intra hybrid mode information means information indicating whether the current coding block is to be encoded in intra hybrid mode.

The RD costs of the intra hybrid mode and the intra prediction mode are compared. When the RD cost of the intra hybrid mode is minimum, the intra hybrid mode information of the current coding block having the minimum RD cost may be encoded. The intra hybrid mode information may be encoded into flags.

Figure 39:
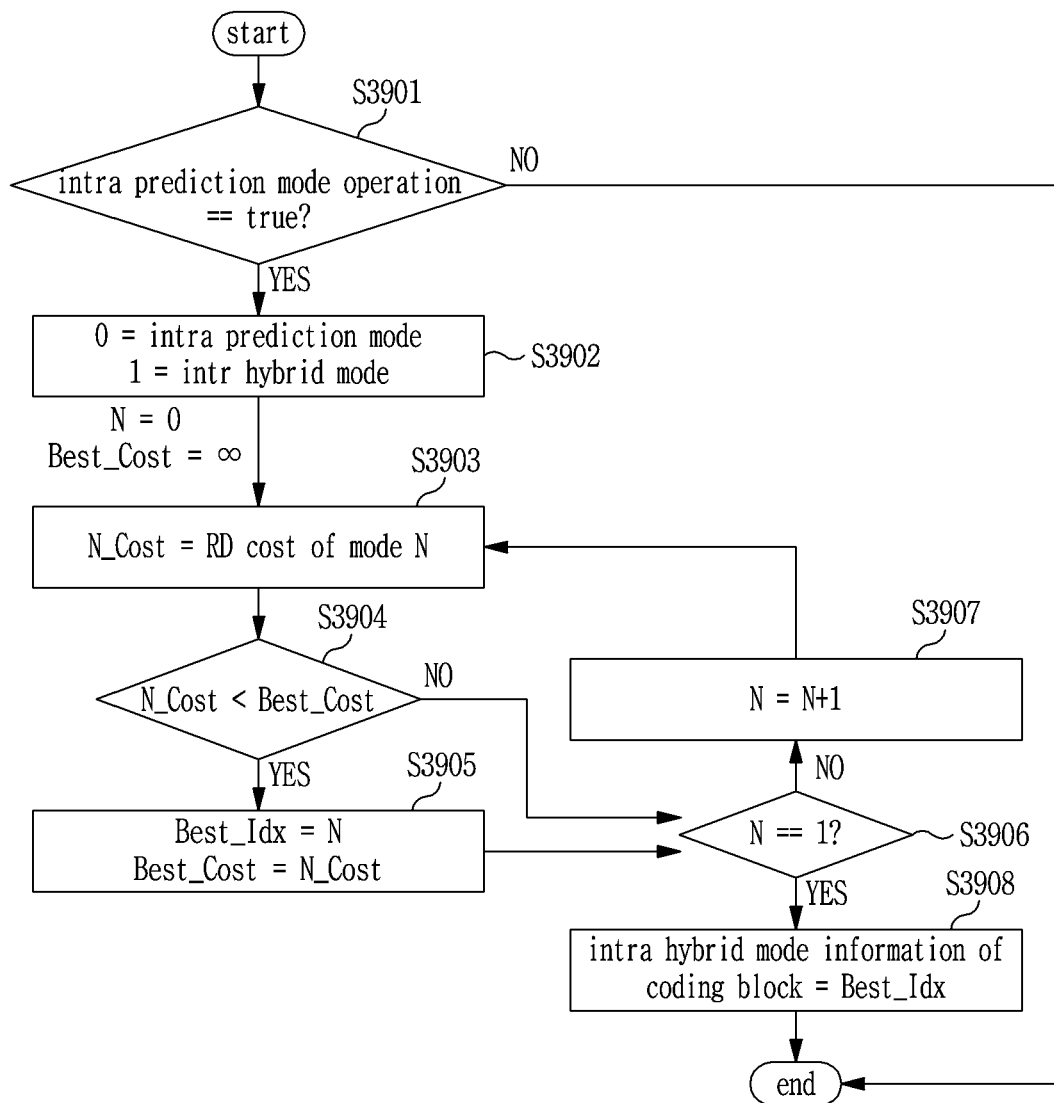
FIG. 39 is a flowchart illustrating a method of encoding information of intra hybrid mode in an image encoding apparatus.

FIG. 39 is a flowchart illustrating a method of encoding intra hybrid mode information in the image encoding apparatus 100.

Referring to FIG. 39, in step S3901, whether or not the intra prediction mode operation is true. When the intra prediction mode operation is false, the process flow ends. When the intra prediction mode operation is true, the process proceeds to step S3902.

In step S3902, the intra prediction mode is assigned index information of zero and the intra hybrid mode is assigned index information of one.

In step S3903, the initial value of N is zero and the initial value of Best_Cosat is infinity. In this step, the RD cost of the intra prediction mode is calculated and the result is stored in N_Cost.

In step S3904, whether the N_Cost is greater than the current Best_Cost is determined. When the N_Cost is determined to be less than the current Best_Cost, the current value of N is stored in Best_Idx and the current value of the N_Cost is stored in the Best_Cost in step S390b.

In step S3906, whether the current value of N is 1 or not is determined. When the current value of N is not 1, the value of N is increased by 1 in step S3907, the process is returned to step S3903, and step S3903 and the subsequent steps are performed. When the current value of N is 1, the current value of the Best_Idx is determined as the intra hybrid mode information of the current coding block in step S3908 and the flow of FIG. 39 ends.

The intra hybrid mode information generated through the process is encoded in the step S3901 as the intra hybrid mode information of the current coding block. In addition, information on whether the intra hybrid mode operation is to be performed may be inserted into in an upper-layer header so as to be transmitted, and the intra hybrid mode operation may be controlled at the upper-layer header.

Referring back to FIG. 38, in step S3802, it is determined whether the current coding block is to be encoded in intra hybrid mode, on the basis of the intra hybrid mode information of the current coding block.

When the current coding block is determined to be encoded in intra hybrid mode, the process proceeds to step S3803 so that the partition information of the current coding block is encoded.

In this case, when the current coding block is to be divided into two parts as shown in FIG. 13, information indicating vertical partition or horizontal partition may be encoded, and then P information also may be encoded. Alternatively, index information indicating the optimal partition type among preset partition types shown in FIG. 14 may be encoded. When the coding block is to be partitioned into a ¼ prediction block and a ¾ prediction block as illustrated in FIG. 15, index information indicating in which direction the ¼ prediction block is located is encoded to determine the partition type of the current coding block.

In step S3804, prediction information of the prediction block A may be encoded. Among prediction information of neighboring blocks, index information of a neighboring block having prediction information that is the most optimal for the prediction block A may be encoded.

Figure 40:
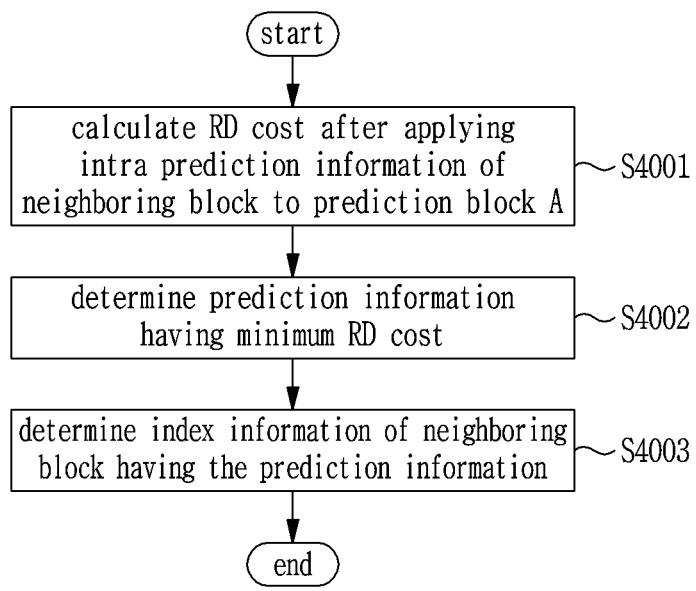
FIG. 40 is a flowchart illustrating a method of determining prediction information of a first prediction block in a coding block that is encoded with intra hybrid mode in an image encoding apparatus.

FIG. 40 is a flowchart illustrating a method of encoding prediction information of a first prediction block within a coding block that is to be encoded in intra hybrid mode in an image encoding apparatus.

Referring to FIG. 40, in step S4001, prediction information of available neighboring blocks is applied to the prediction block A to generate a prediction block, and the RD cost for each prediction information is calculated.

In step S4002, prediction information having the least RD cost is selected from among the multiple prediction information entries. In step S4003, Index information of a neighboring block having the selected prediction information may be stored.

On the other hand, the process of FIG. 40 may not be performed. That is, prediction information of an available neighboring block having a higher priority among the neighboring blocks may be used as it is.

In step S3805, the prediction information of the prediction block B is encoded. The prediction information of the prediction block B may be encoded using the intra prediction coding method of FIG. 3 described above or may be encoded by transmitting DIMD mode information (or flag information) indicating the DIMD mode.

In S3806, when the current coding block is a block that is not encoded with intra hybrid mode, encoding may be performed on a per prediction block basis using the intra prediction coding method of FIG. 3 described above.

Figure 41:
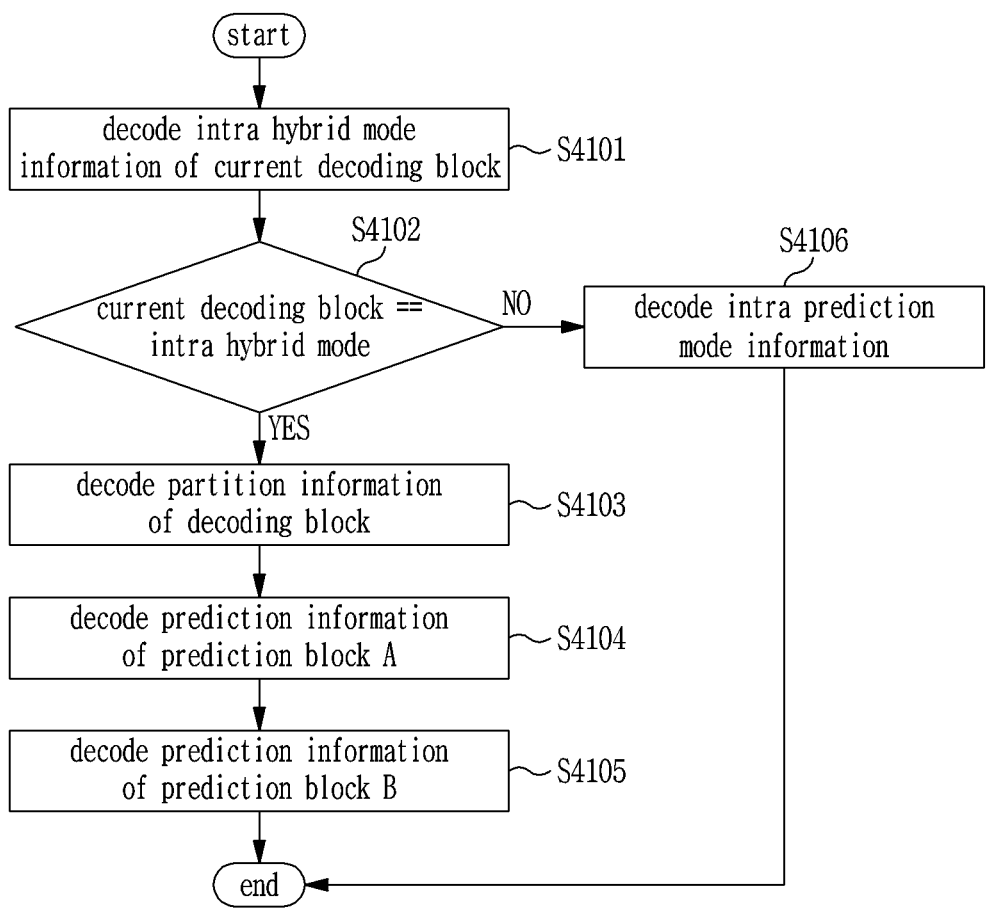
FIG. 41 is a flowchart illustrating a method of decoding prediction information of a current coding block according to a third embodiment of the present invention.

FIG. 41 is a diagram illustrating a method of decoding prediction information of a current decoding block. In FIG. 41, it is assumed that a current decoding block is divided into a prediction block A and a prediction block B and the coding mode of the current coding block is intra mode. Here, a current decoding block means a current coding block.

Referring to FIG. 41, intra hybrid mode information of the current decoding block may be decoded in step S4101.

In step S4102, whether the current decoding block has been encoded in intra hybrid mode may be determined on the basis of the decoded intra hybrid mode information.

When the current decoding block is determined to be encoded in intra hybrid mode, the process proceeds to step S4103 so that the partition information of the current coding block may be decoded.

On the other hand, in step S4103, the partition information of the current decoding block which has been encoded in step S4803 of FIG. 48 may be decoded. The current coding block may be divided using the decoded partition information. Since the detailed description regarding the partitioning has been given above with reference to FIGS. 13 through 15, a redundant description will be omitted here.

In step S4104, the prediction information of the prediction block A that is encoded in step S3804 of FIG. 38 may be decoded. Specifically, in step S4104, the prediction information of the prediction block A may be derived from the prediction information of a neighboring block that is selected from among neighboring blocks on the basis of index information of the neighboring blocks. Alternatively, the prediction information of an available neighboring block having a higher priority among predetermined available neighboring blocks may be derived as the prediction information of the prediction block A.

In step S4105, the prediction information of the prediction block B encoded in step S3805 of FIG. 38 may be decoded.

In S4106, when the current decoding block is a block that is not encoded with intra hybrid mode, the decoding may be performed on a per prediction block basis using the intra prediction decoding method of FIG. 11 described above.

Figure 42:
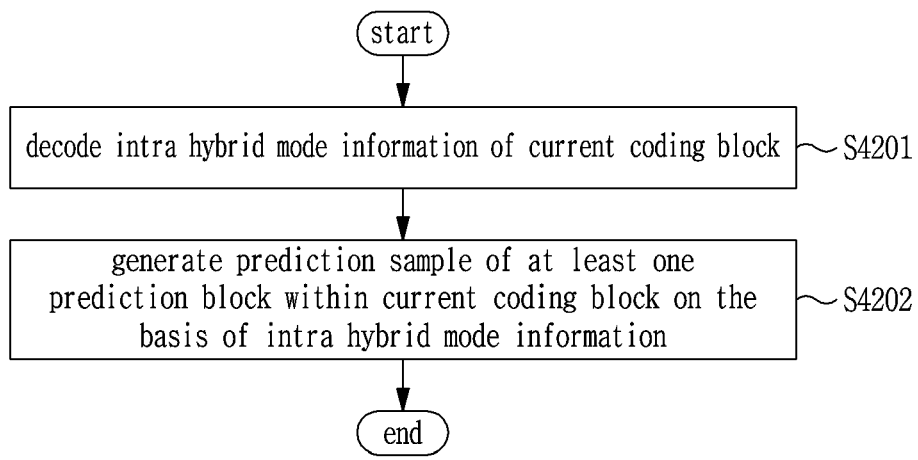
FIG. 42 is a flowchart illustrating an image decoding method according to a third embodiment of the present invention.

FIG. 42 is a flowchart illustrating an image decoding method according to a third embodiment of the present invention.

Referring to FIG. 42, the image decoding apparatus may decode intra hybrid mode information of a current coding block in step S4201.

The image decoding apparatus may generate prediction samples of at least one prediction block within the current coding block on the basis of the intra hybrid mode information in step S4202. A detailed description of step S4202 will be made below with reference to FIG. 43.

Figure 43:
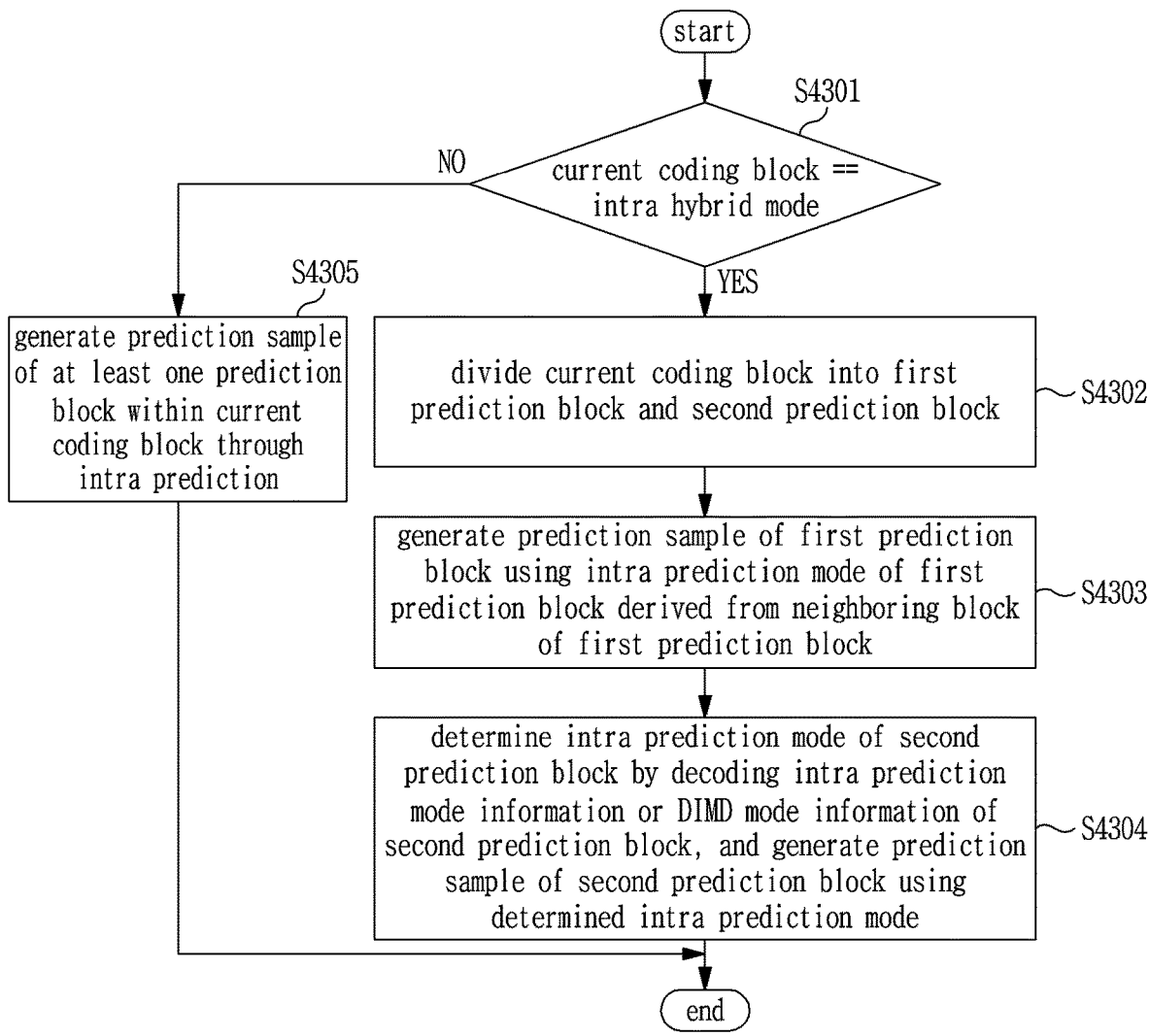
FIG. 43 is a flowchart illustrating the image decoding method according to the third embodiment of the present invention.

FIG. 43 is a flowchart illustrating ¼ image decoding method according to one embodiment of the present invention.

Referring to FIG. 43, when the current coding block is in intra hybrid mode (Yes in S4301), the image decoding apparatus may divide the current coding block into a first prediction block and a second prediction block in step S4302.

The first prediction block and the second prediction block may be prediction blocks obtained by partitioning a corner of the current coding block as illustrated in FIG. 15.

In this case, as having been described with reference to FIG. 27, diagonal filtering may be applied to pixels adjacent to the corner boundary of the first prediction block.

The image decoding apparatus may generate prediction samples of the first prediction block using an intra prediction mode of the first prediction block, which is derived from a neighboring block of the first prediction block, in step S4303.

The image decoding apparatus may derive the intra prediction mode of a neighboring block that is selected from among neighboring blocks of the first prediction block according to a preset priority order as the intra prediction mode of the first prediction block.

Alternatively, the image decoding apparatus may derive the intra prediction mode of a neighboring block that is determined on the basis of the index information of the neighboring blocks of the first prediction block as the intra prediction mode of the first prediction block. Here, the index information of the neighboring block may be information signaled from the image encoding apparatus.

The image decoding apparatus determines the intra prediction mode of the second prediction block by decoding the intra prediction mode information or the DIMD mode information and generates the prediction samples of the second prediction block using the determined intra prediction mode in step S4304.

When the mode of the current coding block is not intra hybrid mode (No in S4301), the image decoding apparatus may generate the prediction samples of at least one prediction block within the current coding block through the intra prediction in step S4305. That is, as described with reference to FIG. 6, it is possible to generate the prediction samples on a per prediction block basis by deriving the intra prediction mode.

Figure 44:
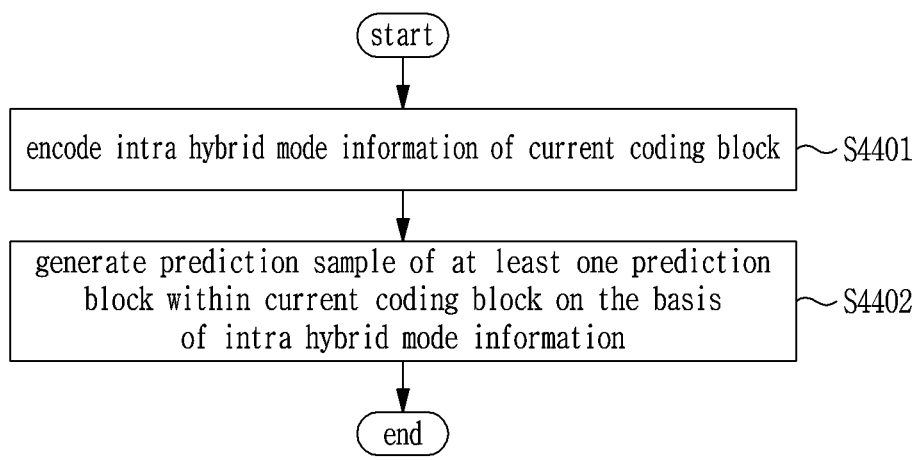
FIG. 44 is a flowchart illustrating an image encoding method according to the third embodiment of the present invention.

FIG. 44 is a flowchart illustrating an image encoding method according to one embodiment of the present invention.

Referring to FIG. 44, the image encoding apparatus encodes intra hybrid mode information of the current coding block in step S4401.

The image encoding apparatus may generate prediction samples of at least one prediction block within the current coding block on the basis of the intra hybrid mode information in step S4402.

Next, Step S4402 will be described below in detail. The image encoding apparatus divides a current coding block into a first prediction block and a second prediction block when the current coding block is encoded in intra hybrid mode. Next, the image encoding apparatus may generate prediction samples of the first prediction block using the intra prediction mode of the first prediction block derived from a neighboring block of the first prediction block. The image encoding apparatus determines the intra prediction mode of the second prediction block on the basis of the intra prediction mode information or the DIMD mode of the second prediction block, and generates the prediction samples of the second prediction block using the determined intra prediction mode.

A bitstream generated by the image encoding method of FIG. 44 may be recorded in a recording medium.

Although the exemplary methods of the present disclosure are represented by a series of steps for clarity of description, they are not intended to limit the order in which the steps are performed. That is, if necessary, each step may be performed in parallel or performed in series in a different order. In order to implement the method according to the present disclosure, each of the embodiments described above can be modified such that some additional steps can be added to a corresponding embodiment or some existing steps can be eliminated from a corresponding embodiment.

Alternatively, some additional steps are added and some existing steps are eliminated from a corresponding of the embodiments.

Various embodiments in the present disclosure are not intended to represent all of the possible combinations based on technical spirit of the present invention but are provided only for illustrative purposes. Elements or steps described in various embodiments can be applied independently or in combination.

Various embodiments in the present disclosure can be implemented by hardware, firmware, software, or a combination thereof. When implemented by hardware, each of the embodiments can be implemented by one or more application specific integrated circuits (ASICs), digital signal processors (DSPs), digital signal processing devices (DSPOs), programmable logic devices (PLDs), field programmable gate arrays (FPGAs), general processors, controllers, micro controllers, or micro-processors.

The scope of the present disclosure covers software or machine-executable commands (for example, operating systems (OSs), application programs, firmware, programs) that enable steps in to various embodiments to be performed in a certain device or computer, and a non-transitory computer-readable medium in which such software or commands are stored so as to be executable in a certain device or computer when read out.

INDUSTRIAL APPLICABILITY

The present invention can be used to encode/decode an image.

The invention claimed is:

1. A method of decoding an image signal, comprising:
dividing a current coding block into a plurality of sub-blocks, the plurality of sub-blocks including a first sub-block and a second sub-block;
generating a prediction sample of the first sub-block by using an intra prediction mode derived from a neighboring block, the neighboring block including at least one of a rightmost neighboring block among top neighboring blocks adjacent to the current coding block or a bottommost neighboring block among left neighboring blocks adjacent to the current coding block; and
generating a prediction sample of the second sub-block by using the intra prediction mode used to generate the prediction sample of the first sub-block,
wherein the first sub-block includes a top-left pixel in the current coding block,
wherein the second sub-block includes a bottom-right pixel in the current coding block,
wherein a size of the second sub-block is ¼ of a size of the current coding block, and
wherein the intra prediction mode is a directional intra prediction mode or a non-directional intra prediction mode.

2. The method of claim 1, wherein a division type of the division of the current coding block is determined based on division type information signaled from a bitstream.

3. The method of claim 2, wherein the division type of the division of the current coding block includes dividing the current coding block into ¼ size.

4. The method of claim 3, wherein whether to divide the current coding block is determined based on mode information signaled from the bitstream.

5. A method of encoding an image signal, comprising:
dividing a current coding block into a plurality of sub-blocks, the plurality of sub-blocks including a first sub-block and a second sub-block;
generating a prediction sample of the first sub-block by using an intra prediction mode derived from a neighboring block, the neighboring block including at least one of a rightmost neighboring block among top neighboring blocks adjacent to the current coding block or a bottommost neighboring block among left neighboring blocks adjacent to the current coding block; and
generating a prediction sample of the second sub-block by using the intra prediction mode used to generate the prediction sample of the first sub-block,
wherein the first sub-block includes a top-left pixel in the current coding block,
wherein the second sub-block includes a bottom-right pixel in the current coding block,
wherein a size of the second sub-block is ¼ of a size of the current coding block, and
wherein the intra prediction mode is a directional intra prediction mode or a non-directional intra prediction mode.

6. A method of transmitting a bitstream, comprising:
dividing a current coding block into a plurality of sub-blocks, the plurality of sub-blocks including a first sub-block and a second sub-block;
generating a prediction sample of the first sub-block by using an intra prediction mode derived from a neighboring block, the neighboring block including at least one of a rightmost neighboring block among top neighboring blocks adjacent to the current coding block or a bottommost neighboring block among left neighboring blocks adjacent to the current coding block;
generating a prediction sample of the second sub-block by using the intra prediction mode used to generate the prediction sample of the first sub-block;
generating the bitstream by encoding the current block based on the prediction sample of the first sub-block and the prediction sample of the second sub-block; and
transmitting the bitstream,
wherein the first sub-block includes a top-left pixel in the current coding block,
wherein the second sub-block includes a bottom-right pixel in the current coding block,
wherein a size of the second sub-block is ¼ of a size of the current coding block, and
wherein the intra prediction mode is a directional intra prediction mode or a non-directional intra prediction mode.

* * * * *